US012748727B2

(12) United States Patent
Du

(10) Patent No.: US 12,748,727 B2
(45) Date of Patent: Sep. 29, 2026

(54) SYSTEM AND METHOD FOR UTILIZING SEARCH TREES AND TAGGING DATA ITEMS FOR DATA COLLECTION MANAGING TASKS

(71) Applicant: Yijun Du, Scarborough (CA)

(72) Inventor: Yijun Du, Scarborough (CA)

( * ) Notice: Subject to any disclaimer, the term of this patent is extended or adjusted under 35 U.S.C. 154(b) by 0 days.

(21) Appl. No.: 17/800,945

(22) PCT Filed: Mar. 4, 2020

(86) PCT No.: PCT/CA2020/050287
§ 371 (c)(1),
(2) Date: Aug. 19, 2022

(87) PCT Pub. No.: WO2021/174329
PCT Pub. Date: Sep. 10, 2021

(65) Prior Publication Data
US 2023/0071438 A1 Mar. 9, 2023

(51) Int. Cl.
*G06F 16/14* (2019.01)
*G06F 16/13* (2019.01)
*G06F 16/16* (2019.01)
*G06F 16/185* (2019.01)

(52) U.S. Cl.
CPC ............ *G06F 16/148* (2019.01); *G06F 16/13* (2019.01); *G06F 16/156* (2019.01); *G06F 16/168* (2019.01); *G06F 16/185* (2019.01)

(58) Field of Classification Search
None
See application file for complete search history.

(56) References Cited

U.S. PATENT DOCUMENTS

| | | | | |
|---|---|---|---|---|
| 8,214,361 | B1 * | 7/2012 | Sandler | G06F 16/35 707/732 |
| 2011/0191326 | A1 * | 8/2011 | Gutlapalli | G06F 3/048 707/723 |
| 2012/0304247 | A1 * | 11/2012 | Badger | G06F 16/951 726/1 |
| 2019/0130041 | A1 * | 5/2019 | McKee | G06F 3/0486 |
| 2021/0349892 | A1 * | 11/2021 | Du | G06F 16/9027 |

* cited by examiner

*Primary Examiner* — Giuseppi Giuliani
(74) *Attorney, Agent, or Firm* — Heer Law; Christopher D. Heer

(57) ABSTRACT

Described are a method and system for presenting a search tree session of a storage tree associated with a collection of data items to a user. First, a search query is received at a computer configured to be able to access the storage tree. The search query includes one or more terms or non-term conditions for searching through the storage tree. A search tree is created based on the search query that includes one or more search tree nodes. One or more grouping search tree nodes are then created, each including a search tree node, a node presentation parameter corresponding to how the node will be displayed and a search query parameter corresponding to the search query. A search tree representation incorporating at least one of the grouping search tree nodes is then created for display to a user and output to the display.

49 Claims, 80 Drawing Sheets

FIG. 6(l)
6000
6400
6500
6300
6310
6100
6200
4200
6330
All Search Histories
Photos
5 / 0
Photos
5 / 0
CDs
9 / 0
Europe 2002
2018-02-21
Europe 2007
2018-02-21
Hongkong 2005
2018-02-21
Tags
Files

FIG. 9(c)
Photos
Europe (2 / 0)
Hong Kong (1 / 0)
Japan (2 / 0)
0 / 0

FIG. 14
14100
14200
Shapes
triangle
0 / 1
item 1
item 7
square
0 / 3
circle
0 / 2
0 / 2
item 4
item 7
14300
Shapes
triangle
0 / 2
item 1
item 7
14400
square
0 / 3
circle
0 / 2
0 / 1
item 4

FIG. 37(a)
FIG. 37(b)
Photos
Europe 2002
2/20/18
Europe 2007
7/3/19
Hong Kong 2005
7/3/19
Japan 2005
7/3/19
Japan 2010
2/20/18
Others 2002
7/3/19
5 MB
Others mixed
7/3/19
3 MB
Photos
2002
Europe 2002
2/20/18
Others 2002
7/3/19
5 MB

SYSTEM AND METHOD FOR UTILIZING SEARCH TREES AND TAGGING DATA ITEMS FOR DATA COLLECTION MANAGING TASKS

FIELD OF THE INVENTION

The present specification relates generally to the design of file management systems and more specifically to the use of a single panel display interface, search trees, storage trees, grouping trees, and data tagging to create an accessible and intuitive user interface for data collection managing tasks.

BACKGROUND OF THE INVENTION

Many computer systems use static hierarchal file managers or file browsers, which are computer programs that provide a user interface to manage files and folders. Many users rely on such file managers to store and retrieve their valuable data stored on computers. While file managers and file browsers normally use folder tree structures for storage, representation, and retrieval of data, they often provide search functionalities, too, to allow quick and direct access to the files based on keywords or non-keyword conditions or both.

Static hierarchal storage structures or trees permit users to store data in a manner that is analogous to how the physical world is set up, in that objects and items can be found in a predictable location which can be accessed by taking predictable steps. These structures often allow users to apply their real-world intuition to the task of locating relevant data by thinking about the natural relationships that might exist among data. Such structures are generally designed so that new users can understand the relationships between folders and subfolders to navigate the structure to data of interest. In this way, static hierarchal structures create a path of folders and subfolders which can be used in uniquely identifying the location of data in the structure.

However, file management and browsing interfaces remain little changed from when they were first introduced. It is often difficult for users to arrange and display all relevant data and effectively identify and navigate to a desired data item and many interfaces lack customization to build familiar and accessible structures. Current interfaces can be confusing, unintuitive, convoluted, and inaccessible to users, with these problems compounding as the quantity and complexity of data increases. For both business and recreation, an unintuitive and inaccessible interface can waste time, frustrate users, and cause users to overlook or be unable to retrieve relevant data.

Accordingly, there is a need for improvements in the art.

SUMMARY OF THE INVENTION

In accordance with an aspect of the invention, there is provided a computer-implemented method for presenting a search tree session of a storage tree associated with a collection of data items to a user, comprising executed on a processor the steps of: receiving from the user a search query at a computer configured to be able to access the storage tree associated with a collection of data items and to access a display, the search query including one or more terms or non-term conditions for searching through the storage tree associated with a collection of data items; creating a search tree of the storage tree associated with a collection of data items based on the search query, the search tree including one or more search tree nodes; creating one or more grouping search tree nodes, wherein each grouping search tree node comprises a search tree node, a node presentation parameter corresponding to how the node will be displayed to a user and a search query parameter corresponding to the search query of the user; creating a search tree representation for display to a user incorporating at least one of the one or more grouping search tree nodes; and outputting the search tree representation to the display.

In accordance with an aspect of the invention, there is provided a non-transient computer-readable medium containing computer-readable instructions which, when executed by a computer processor, perform a method of: receiving from the user a search query at a computer configured to be able to access the storage tree associated with a collection of data items and to access a display, the search query including one or more terms or non-term conditions for searching through the storage tree associated with a collection of data items; creating a search tree of the storage tree associated with a collection of data items based on the search query, the search tree including one or more search tree nodes; creating one or more grouping search tree nodes, wherein each grouping search tree node comprises a search tree node, a node presentation parameter corresponding to how the node will be displayed to a user and a search query parameter corresponding to the search query of the user; creating a search tree representation for display to a user incorporating at least one of the one or more grouping search tree nodes; and outputting the search tree representation to the display.

In accordance with an aspect of the invention, there is provided a computer system for presenting a search tree representation on a display to a user, comprising: a non-transient computer memory storing at least one storage tree and at least one associated collection of data items; at least one processor in communication with the non-transient computer memory; the display for presenting the search tree representation; and wherein the non-transient computer memory comprises instructions which, when executed by the at least one processor, carries out the steps of receiving from the user a search query at a computer configured to be able to access the storage tree associated with the collection of data items and to access a display, with the search query including one or more terms or non-term conditions for searching through the storage tree associated with a collection of data items, creating a search tree of the storage tree associated with a collection of data items based on the search query with the search tree including one or more search tree nodes, creating one or more grouping search tree nodes wherein each grouping search tree node comprises a search tree node, a node presentation parameter corresponding to how the node will be displayed to a user and a search query parameter corresponding to the search query of the user, creating a search tree representation for display to a user incorporating at least one of the one or more grouping search tree nodes, and outputting the search tree representation to the display.

In an embodiment of the present invention, there is a file management system that uses a single panel display interface, search trees, folder trees, grouping trees, and data tagging.

In an embodiment of the present invention, search trees are browsed using a position indicator and a single main content display panel for a current node. Browsing is facilitated through the incorporation non-term conditions in the form of sub-node toggle, search result toggle, select, and open functions. According to a further embodiment, the sub-node toggle, search result toggle, select, and open functions are implemented as buttons, menu options, or other conventions provided by an operating system of an application program, alone or combined.

In an embodiment of the present invention, there are different browsing modes for storage trees, search trees, or grouping search tree nodes.

In an embodiment of the present invention, the display and file access controls are user-customizable.

In an embodiment of the present invention, attributes and properties are displayed as details of files and folders for use in recognizing, distinguishing, accessing, or organizing files or folders.

In an embodiment of the present invention, there is collection-based grouping and accessing of folders and search tree nodes across folder trees and different search trees. According to a further embodiment, folders and search tree nodes are grouped and accessed across storage folder trees and search trees by associating each folder and search tree node with a list of at least one folder or search tree node where each folder or search tree node in the list represents a data collection the same as the folder or the search tree node itself.

In an embodiment of the present invention, requests can be received that specify a data item associated with a search node in a search tree structure and another search node in the same search tree structure and breaking the existing association between the data item and the first search node and establishing a new association between the data item and the second search node at the same time.

In an embodiment of the present invention, requests can be received that specify a data item associated with a search node in a search tree structure and another search node that is being applied to the same collection as the first search node and establishing a new association between the data item and the second search node.

In an embodiment of the present invention, there is a grouping mode and a means of creating and maintaining grouping search tree nodes within search tree structures where the presentational aspect of a search node is separated from its operational aspect by associating a value for node presentation and a value that represents a search query with a single node.

In an embodiment of the present invention, requests can be received that, without any search query being specified, create a new grouping node with an empty search result set.

In an embodiment of the present invention, an unsorted group is automatically generated to contain all data items that do not logically fall into a sorted group of grouping search tree nodes.

In an embodiment of the present invention, requests can be received that specify two or more items under the same search result set and which create, under the current node, a new grouping search node with its search result items being the data items from the request.

In an embodiment of the present invention, requests can be received that specify a search node in a search tree structure and display a preview or summary of the search node.

In an embodiment of the present invention, identification-only (ID-only) search tree nodes can be created, maintained, and attached under a normal search node within a search tree structure to identify specific data items within the collection defined by the normal (parent) search node for some specific processing routine through association with a node-type indicator for the node itself, an operation-identifier (operation-ID), and a search query.

In an embodiment of the present invention, there is a processing routine for customizing the representations of a search node based on customized selection of the data items within the collection defined by the search node.

In an embodiment of the present invention, there is a processing routine for providing direct access to customized selections of the data items within a collection defined by a search node.

In an embodiment of the present invention, tags are utilized in the form of name:value pairs along with an interface and routine for recognizing name:value pairs and for distinguishing tag group names from tag values when search queries are entered and processed in the system. According to a further embodiment, tags are groupable by tagging the tags by adding a common group tag to tags belonging to a user-identified unifiable group.

In an embodiment of the present invention, data items can be moved or copied by a drag and drop operation that removes one or more tags corresponding to a current group and attaches one or more tags corresponding to a new group upon moving at least one data item or that attaches one or more tags corresponding to a new group upon copying at least one data item.

In an embodiment of the present invention, there is a means of presenting storage folder structures for a parent folder where, with the completeness of the contents of the folder always being maintained, both the subfolders and individual files can be displayed together at the same time in various forms.

In an embodiment of the present invention, there is a search engine that does not cache or store a customized selection of the data items as a static list but, instead, as the search query to the search engine, such that the list resulting from the search query will always be up-to-date, even if the data items have been moved or renamed after their creation.

In an embodiment of the present invention, there is a folder aware mode for search request processing. According to a further embodiment, the search request processing system automatically projects search characteristics downward from parent folders onto sub-folders and files inside them for positively identifying search requests or automatically derives matching status upward from sub-folders and files to their parent folders for completely or partially negated search requests. According to a further embodiment, the search request processing system preserves context and hierarchal information with integrity and completeness for the positively identifying and completely or partially negated search requests. According to a further embodiment, the search request processing system returns a minimal set of folders and files from the folder structure as the representations of the complete result set for the search request represented by at least one of the search tree nodes after the parent-child relationships in the storage folder trees are recognized and respected by the system.

Other aspects and features according to the present application will become apparent to those ordinarily skilled in the art upon review of the following description of embodiments of the invention in conjunction with the accompanying figures.

BRIEF DESCRIPTION OF THE FIGURES

The principles of the invention may better be understood with reference to the accompanying figures provided by way of illustration of an exemplary embodiment, or embodiments, incorporating principles and aspects of the present invention, and in which.

DETAILED DESCRIPTION OF EMBODIMENTS OF THE INVENTION

Figure 1:
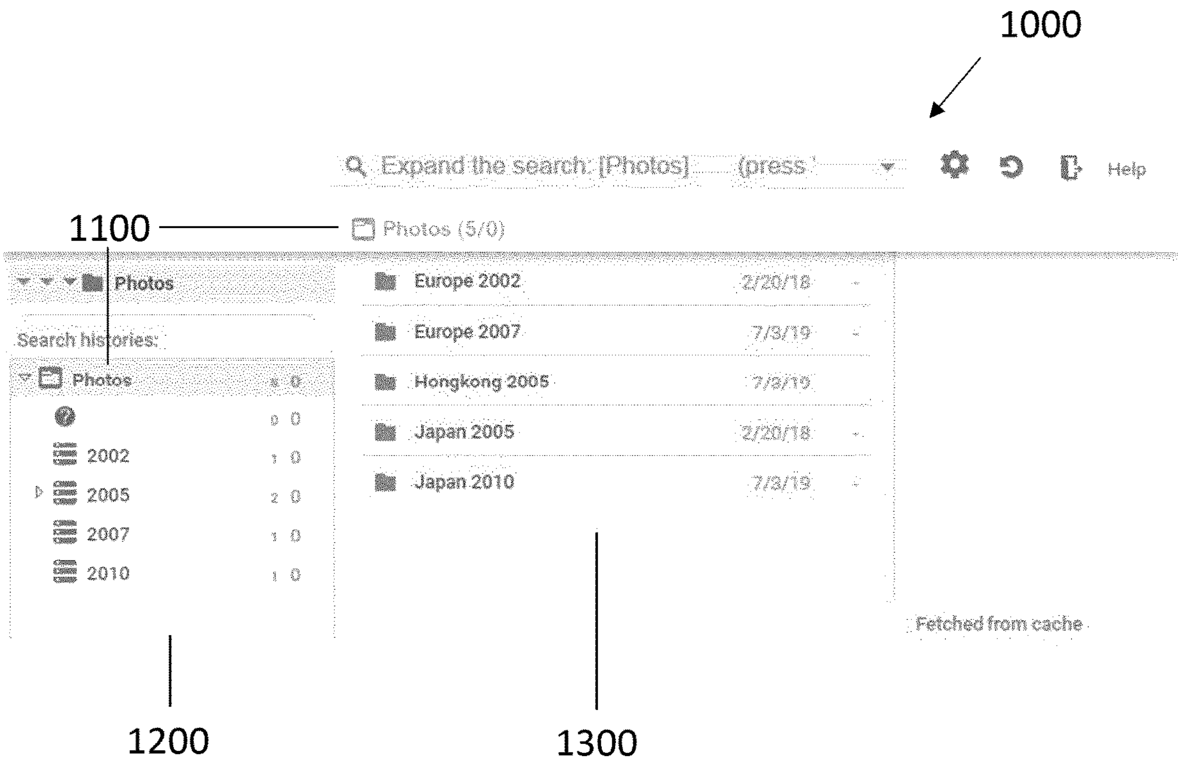
FIG. 1 shows an embodiment with an at-least-2-subpanel user interface.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order to more clearly to depict certain features of the invention.

This description relates to the design of file management systems. In particular, it relates to the use of a single panel display interface, search trees, folder trees, grouping trees, and data tagging to create an accessible and intuitive user interface for collection managing tasks.

Data, data items, and data collections are often stored in static representation and retrieval structures, but data retrieval and management can benefit from non-static representation and retrieval structures. Users may benefit from different files being displayed concomitantly in an easy to read format that maximizes visibility into and control of the data. More customizable file management systems can improve accessibility for data that is initially stored in a non-intuitive location and can minimize the need for duplicating the storage of data merely to make it more accessible to the user. Improved customization can also overcome the problem of dealing with a piece of data that can reasonably fit in several storage locations, particularly where the descriptions of those storage locations appear mutually exclusive, and permit quickly locating the data when needed.

Search trees can further be built to have related search requests collected and managed together, so that data files on a computer can be dynamically divided into folder-like hierarchical groups, in contrast to statically stored in data storage folder tree structures, for collection management and data retrieval purposes.

For example, a single photo collection stored in folders may get re-arranged using different search trees at different times, or at the same time in parallel, such as by photo location or date. Within the search trees, one tree node represents one single search request. For example, "List all items inside folder Photos" for all the first level root nodes or "List all items that are inside folder Photos and match with both the keywords Europe and 2002" for a third level sub-node "2002" under a second level sub-node "Europe".

By adding an extra layer between the user and the storage structure in which the users are searching, search trees can provide additional logical representations of the files and folders that are independent to the storage tree items and the set or collection of data or data items or data pieces associated with the storage tree. So, when properly implemented, search trees can be built, modified, and removed dynamically without affecting any part of the underlying data storage structures in any way to provide a more intuitive design with more accessible data.

An aspect of the present invention relates to a system and method of browsing search trees using a position indicator and a single main content display panel for a current node. The position indicator is initially blank, and the root search nodes are initially displayed as a list of collapsed nodes in the content display panel. A search node in the content display panel can be selected and opened by having the position indicator pointing to it, and by overriding and filling the content display panel using one of the following two types of contents of the search node. Namely, the list of its sub-nodes, if the node to be opened is a parent node, as a list of collapsed nodes, or the list of search result items, if the node to be opened is a leaf node. Any visible search node in the content display panel may also have additional controls attached and operating without the current node position indicator being updated. These include a toggle button for expanding and collapsing the display of its list of sub-nodes, where the toggle is present if the targeted node is a parent node and the toggle is absent if the targeted node is a leaf node. These controls also include a toggle button for expanding and collapsing the display of its list of search result items and a selection button to have itself highlighted and associated with additional context menu options or other operations. Furthermore, the open and expansion operations can be merged into a single step where, if the node to be opened is a parent node, list its sub-nodes as a list of collapsed nodes and, if the unsorted sub-node is a leaf node, expanding the unsorted sub-node and displaying it as a list of individual search result items.

An aspect of the present invention relates to a system and method of providing collection-based grouping and accessing of folders and search tree nodes across storage folder trees and different search trees. This can be done by, for each folder and search tree node managed within the system, associating with it a list of a folder (where applicable) and a search tree node or search tree nodes, including the folder or the search tree node itself, where each folder or search tree node in the list represents a data collection the same as the folder or the search tree node itself. When a folder or a tree node is displayed and operated on, its corresponding same-collection-node list is made available at the same time by providing handles or indicators or toggles for the list to be displayed, or for another node from the list to be accessed and displayed, or automatically triggering the display of all of the folder and the nodes from the list.

An aspect of the present invention relates to receiving a request that specifies a data item associated with a search node in a search tree structure and another search node in the same search tree structure and breaking the existing association between the data item and the first search node and establishing a new association between the data item and the second search node at the same time. This is done by removing the characteristics and properties corresponding to search query conditions represented by the first search node and adding the characteristics and properties corresponding to search query conditions represented by the second search node. In the case where the association or associations cannot be broken or established, the user is alerted about the conflict or conflicts.

An aspect of the present invention relates to receiving a request that specifies a data item associated with a search node in a search tree structure and another search node that is being applied to the same collection as the first search node and establishing a new association between the data item and the second search node. This is done by adding the characteristics and properties corresponding to search query conditions represented by the second search node. In the case where the association or associations cannot be established, the user is alerted about the conflict or conflicts.

An aspect of the present invention relates to a grouping mode and system and method of creating and maintaining grouping search tree nodes within search tree structures where the presentational aspect of a search node is separated from its operational aspect by associating two pieces of information with a single node. Namely, a value for node presentation and a value that represents the search query. A normal search node that only represents a search query can be converted into a grouping node by duplicating the search query as the value for node presentation, to be updated independently at another time.

An aspect of the present invention relates to a system and method of receiving a request without any search query being specified and creating a new grouping with an empty search result by automatically generating a face name as the value for node presentation and a globally unique search-ID as the value that represents the search query and creating a new search tree presentation or modifying an existing search tree presentation by adding a new grouping node and associating the new node with the face name and globally unique search-ID.

An aspect of the present invention relates to a system and method of receiving a request that specifies two or more items under the same search node within the same search result set, and creating, under the current node, a new grouping search node with its search result items being the data items from the request. This can be achieved by tagging the data items using the system-generated globally unique search-ID and modifying the existing search tree presentation for the current node by adding a new grouping sub-node and associating the new node with the face name and globally unique search-ID.

An aspect of the present invention relates to a system and method of receiving a request that specifies a search node in a search tree structure and displaying a preview or summary of the search node. Such a preview or summary can include visualized images of the data item or data items from the node or text descriptions of the data item or data items from the node. Such a request can be triggered by dragging one data item or multiple data items from another search node within the same search tree structure and moving the item or items over the first search node or by a hovering (mouse-over) event over the first search node.

An aspect of the present invention relates to a system and method of creating and maintaining ID-only search tree nodes to be attached under a normal search node within a search tree structure to identify specific data items within the collection defined by the normal (parent) search node for some specific processing routine by associating three pieces of information with a single node. The first piece of information is a node-type indicator for the node itself to get excluded or isolated from normal operations and interaction with any other sub-nodes, including any other ID-only sub-nodes, using an explicit indicator when the ID-only node is stored together in the normal sub-node list under the parent search node or an implicit indicator when the ID-only node is stored in a separate dedicated list under the parent search node for "ID-only" sub-nodes. The second piece of information is an operation-ID for the node to be associated with the processing routine that retrieves data items within the collection through the ID-only sub-node. The last piece of information is a search query, that includes "grouping" nodes or namelessly grouping nodes, for identifying the data items within the collection.

An aspect of the present invention relates to a system and method of using a processing routine for customizing the representations of a search node based on customized selection of the data items within the collection defined by the search node. This can be implemented by providing an interface for the users to select a data item or items from the search node and representing the selection using a search query, storing the selection, and presenting the search node. In particular, the selection may be represented as a grouping criterion or a system-generated globally unique search-ID if the selection is one-by-one. The selection may be stored by creating and attaching an ID-only sub-node under the search node with an operation-ID that links to the processing routine for customization and the search query for the user-defined selection. The search node can be presented by retrieving the selection list by checking if an ID-only sub-node with a proper operation-ID exists under the search node and evaluating the search query from the ID-only sub-node against the collection and returning a search result set. If the selection (search result set) exists and is non-empty, the presentation can be customized using visualized images or text descriptions of the selected data item(s) or using other customized or default setups.

An aspect of the present invention relates to an express-access mode that uses a processing routine for providing direct access to customized selections of the data items within a collection defined by a search node. This can be done by following the system's steps for selection, storage, and presenting search nodes by incorporating an operation-ID that links the processing routine for direct access and that sends the selection of data items to a default program for the corresponding data type(s) of the selected items so that the data items are directly opened when the open operation is triggered on the search node. If the selection (search result set) exists and is non-empty, then the selection of data items is linked to the default program for opening the items. Otherwise, the search node is opened normally.

An aspect of the present invention relates to a system and method of using tags in the form of name:value pairs. In particular, there is an interface for specifying an additional field for a tag group name when entering a new tag, editing or modifying an existing tag, and deleting an old tag. Name:value pairs may conventionally be stored as text tag entries, such as defining a delimiter and inserting it between the text for "name" and the text for "value". Furthermore, there may be a routine for parsing, recognizing, and interpreting name:value pairs of tags and for integrating presentations of different tag values under the same tag group name in a tabular (spreadsheet) form, where the values can be texts, indicators for presentations, or any type of data that can be handled by the system. Alternatively, the routine will recognize the name for a tag group in a similar way as other system generated and maintained property names, along with the different tag values under the same tag group name in a similar way as other system generated and maintained property values, in data managing tasks. Furthermore, there is an interface and a routine for recognizing name:value pairs and for distinguishing tag group names from tag values when search queries are entered and processed in the system.

An aspect of the present invention relates to a method of presenting storage folder structures for a parent folder where, with the completeness of the contents of the folder always being maintained, both the sub-folders and individual files can be displayed together at the same time in various forms. A parent folder in the content display panel may have controls attached and operating without the position or placement of the parent folder in the overall presentation being affected. A toggle function is incorporated for expanding and collapsing the display of a list of all sub-nodes and individual child files, if any, directly under the targeted parent folder, where the toggle is present if the targeted folder has a list of subfolders and the toggle is absent if the targeted folder does not have any subfolders. A toggle function is incorporated for expanding and collapsing the display of a complete list of individual child files under the targeted parent folders without any of the subfolders being visible.

An aspect of the present invention relates to a folder-aware mode for search request processing, where a minimal set of folders and files from the folder structure are returned as the representations of the complete result set for the search request represented by a search tree node after the parent-child relationships in the storage folder trees are recognized and respected by the system. Only the top-level parent folders that match with the search request are returned within the result set for the search node in the search tree structure. The list of top level folder tree presentations may be placed directly under a search tree node within a search tree presentation or displayed separately from its corresponding search tree node in the same display area after the search node is opened or in a separate display area after the search node is selected. All and any sub-folders or files that also match with the same search request are presented, as needed and on-demand, using a folder tree presentation, that guarantees the completeness of the contents of the folder in various forms, under their respective top level parent folders. For an all positively identifying search request without any Boolean NOT operator, the result set is always a maximized set that the folder presentation can represent, which includes the top-most folder and each and every subfolder and file inside the top-most folder. For a completely negated or a partially negated search request with at least one Boolean NOT operator, the result set can be either a complete set or a subset that the folder presentation can represent. To present the subset, folders within the folder tree presentation, including the top-level folder or any subfolders, are distinguished and marked using a color or symbol scheme based on or derived from the matching status of its contents under the folder. Parent folders get marked or crossed-out as not-logically-matching and disabled if none of its contents matches with the same search request as the parent folder itself. Parent folders get marked as matching-completely or presented normally if all of its contents match with the same search request as the parent folder itself or, the parent folder is empty without any contents of its own. Parent folders get marked as matching-partially if only some, but not all, of its contents match with the same search request as the parent folder itself. All sub-folders and files immediately under the partially matching parent folder always get displayed when the parent folder is expanded, but need to be distinguished and marked using a color or symbol scheme. For a folder, distinguished or marked as not matching if the folder itself does not match with the same negated request as the parent folder or as not-logically-matching and disabled, matching completely, or matching partially if the folder itself matches with the same negated request as the parent folder, in which case its status will be set recursively based on the contents of its own. For a file, as not matching or matching and normal depending on if the file itself matches with the same negated request as the parent folder. Individual file items that match with the search request are returned within the result set for the search node in the search tree structure when and only when they do not belong to any of the folders that match with the same search request. The list of individual files, as part of a search result set, may be placed directly under a search tree node within a search tree presentation or displayed separately from its corresponding search tree node in the same display area, after the search node is opened, or in a separate display area, after the search node is selected.

Browsing Conventional Search Trees

According to an embodiment, when a (parent) search node is divided into sub-nodes or sub-groups, an unsorted (sibling) sub-node or group, respectively, is created and managed automatically to represent the set of yet-sorted items (to complement all the explicitly specified sub-nodes or sub-groups) under this same parent node, so that no item from the collection will ever be left out in the search tree representation. This may maintain the data integrity for the entire collection and make search trees qualify for managing the data collections. According to an embodiment, root nodes are not sub-nodes of any parent node and, consequently, do not have any unsorted sibling nodes (at the root level).

According to an embodiment shown in FIG. 1, an at-least-2-subpanel user interface 1000 can be used for presenting and managing the search trees and the contents for the search tree nodes with a current and selected tree node component 1100, a navigation subpanel for tree contents 1200, and a result display subpanel for data contents 1300 with the search tree contents and structure shown in the tree navigation subpanel 1200 on the left side of FIG. 1 and the data contents of the current tree node (that is, search result items found for the selected search node in the navigation subpanel) displayed in the result display subpanel 1300 in the middle of FIG. 1.

According to an embodiment, users can control and adjust the display of the search tree nodes within the tree navigation subpanel, and then select and choose a node for its search results to be displayed within the content subpanel 1200 after the search query represented by the node is evaluated against the underlying data collection.

Figure 2A:
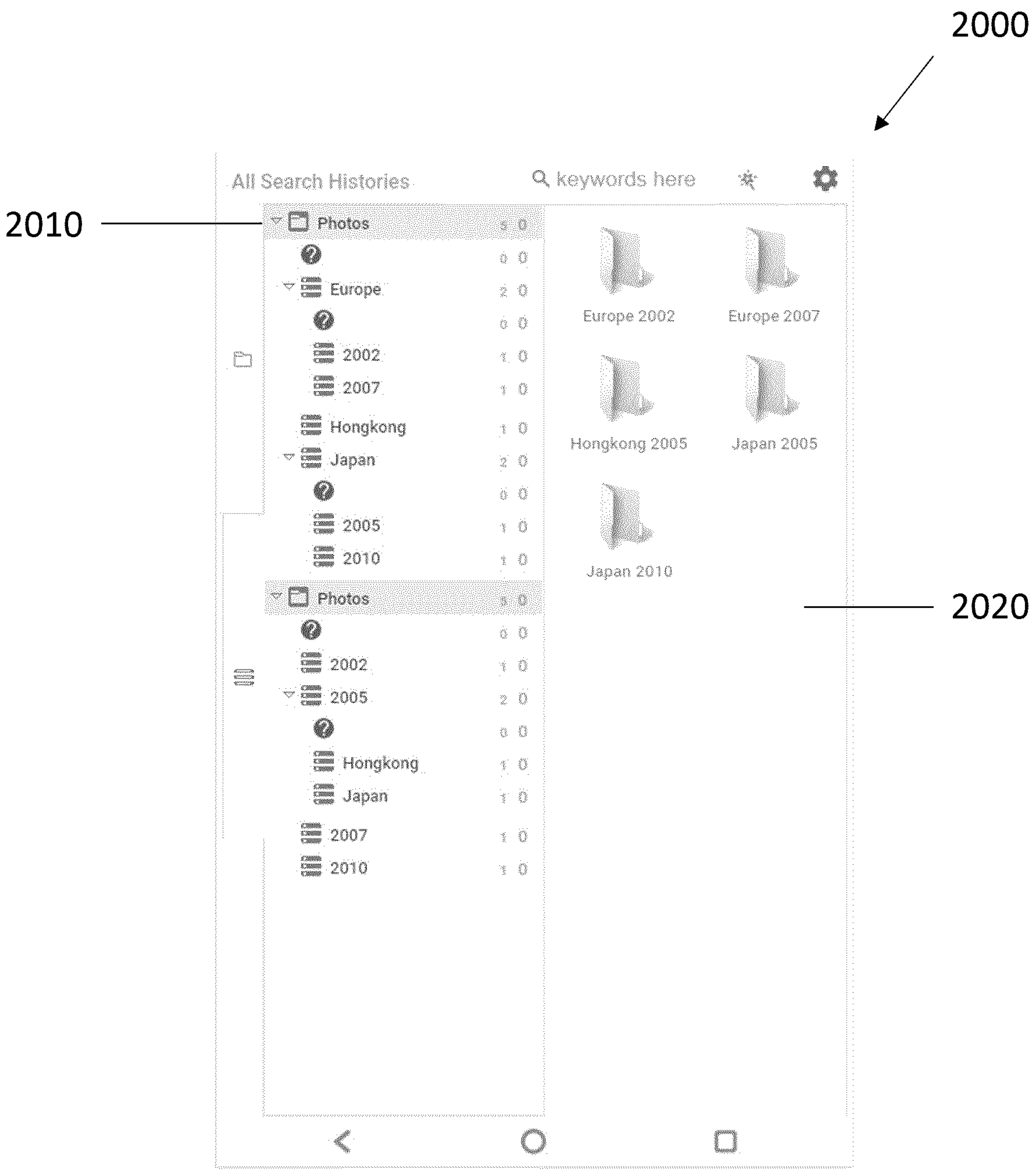
FIGS. 2(*a*) and 2(*b*) show a portrait style and top-and-bottom display layout.
Figure 2B:
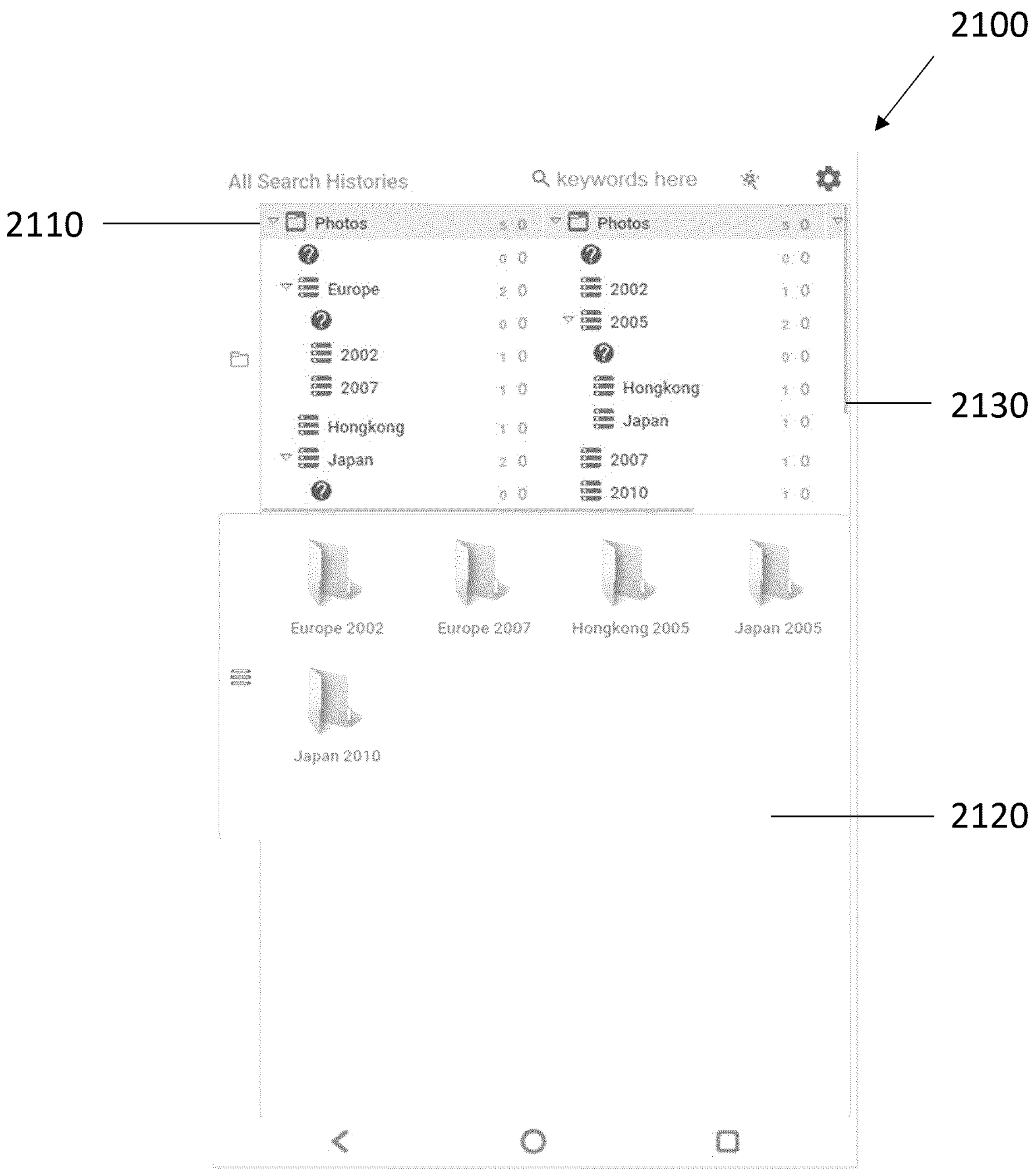

While such an interface feels natural to the users because clicking on a search tree node correlates with issuing a search request very well, it is not always easy to get multiple subpanels arranged within the display areas available. For example, when the overall display area size switches from landscape-style to portrait-style, the tree navigation subpanel 2010, 2110 may require scrolling 2130 functionality for complete information display and the content subpanel 2020, 2120 may be too small for the details if the 2 panels are kept side-by-side 2000, like in FIG. 2(*a*), or if presented in a top-and-bottom layout 2100, like in FIG. 2(*b*). Consequently, a single display panel setup may be more appropriate for display areas in these cases.

According to an embodiment, there is an in-place browsing mechanism where data stored in hierarchal tree structures can get displayed and managed in a single display setup, with the contents of one current part or node of the tree structures being displayed in the display panel. According to an embodiment, tree navigation and traversal is done by allowing the position of the current part or node to get changed through some node-opening (and back and restore) functionalities.

According to an embodiment, every node in a tree has one definite path from the root node to its position in the tree structure, so contents of any node can thus get displayed by opening the root node and then all the (parent) nodes and eventually the current node in the sequence along the path. According to an embodiment, "Go Back" or "Up" controls are provided so that contents of parent nodes along that path, all the way up to the root node, can be restored, one by one in the reversed sequence that they are opened, before another node under the same root (or the same parent) can be reached and then opened following the path of its own.

According to an embodiment, extra data may be associated with the tree nodes. According to a further embodiment, every node in a tree has tree contents, including information about whether the node is a parent node with a list of child sub nodes hierarchically under it, or it is a leaf node by itself, in the tree hierarchal navigation structure. According to an embodiment, every node in a tree has data contents, including any data associated with the tree node other than the tree contents. For example, for a storage folder tree of an embodiment, every folder is a node in the folder tree which may contain a list of sub-folders (if any) as its tree contents or a list of individual files as the data contents.

According to an embodiment, the tree and data contents are independent to each other. According to a further embodiment, a tree node and its tree contents are always in a logical parent-child relationship in order for the hierarchal tree structure to be properly maintained. In contrast, a tree node and its data contents can have various kinds of relationships. According to a further embodiment, these relationships include containing a parent-child relationship (such as in the case for a parent folder and the files in that folder), another presentation format of the current node itself, or any other relationships that happen to be associated with the node.

Usually, the two different types of contents of the current node are arranged separately in a single display setup, making the tree presentations a 2-step procedure in general. Such a 2-step procedure displays tree contents of the current node in the display area with the aforementioned conventions and data contents can then be arranged together with the tree contents in the display area if it is permitted by the application program's design. By separating the presentations of tree contents from the presentations of the data contents, the list of sub-nodes, if any, are always available first and ready to be opened one-by-one within the display area for the tree structure to be navigated and browsed using the tree browsing conventions no matter how the data contents are subsequently presented (if at all). Sometimes, depending on the type of data contents, the two steps can be combined. An example of such a combination are file management systems where both the sub-folders and the files are presented together as if the two lists are treated the same way (in one step) for the current folder in the display area, when it is logically appropriate.

Figure 3:
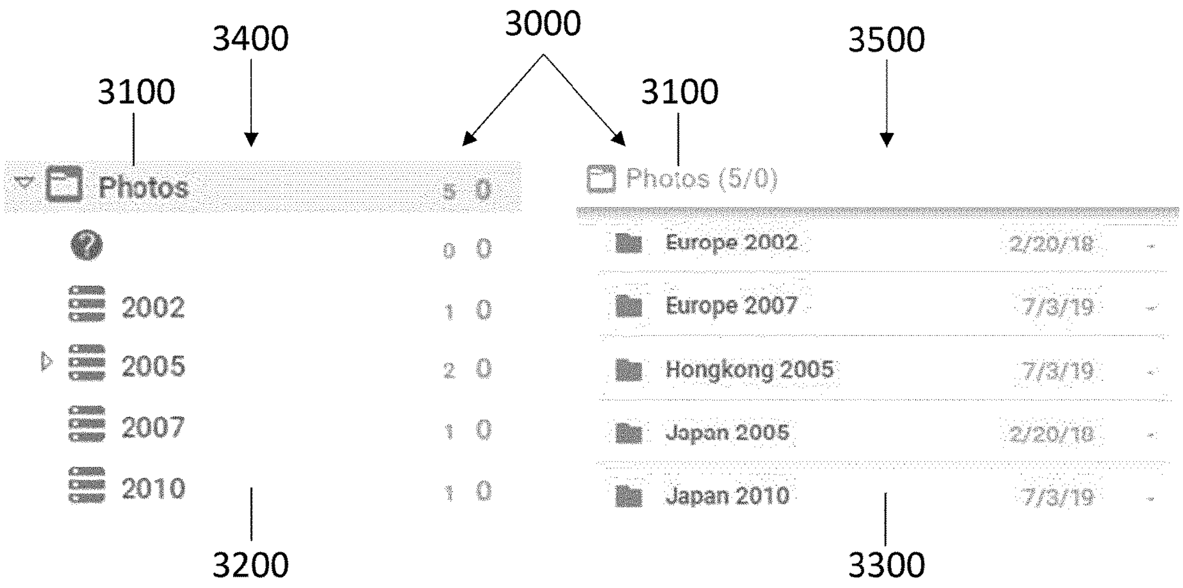
FIG. 3 shows a display layout where tree and data contents are displayed and managed separately in different display panels in a multi-panel interface.

For search trees, each node usually represents two types of content too. These include tree contents, such as a list of child sub search nodes immediately under the current node in the search tree structure for a parent node that has been further divided and grouped into sub-node sub-groups, and data contents, such as a list of search result items returned by the query represented by the current node after the query is evaluated against the underlying data collection. As depicted in FIG. 3, a sample node showing the same current node position 3100 for "Photos" is shown where the tree 3200 and data 3300 contents are displayed and managed separately in different display areas 3400, 3500 respectively, in a multi-panel interface setup 3000.

However, unlike the presentations for the folder trees where both the sub-folders and the files for the current node or folder can be displayed together in a single-panel setup, the list of sub-search-nodes and the list of search result items cannot be combined nor merged because these two lists both represent exactly the same set of data items as the current search node itself represents, and confusion will arise if both the lists get displayed together at the same time under the same current search node.

In the event of such a conflict the presentation for the tree contents should always take priority over the presentations for the data contents to allow the list of sub-nodes, if any, to get displayed in the display area. Otherwise, tree navigation and traversal will break down if the sub-nodes are not available at all times. Only when a search node is not further divided and grouped into sub-nodes, will the data contents (the list of search result items) for the current leaf node be displayed in the main display area.

Figure 4A:
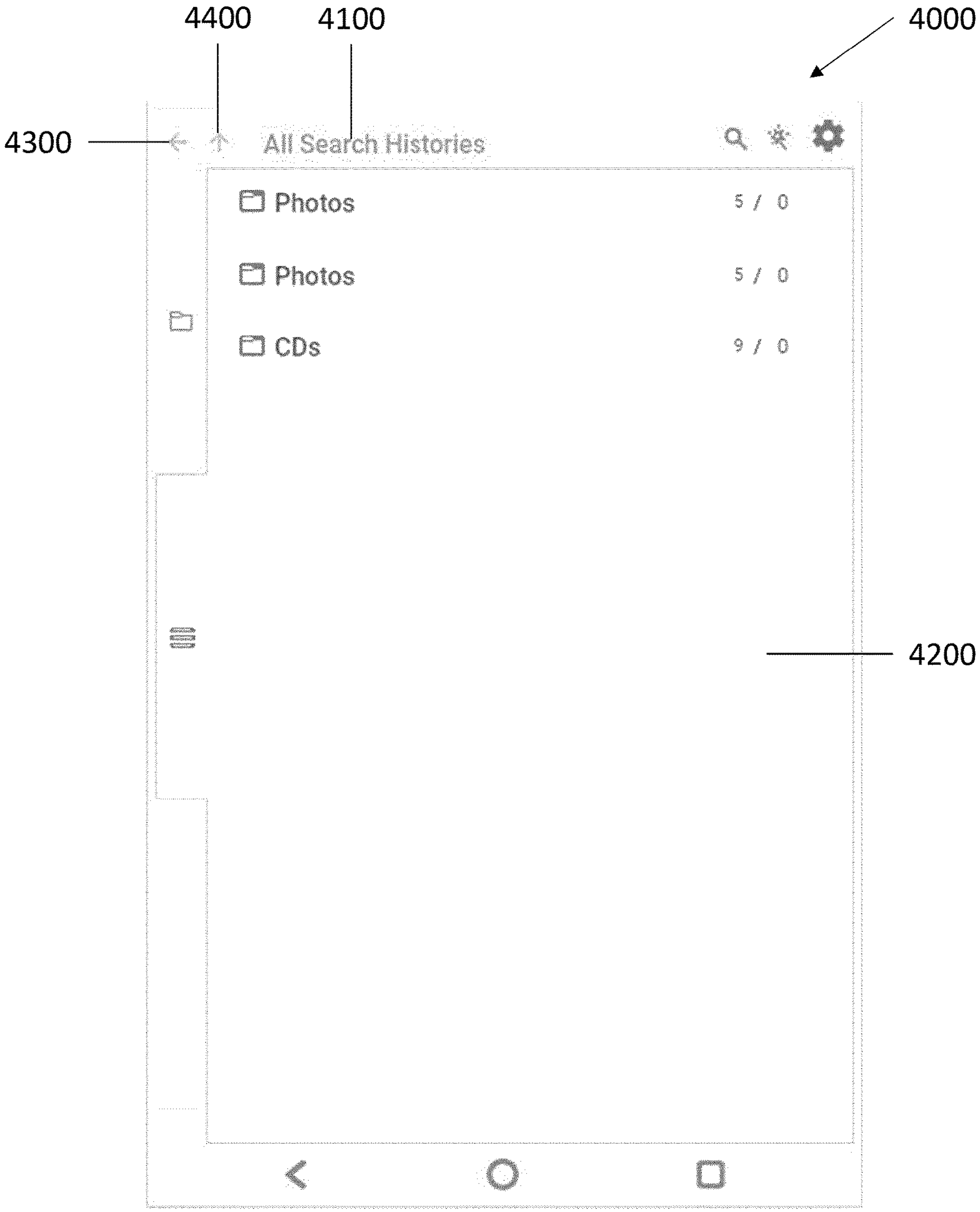
FIGS. 4(*a*) to 4(*c*) show an embodiment of a navigable single panel display.
Figure 4B:
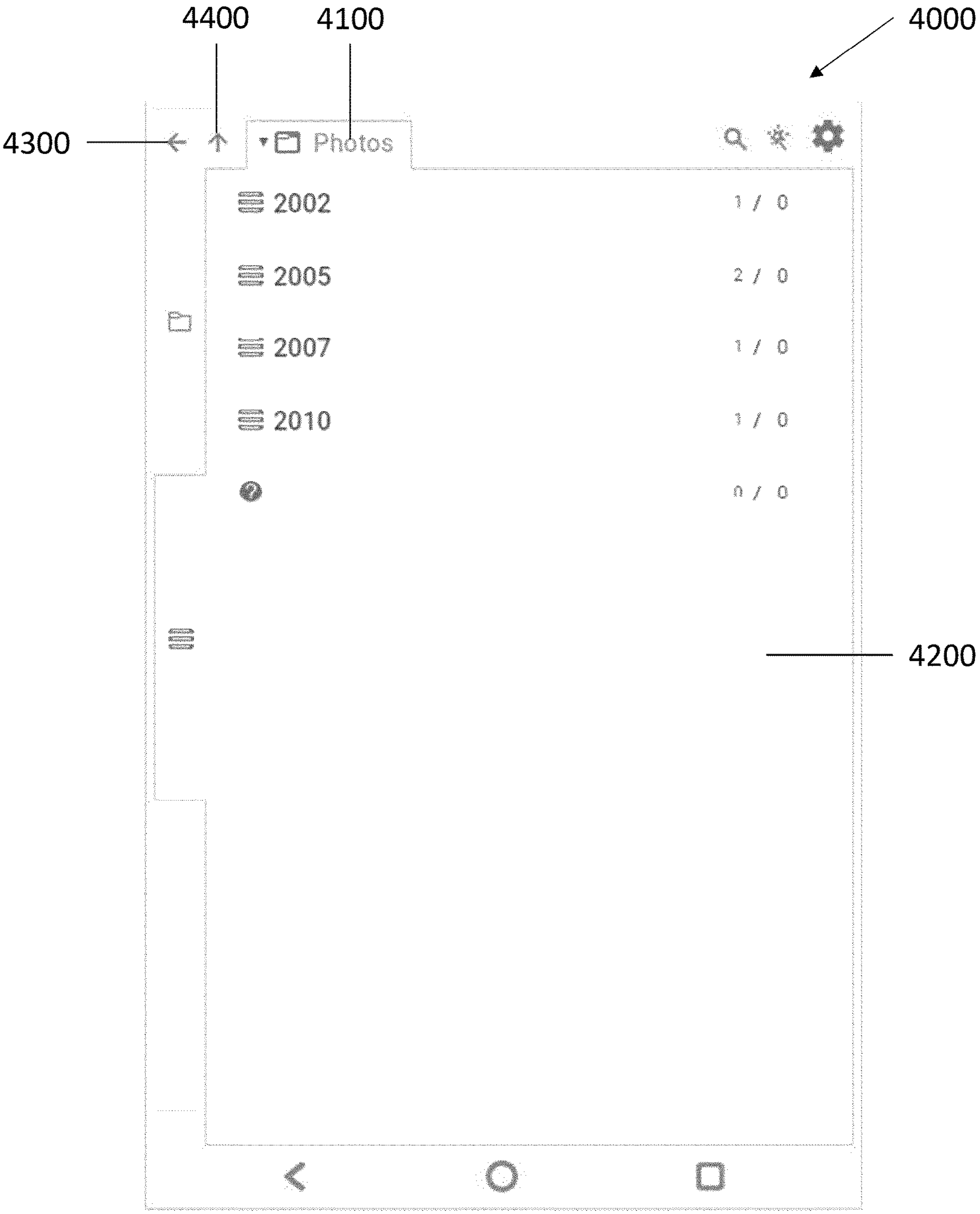
Figure 4C:
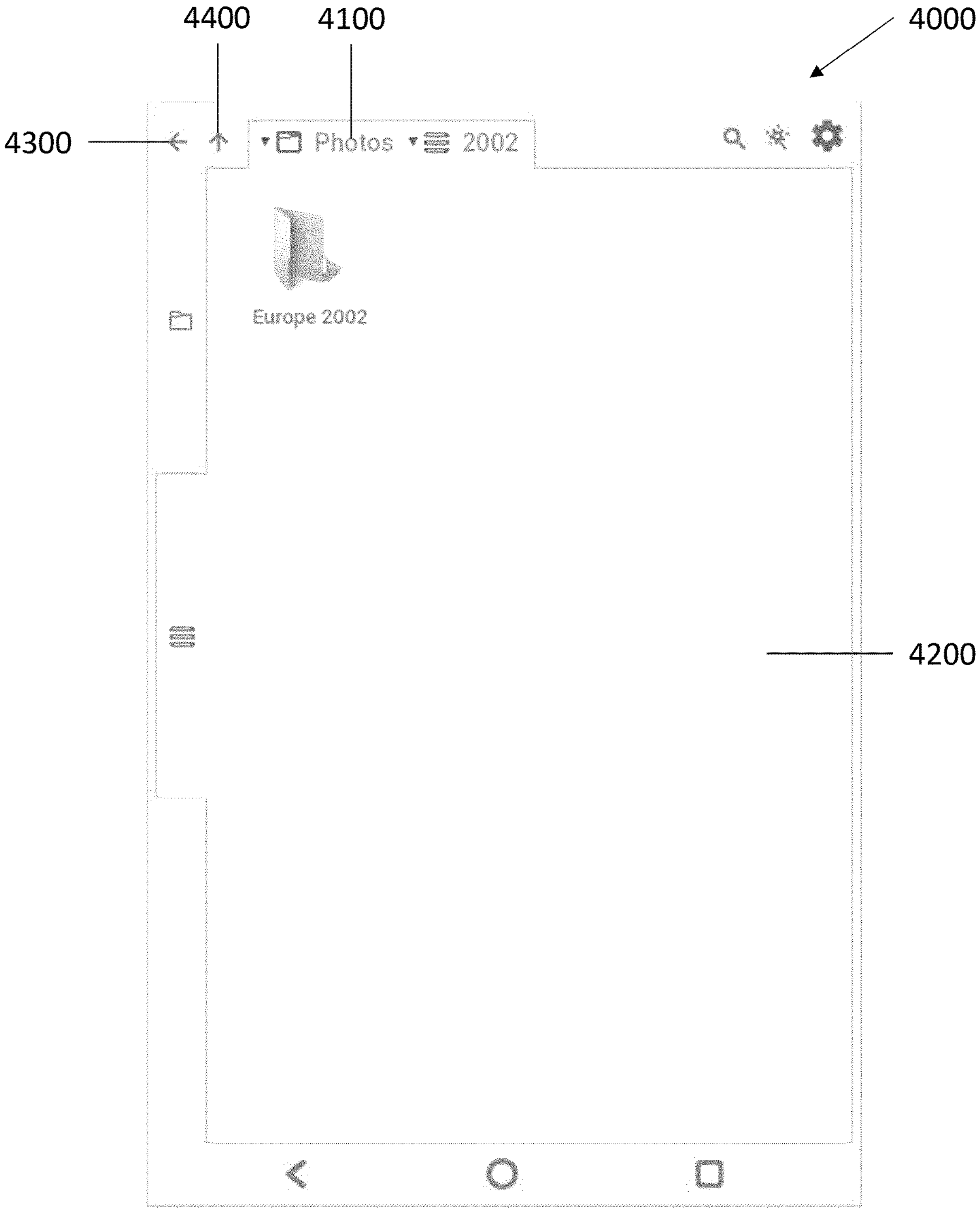

According to an embodiment shown in FIG. 4(*a*), the root nodes of some search trees are initially listed together in a single panel display 4000 with neither the tree structure details nor the search result items yet visible or revealed. As a common part, there is a designated area at the top across the main display area for indicating or identifying the coordinate or position of the current node within the tree structure 4100, that is, the common path from the root to the current node, whose contents 4200, being the sub-nodes or the search result items, are displayed in the main display area. This permits users to keep track and maintain awareness of their locations while the tree structure is not always fully visible within the main display area. A "Go Back" 4300 and "Go Up" 4400 button are also provided to either restore the display area to its previous state or to go up a node level, respectively.

According to a further embodiment shown in FIG. 4(*b*), a search node or sub-node in the display area can be opened when the node or some context menu option on the node is clicked or tapped or double-clicked, depending on design implementations, and have its contents displayed in the main display area and its position indicator 4100 is updated accordingly. That is, the contents currently in display will get replaced by a new list of sub-nodes, each of which can be subsequently opened for their contents to get displayed, or a new list of search result items, depending on the type of the node to be opened.

According to a further embodiment shown in FIG. 4(*c*), only for a leaf tree node without any sub-nodes (i.e., where no further traversing and browsing is needed), will the list of search result items be displayed. Once more, the position indicator 4100 is updated. According to a further embodiment, the search result list will always exist for all search nodes, even though the list can be empty when the search query represented by the current node does not match with any item within the data collection.

Figure 5:
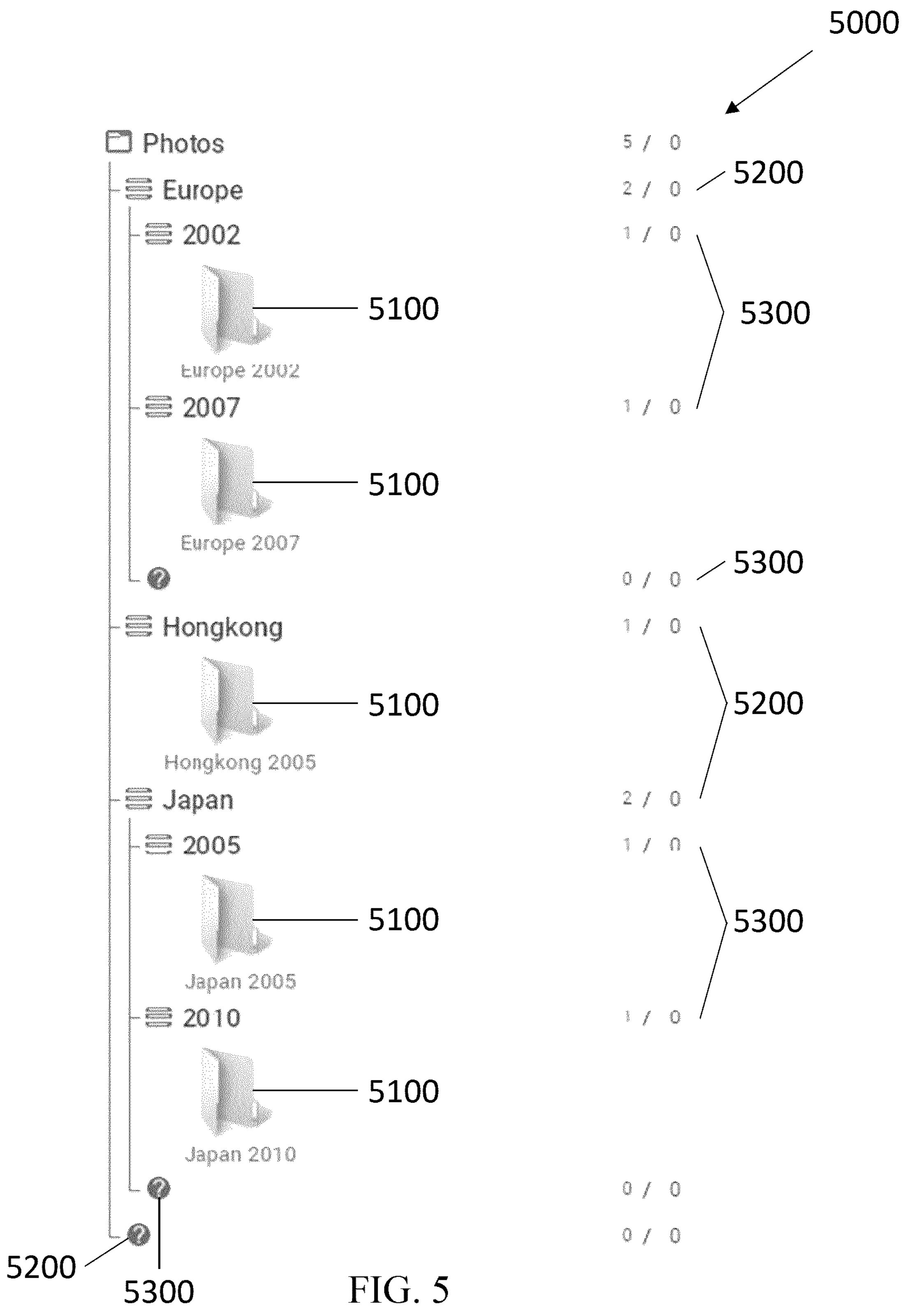
FIG. 5 shows an embodiment where every data item in the tree under a root node is reachable to users after every tree node is visited.
Figure 6A:
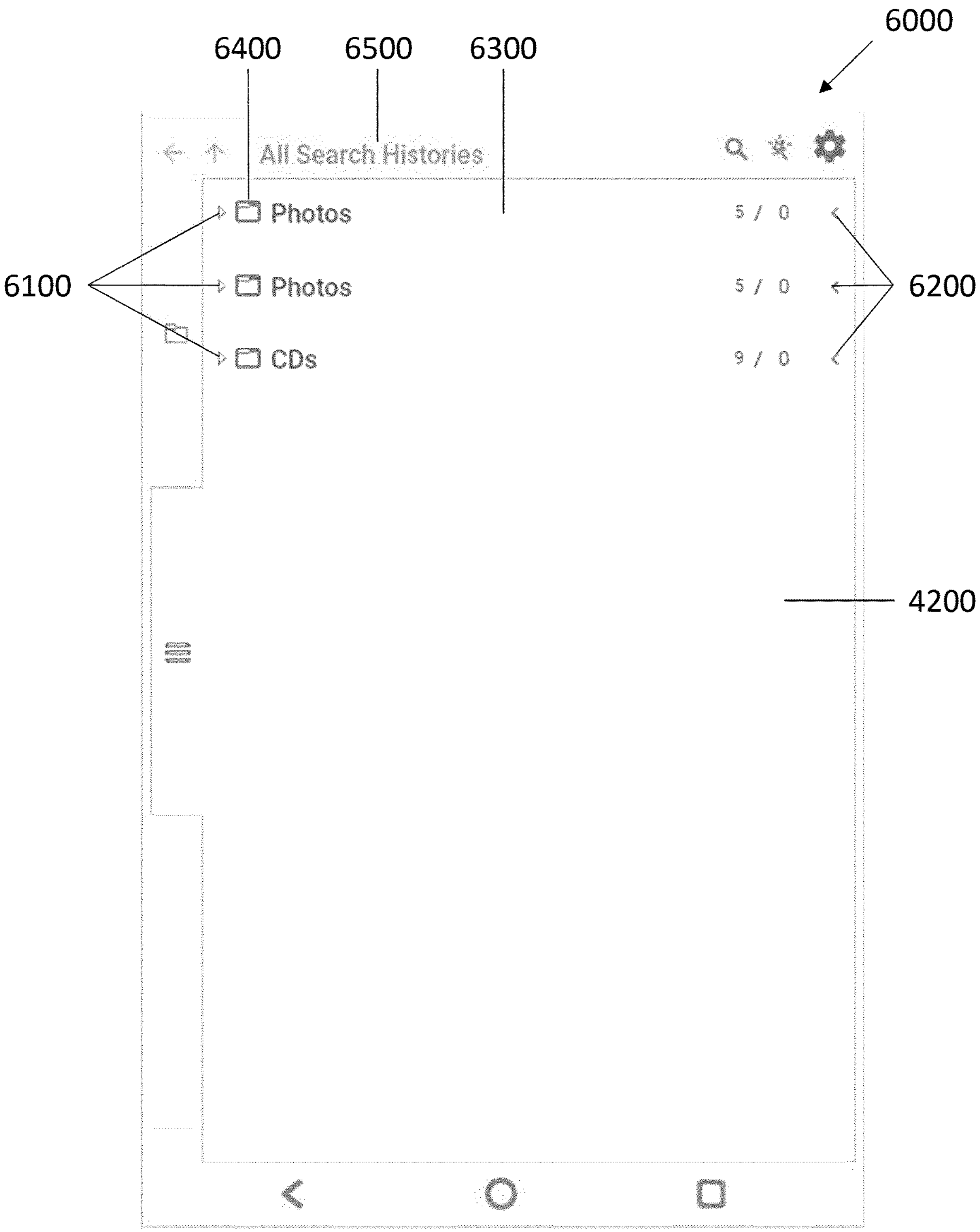
FIGS. 6(*a*) to 6(*n*) show embodiments of a single display panel with a sub-node toggle button, a search result toggle button, a select button, and an open button.
Figure 6B:
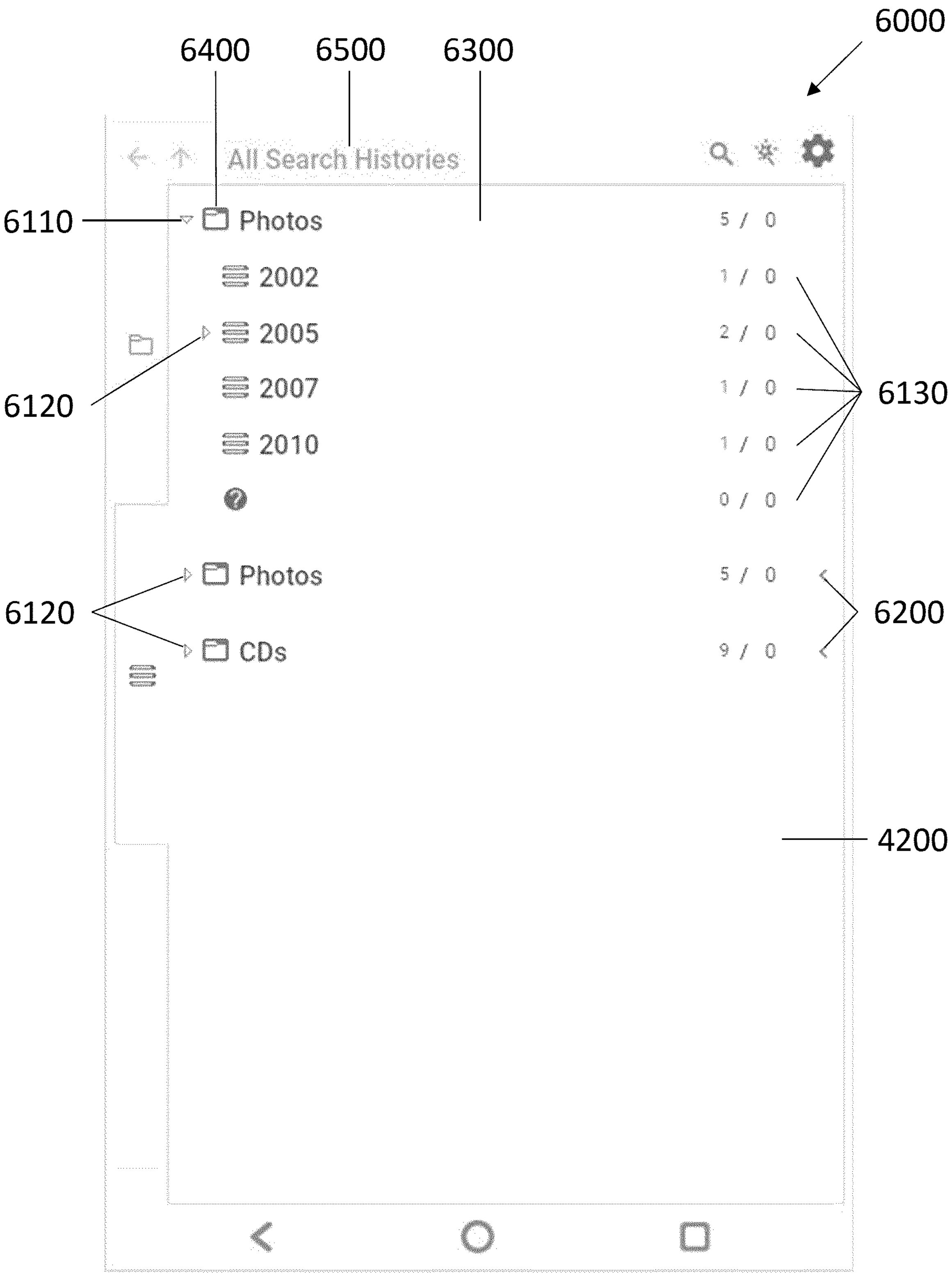
Figure 6C:
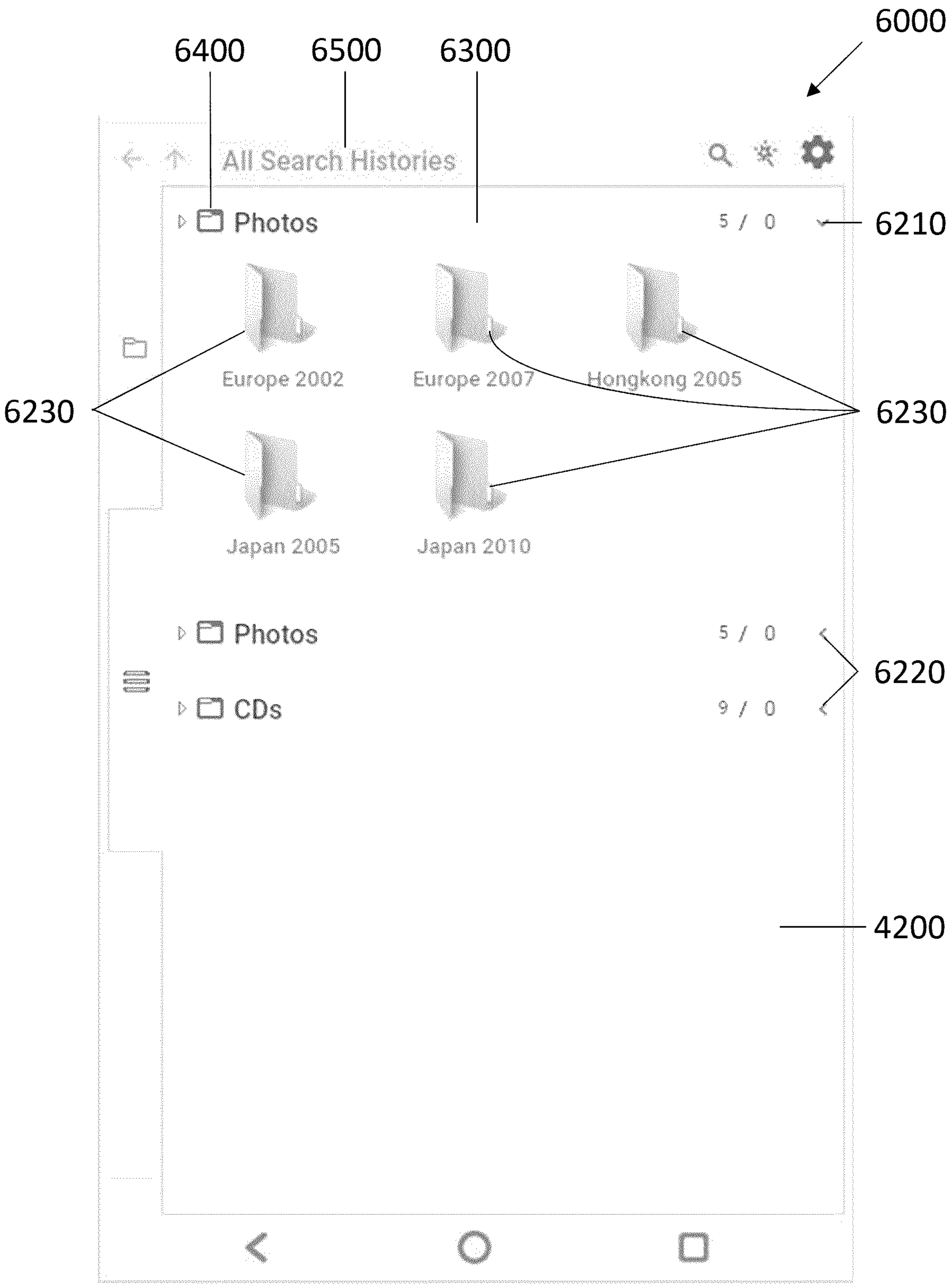
Figure 6D:
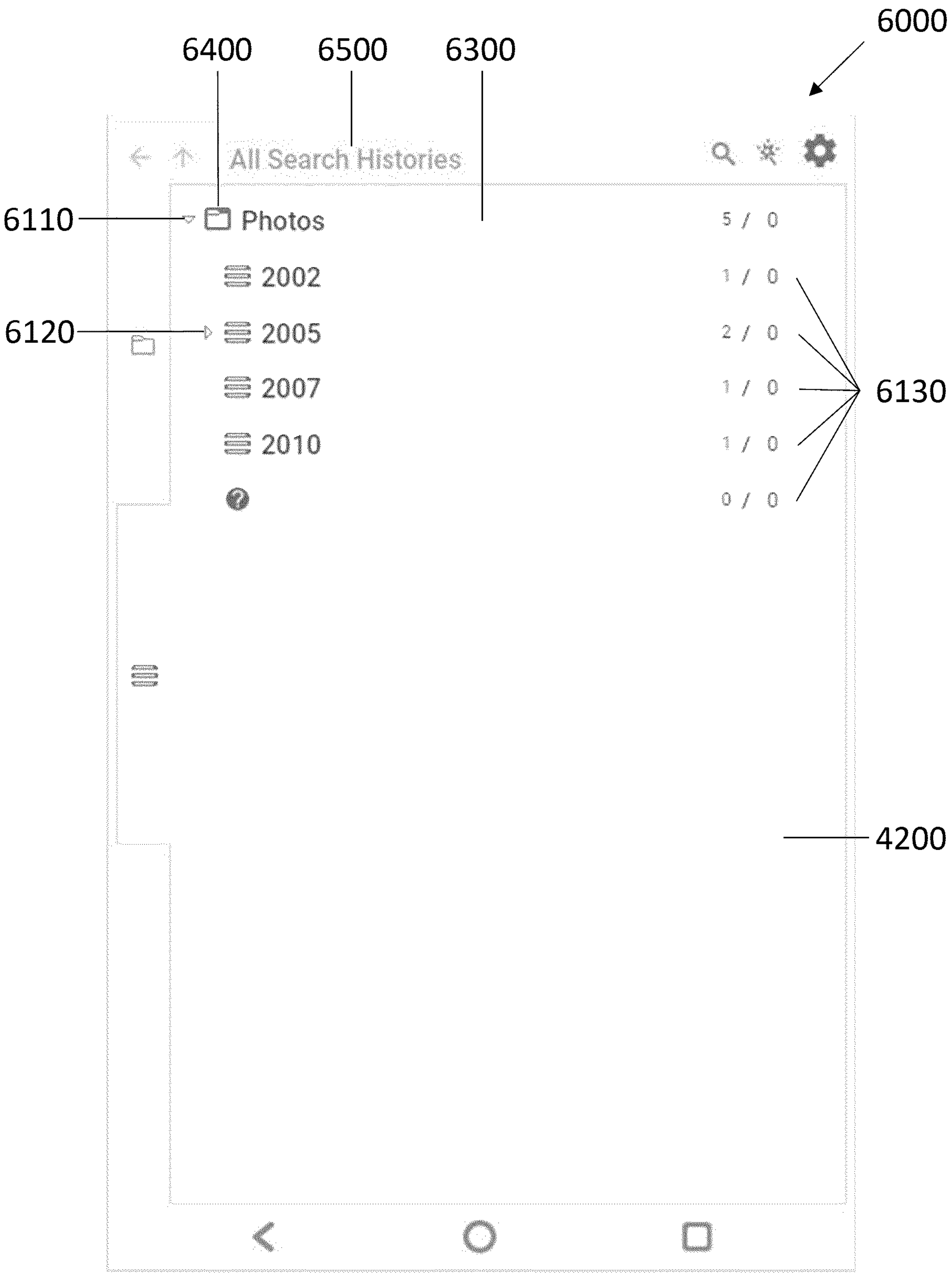
Figure 6E:
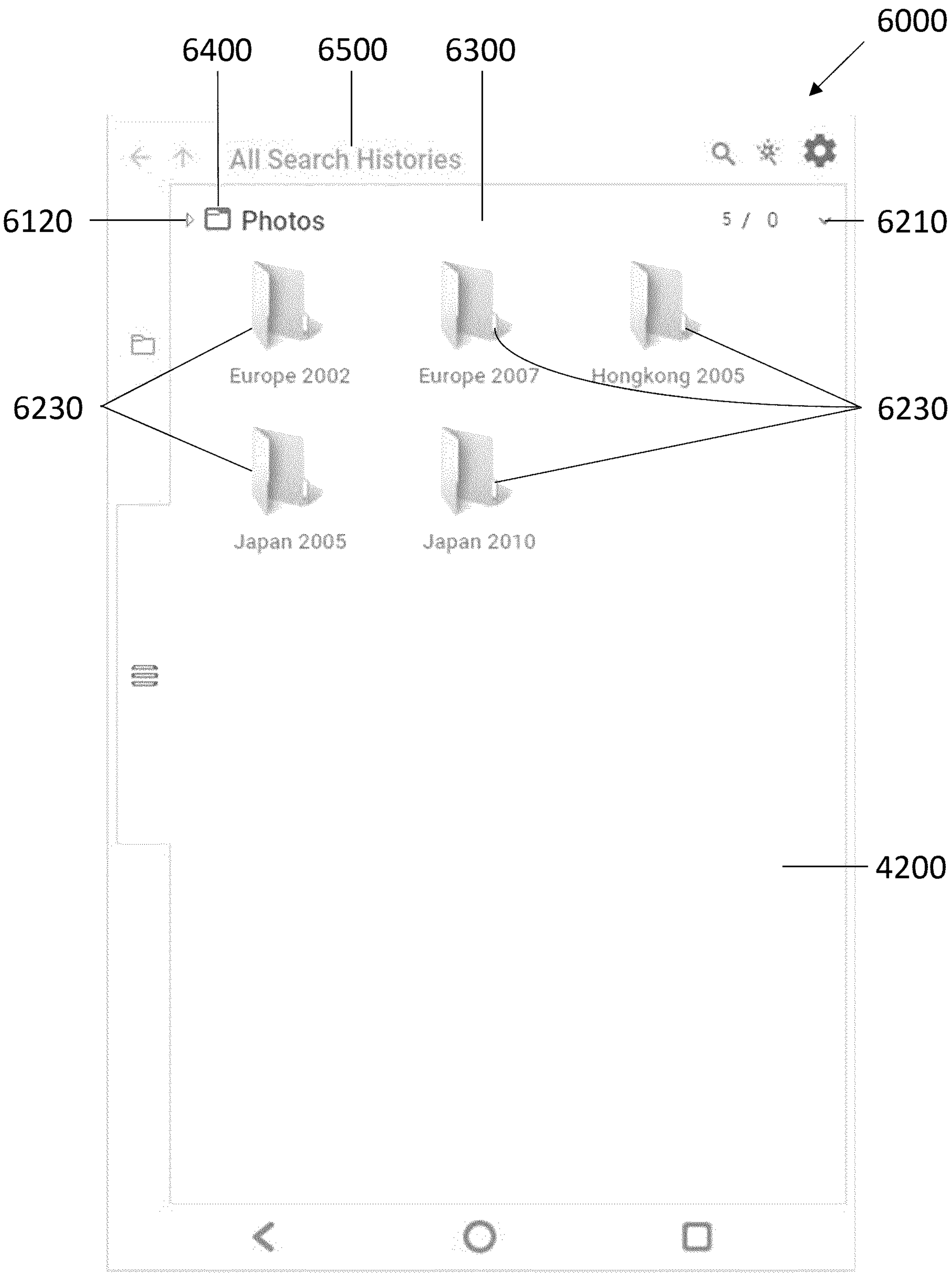
Figure 6F:
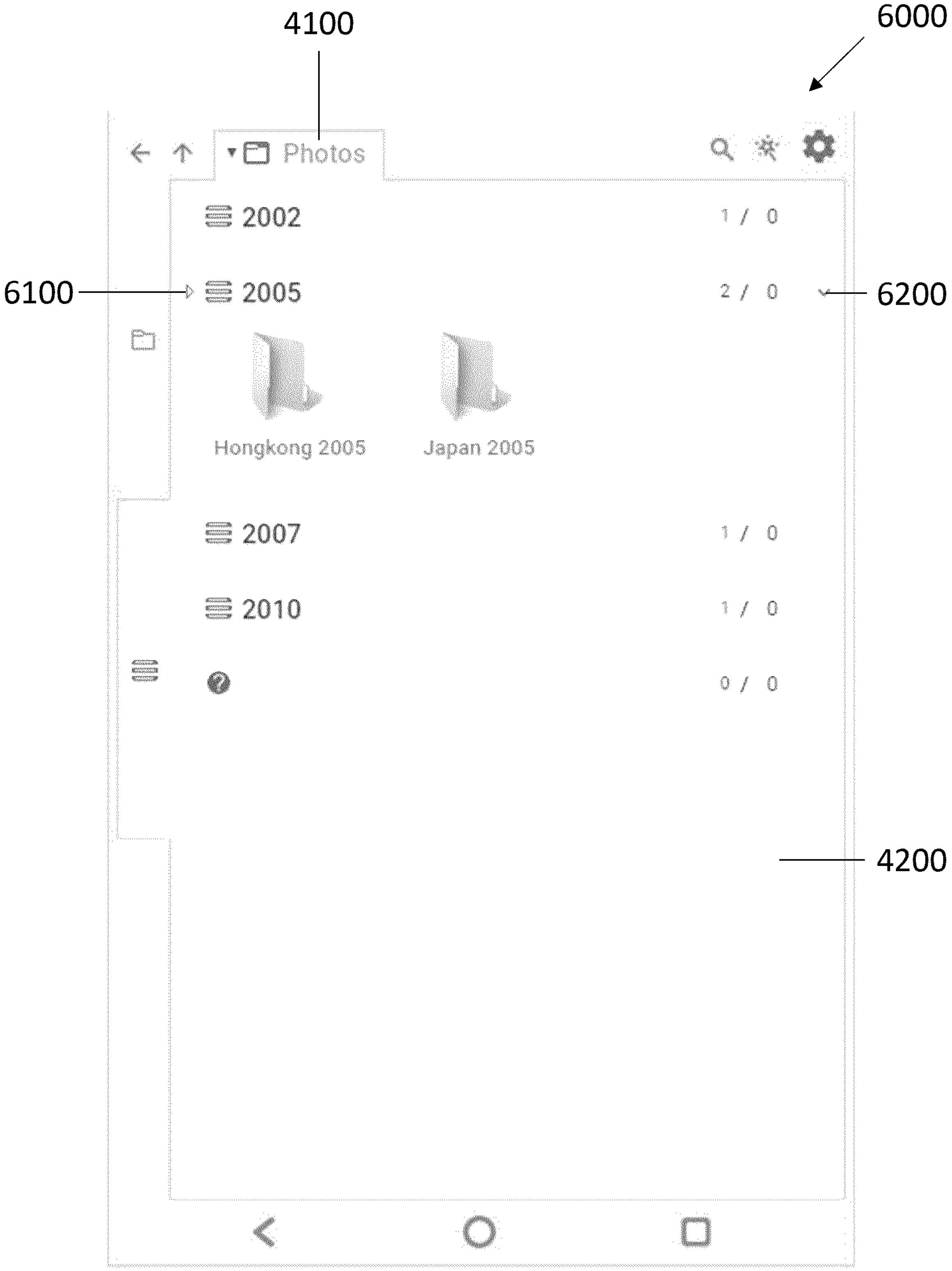
Figure 6G:
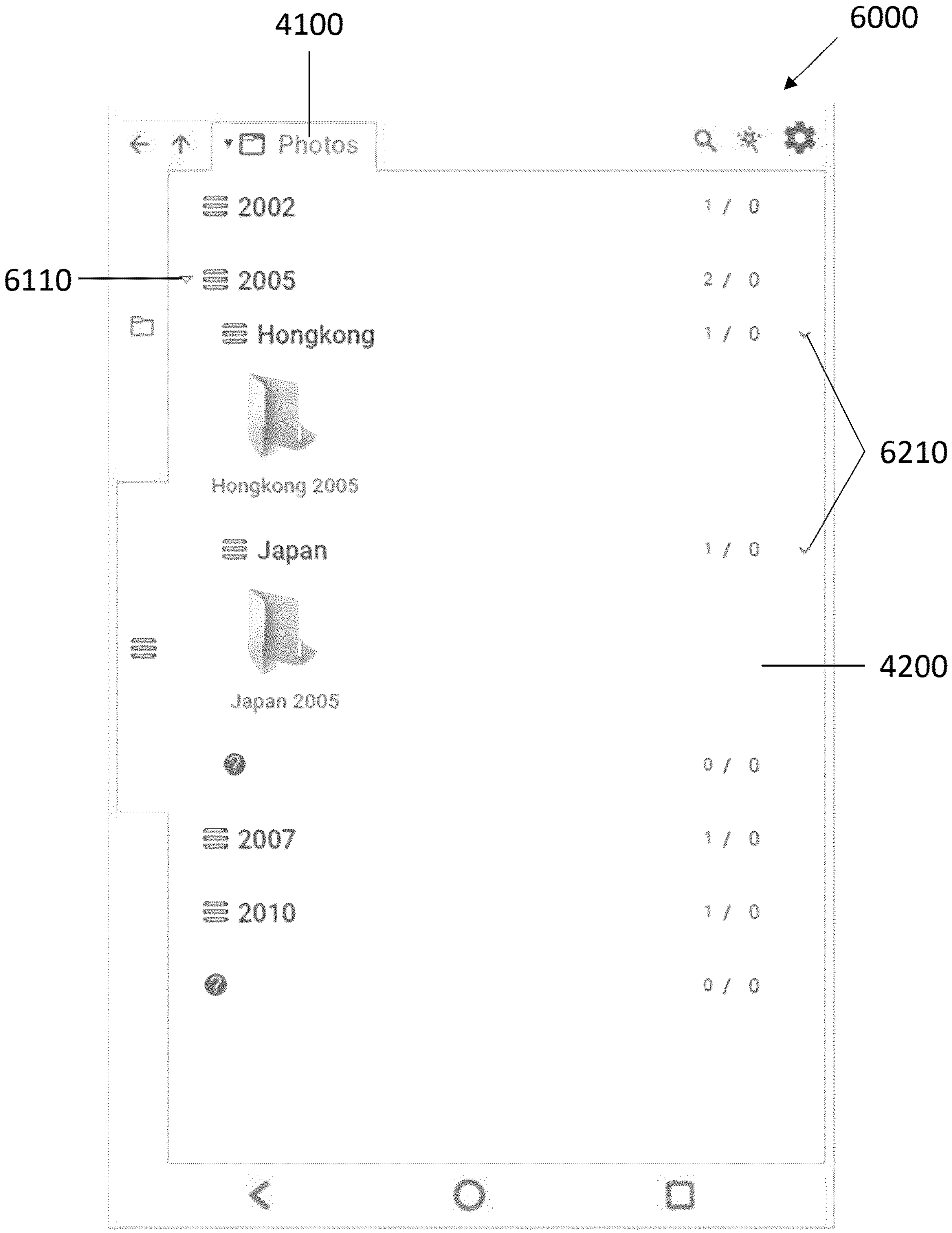
Figure 6H:
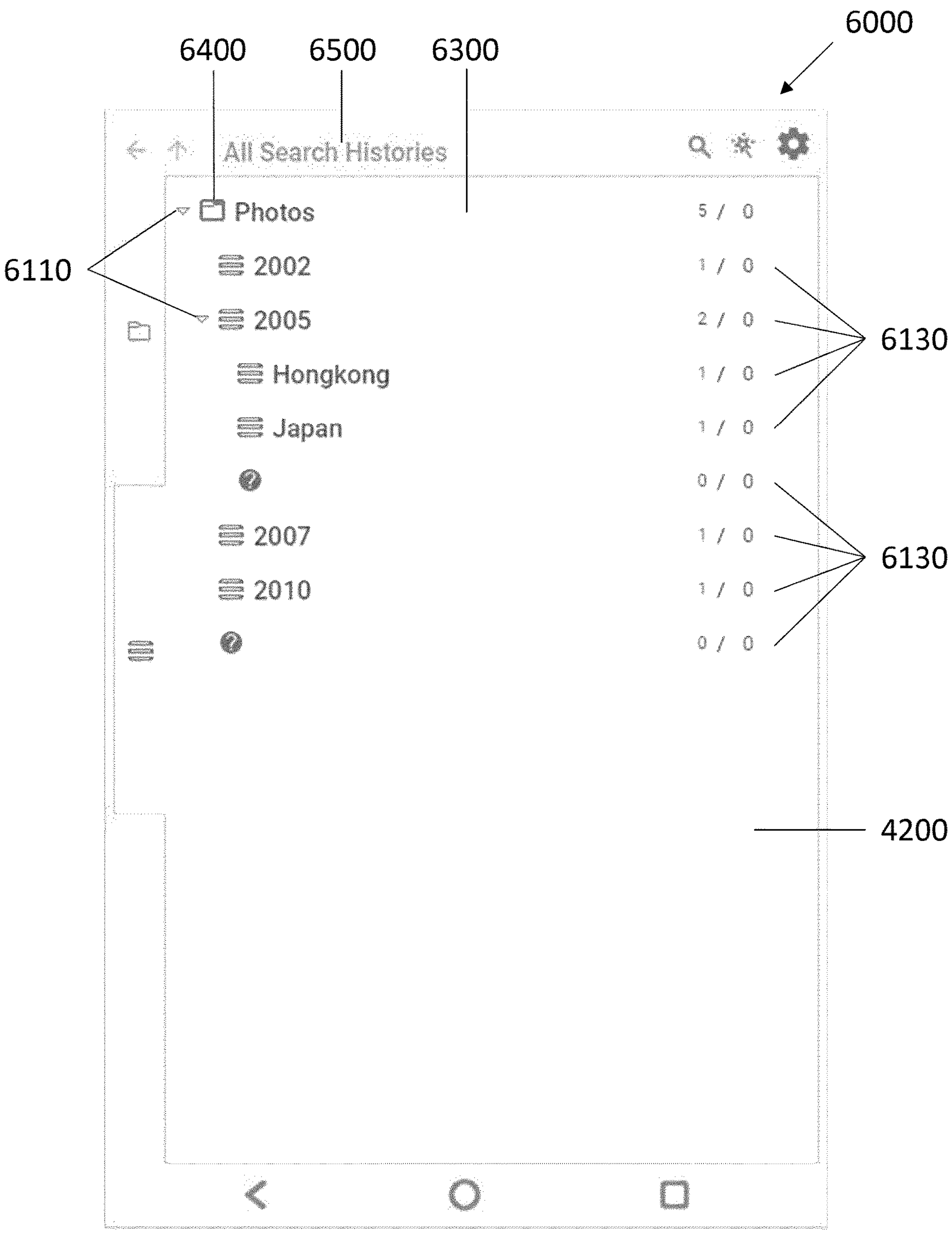
Figure 6I:
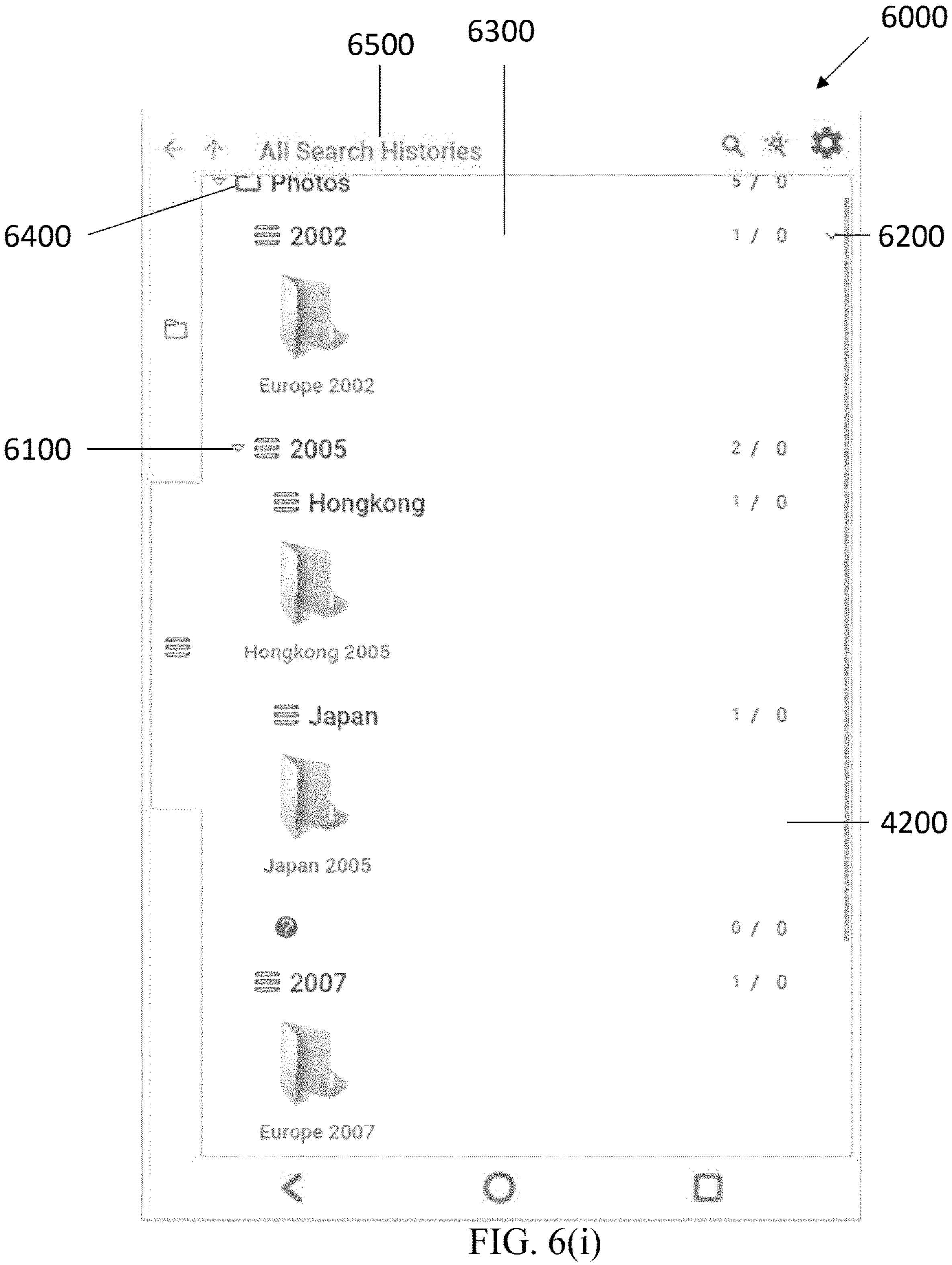
Figure 6J:
Figure 6K:
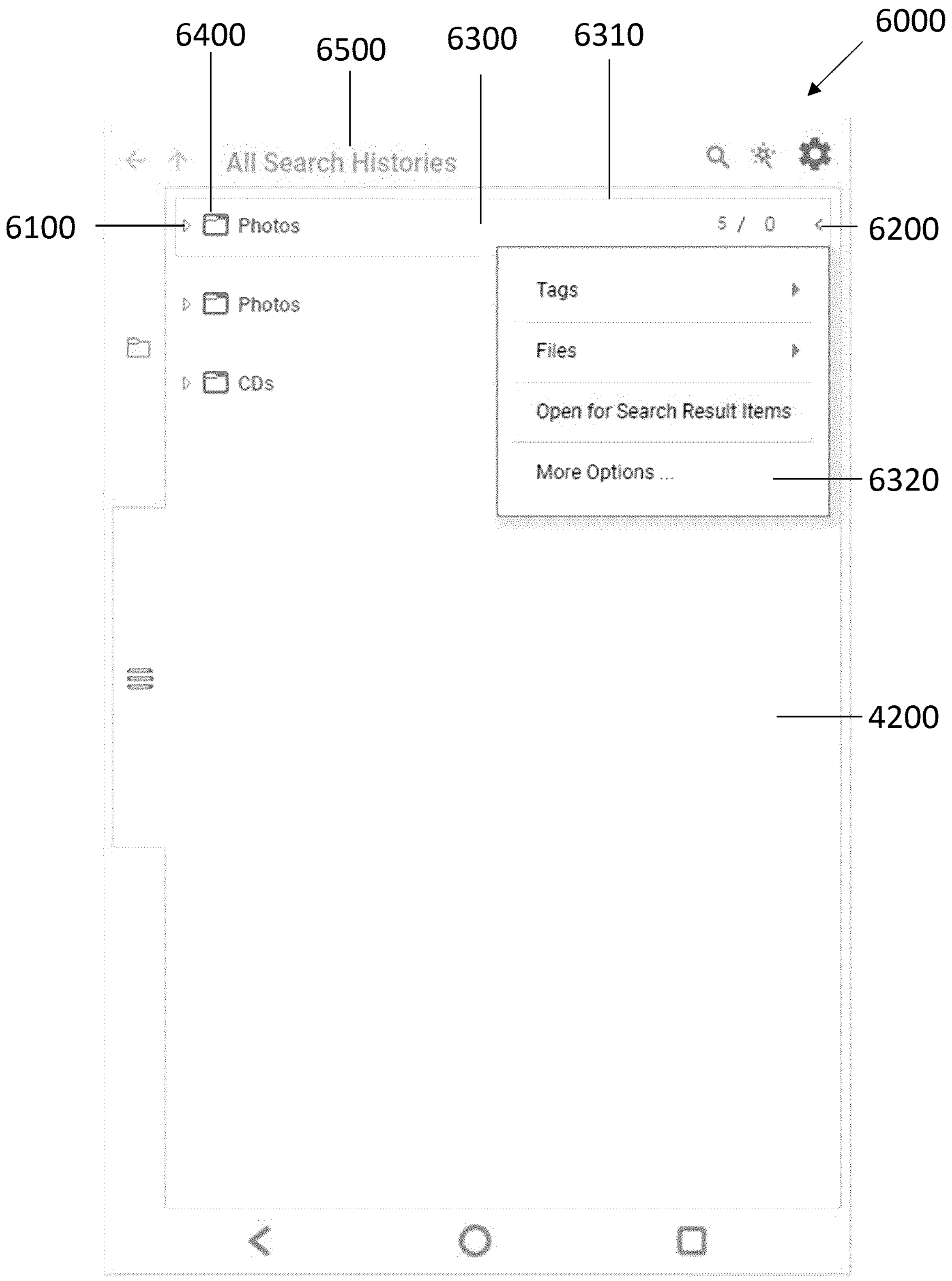
Figure 6L:
Figure 6M:
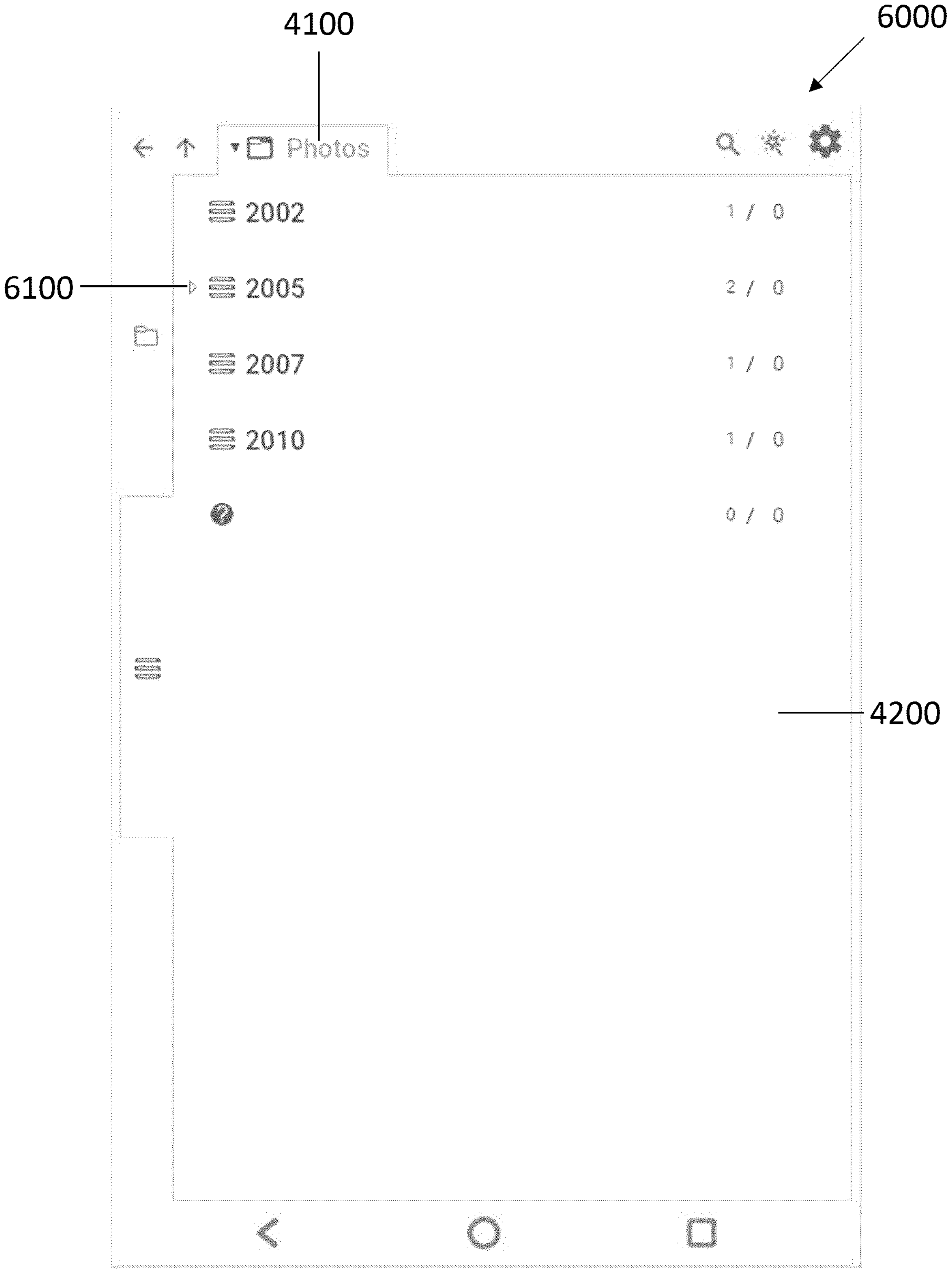
Figure 6N:
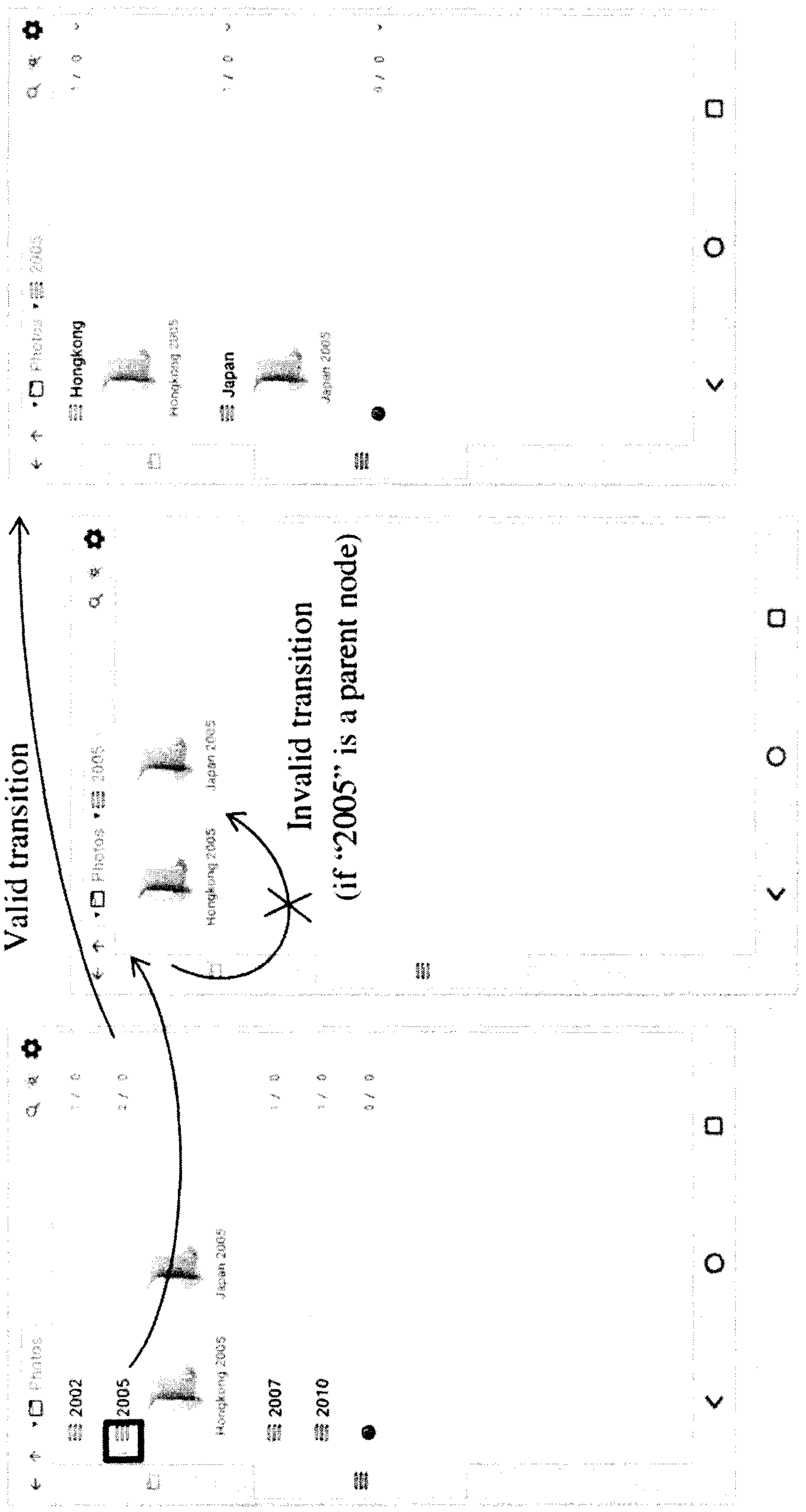
Figure 7A:
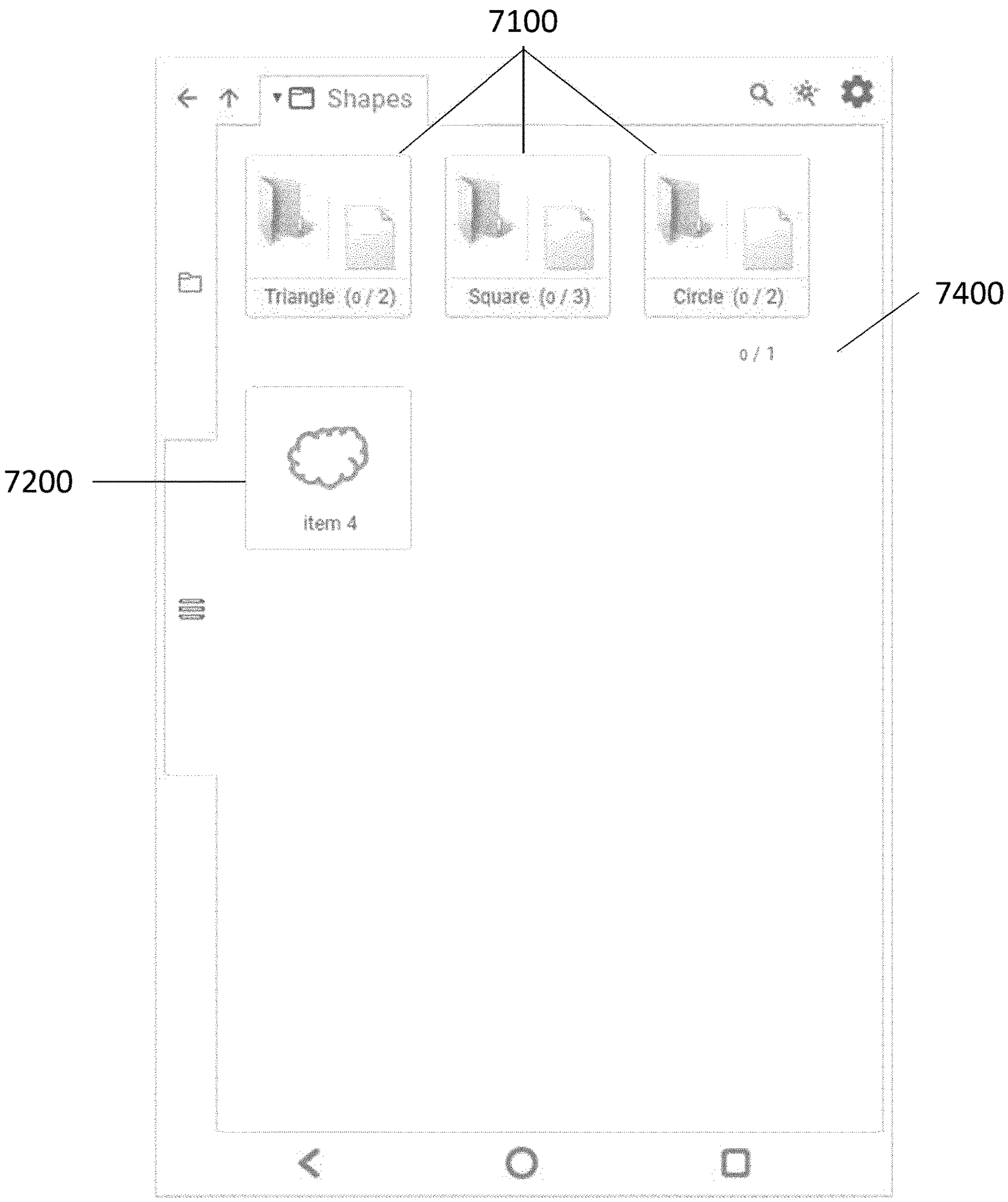
FIGS. 7(*a*) to 7(*d*) show content display embodiments for search groups and individual result items.
Figure 7B:
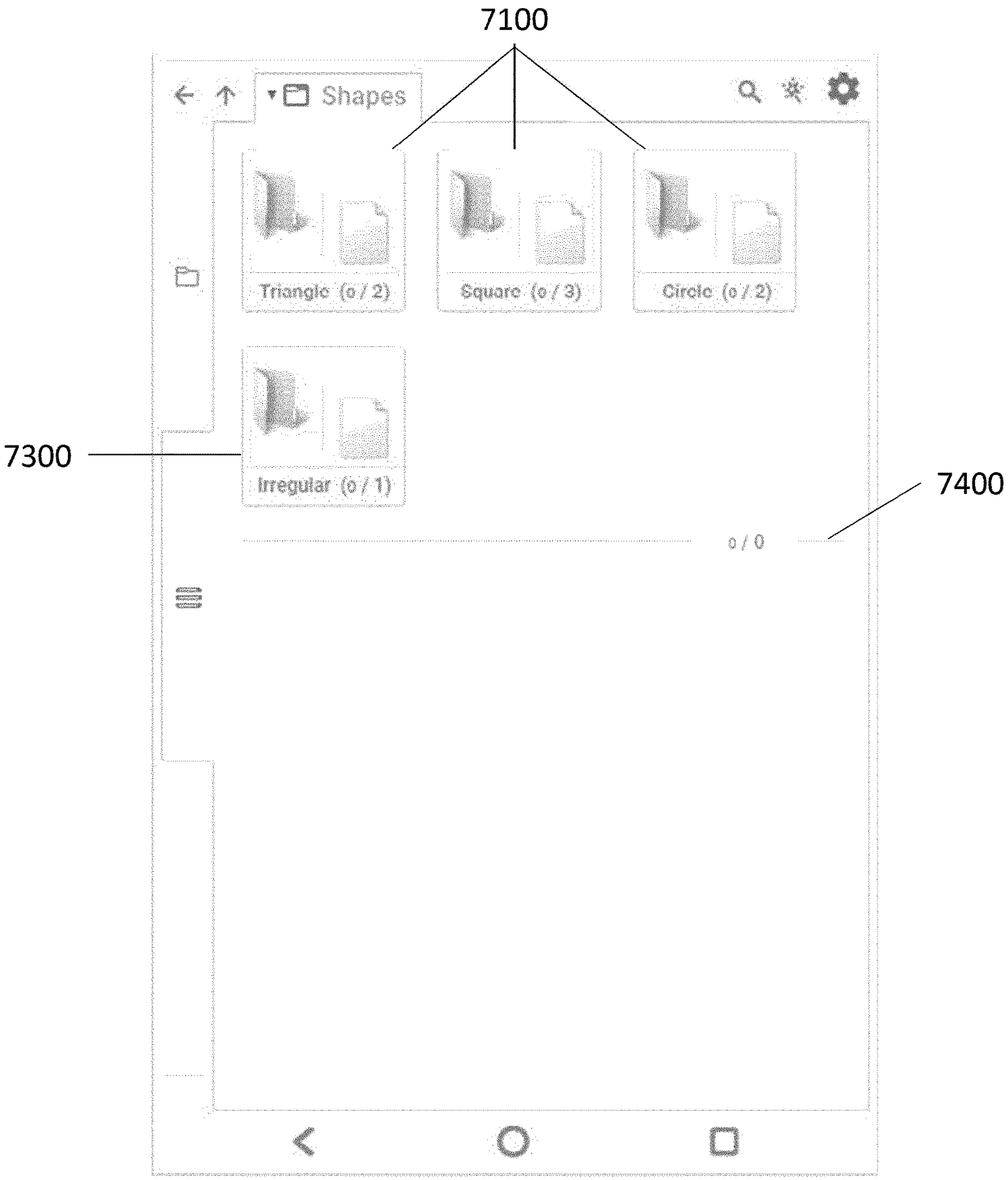
Figure 7C:
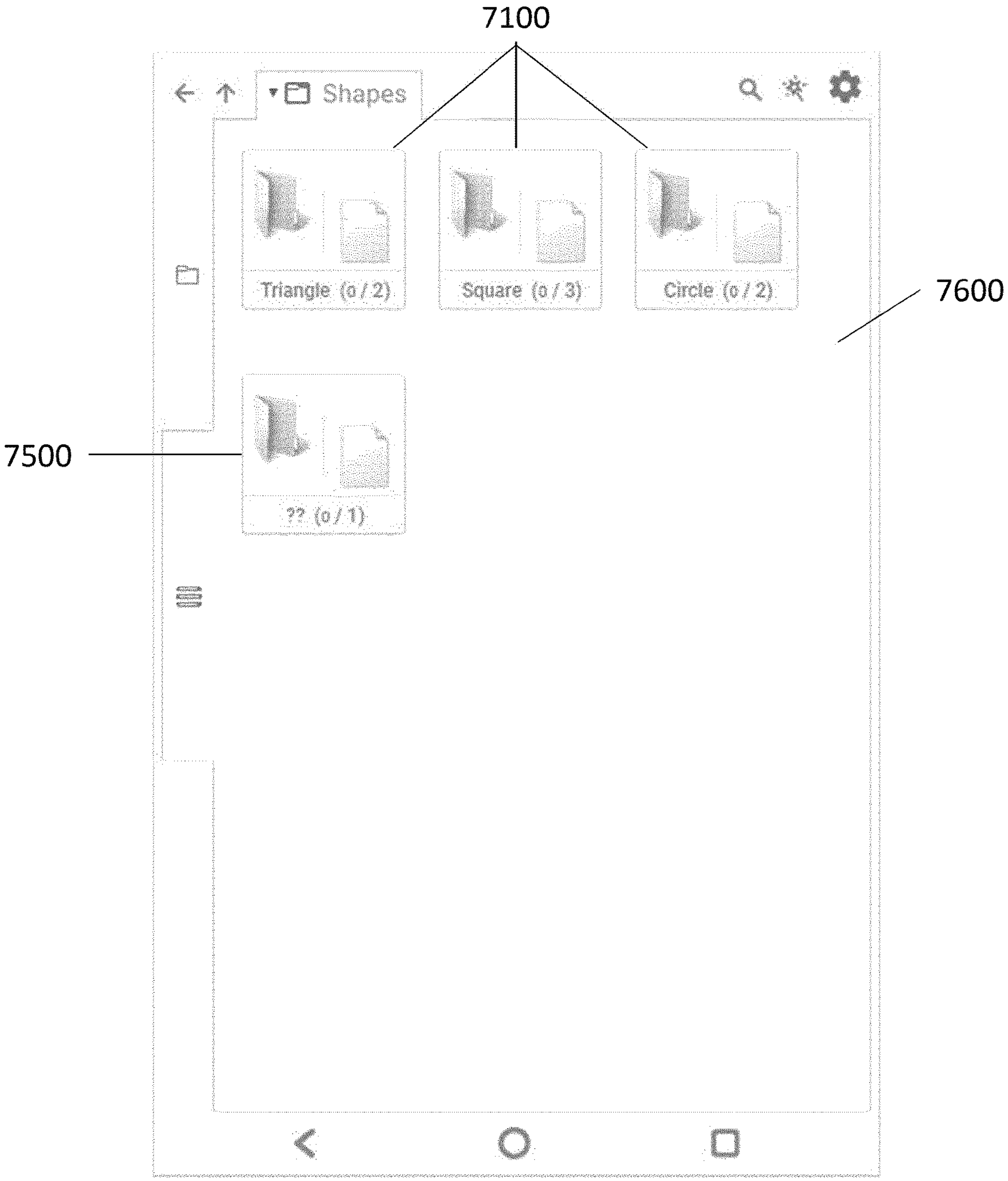
Figure 7D:
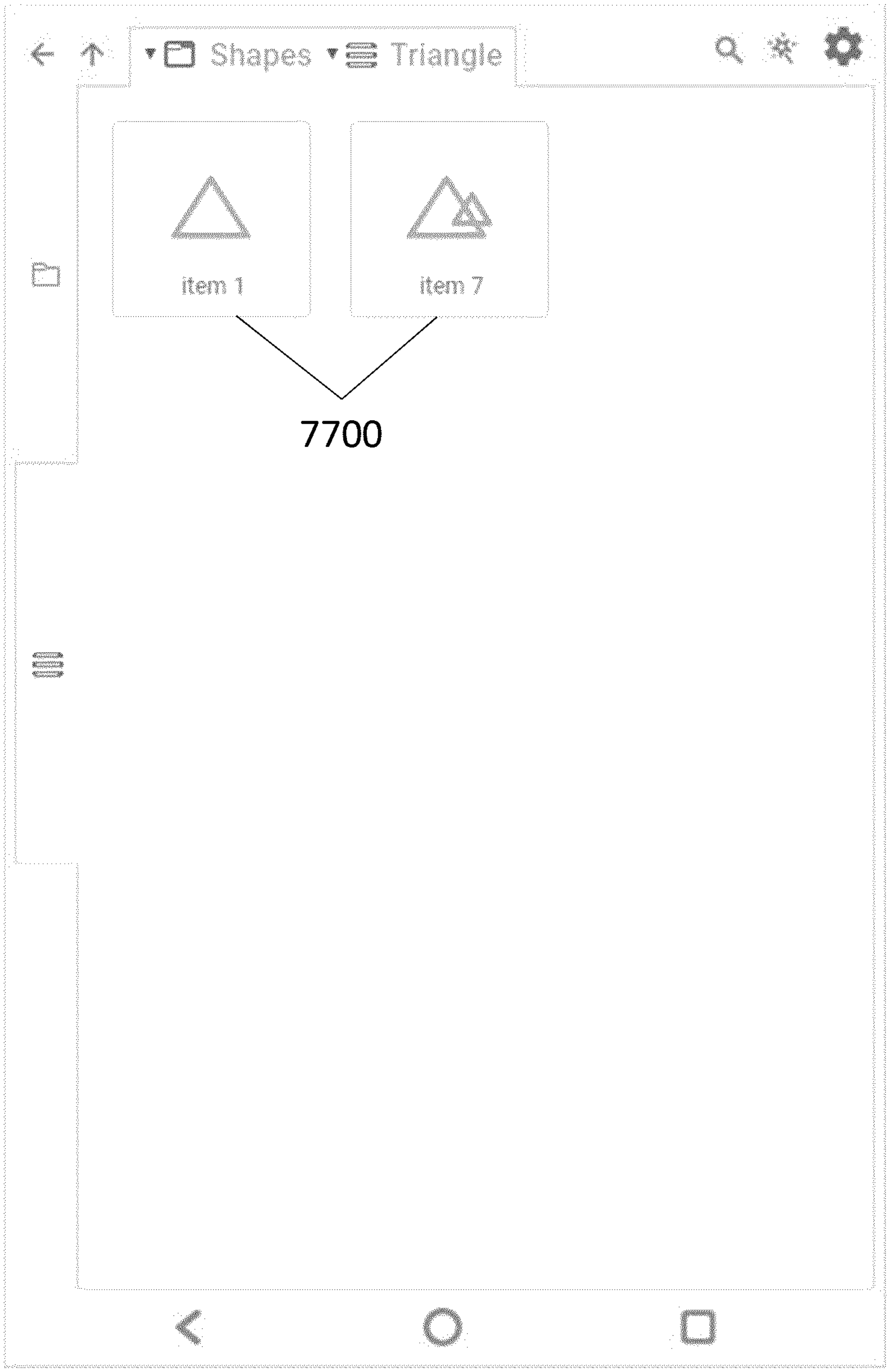

This general browsing mechanism makes every node reachable within a tree structure, as it also does for folder trees. According to an embodiment shown in FIG. 5, every data item in the tree 5000 under the root node is reachable to users after every tree node is visited even though the data items 5100 are visible only for leaf nodes (for example, leaf nodes at a second 5200 or third 5300 level).

However, while such conventions can make the set of search result items within a search tree available to the users as a whole, they lack key flexibilities for search tree management. In particular, users will not be able to tell if a search node has been further divided, until the node is opened and the current list of contents in the display area is lost. Furthermore, users will not be able to review the search result items for the sub-nodes side by side together because they are displayed separately in different screens. Thus, there is a need for additional controls for search tree presentations in a single display to improve user visibility and accessibility.

Functionalities for Single Panel Display

According to an embodiment, there are four functionalities for displaying a search tree node so that both the tree contents and the data contents of the node can be presented in a logical, meaningful, and accessible way using a single main display panel. According to an embodiment shown in FIG. 6(*a*), the four functionalities can be implemented using a single main display panel 6000 as buttons on a search tree node as a sub-node toggle button 6100, a search result toggle button 6200, a select button 6300, and an open button 6400, along with a display portion indicating the position or coordinate of the current node 6500 and a display portion showing the contents of the current node or position 4200. According to a further embodiment, the four buttons include three content-adjusting buttons and one highlighting-only button. According to an alternative embodiment, the four functionalities can be implemented as menu options or any other conventions provided by an operating system or the application program, alone or combined.

According to an embodiment shown in FIG. 6(*b*), 6100, when clicked or tapped, can be expanded 6110 or collapsed 6120 so that the sub-nodes 6130 for the node are visible or hidden under it without changing the position of the current node. According to an embodiment, 6100 doubles as an indicator for distinguishing a parent node from a leaf node by being absent from a leaf tree node. According to an embodiment, content below an expanded target node is shifted downwards.

According to an embodiment shown in FIG. 6(*c*), 6200, when clicked or tapped, can be expanded 6210 or collapsed 6220 so that the list of search result items 6230 for the node becomes visible or hidden under it without changing the position of the current node. According to an embodiment, 6200 is always visible, when appropriate for interface design, for the request corresponding to the search node to be evaluated against the data collection. According to an embodiment, if the search result list is empty, the system will relay the information to the users.

According to an embodiment, 6100 and 6200 are placed on a search node at the same time and implemented in a way such that the list of sub-nodes and the list of search result items of the node are mutually exclusive in that none or either of the lists are visible at different times, but never both at the same time for the same search node. According to a further embodiment shown in FIGS. 6(*d*) and 6(*e*), 6100 is absent or masked on a leaf tree node and always visible (either in the expanded 6110 or in the collapsed 6120 state) on a parent tree node and 6200 is only visible when 6100 is absent and is otherwise masked, or is visible but in the collapsed state.

According to an embodiment, if the user clicks on one button that is visible and in the collapsed state when the other button is in the expanded state, the system should fail the request with a warning message, or collapse the other button automatically to give way to user's request for expanding.

According to an embodiment, the toggle functionality of 6100 and 6200 is merged into a 3-state toggle that rotates between both collapsed, sub-node list expanded, and search result list expanded.

According to an embodiment, each node visible in a search tree has its own set of controls (for example, 6100 and 6200) so that the list of sub-nodes, if any, and the list of search result items of the node can be both collapsed or expanded one at a time under the group header for the search node.

According to an embodiment, at most one of 6100 and 6200 for the same node can be expanded at a time. According to a further embodiment, 6100 and 6200 can be expanded at the same time on different tree nodes in the same search tree structure. That is, any portion of the tree structure can be expanded or collapsed independently, existing contents only need to be shifted to make room or take room while another node is expanded or collapsed.

According to an embodiment, for 6100 and 6200 to be arranged on search tree nodes in a more natural way, the nodes are presented as group headers in a line-by-line view in the display panel. According to an alternative embodiment, a different presentation format, like a grid view for individual search result items, can be used for data files and folders to be presented as individual items under their own search group headers in the display panel. According to a further embodiment, data files and folders can be presented as shown in FIG. 6(*f*) and FIG. 6(*g*).

According to an embodiment, with 6100 and 6200 available on search nodes, the complete contents (the list of sub-nodes or the list of search result items) can be presented for any node in the display area in various forms. According to a further embodiment, these forms include search result items only (like in the 3500 data contents subpanel of a multi-display setup), nodes and sub-nodes (at a single or multiple hierarchical levels) only (like in the 3400 navigation subpanel of a multi-display setup), or as search result items grouped by corresponding sub-nodes. Embodiments of presentation forms are shown in FIG. 6(*e*), FIG. 6(*h*), and FIG. 6(*i*) which display all search result items in a plain list, complete tree structure, and all search result items grouped by tree structure, respectively.

According to an embodiment, 6300, when clicked or tapped, marks the node as selected by highlighting it. According to a further embodiment as shown in FIG. 6(*j*), the selected node is framed with a selection box 6310 to highlight it. According to an alternative embodiment, the selected node may be highlighted through other visual identifiers, such as symbol or color-based schemes. According to an embodiment, 6300 enables the display of additional information and options. According to a further embodiment, additional information and options include context menu 6320 options, like as shown in FIG. 6(*k*), and auxiliary display panels 6330, like as shown in FIG. 6(*l*), for the detailed contents of the selected item. According to a further embodiment, the auxiliary display panel can show a search node or an individual data item. According to a further embodiment, the auxiliary display panel is displayed separately from the dominating main display area.

According to an embodiment, 6400, when clicked or tapped, conventionally "opens" the node so that, after everything previously in display gets completely erased, the list of sub-nodes (if the node is a parent node) or the list of search result items (if the node is a leaf node) will get displayed in the main display area 4200. Clicking or tapping 6400 also updates the position indicator 4100 so that the path for the current node gets displayed. According to an embodiment, the current node is presented in two forms in two places: its position is displayed as a position or coordinate indicator or header 4100 so that users can keep track and maintain awareness of their locations within the search tree structures, and its contents are displayed in the main display area 4200, where details about the node is made available. According to an embodiment, after a parent search node is opened using 6400 and its sub-node list gets displayed, an example of which is shown in FIG. 6(*m*), details about individual sub-nodes from the list can be displayed using 6100 and 6200, when applicable, on the nodes manually by the users, for example to display details as shown in FIG. 6(*g*).

According to an embodiment, search trees organize both the related search requests and their corresponding search result items together using a single hierarchical structure, and they can be presented and browsed in a single main display panel setup using controls and conventions discussed in this section.

According to an embodiment, the functionalities do not need to be implemented as separate individual buttons. According to a further embodiment, the functionalities are triggered by different control gestures, such as right-click, double-click, long-tap, or screen-swipe. According to a further embodiment, 6300 and 6400 can use a single (i.e. the same) control-area, but be distinguished by single-click (for selection, for example) and double-clock (for open), or by long-tap and tap. According to a further embodiment, 6100 and 6200 may be combined into a 3-state toggle.

According to an embodiment, the search result items for a parent search node (with sub-nodes) cannot be displayed in a plain list in the main display panel without the items being grouped by the sub-nodes, as shown in FIG. 6(*n*). According to an embodiment, the list of sub-nodes always preempts the list of search result items when a parent node is opened. After the parent node is opened, it becomes the current node, but the current node, which is being presented as the position indicator outside the main display panel, does not have 6200 available on itself for the list of search result items of its own to get manually displayed. According to an embodiment, 6200 is only available on sub-nodes of the current node in the main display panel and not the current node itself, according to the presentation conventions.

According to an embodiment, an "open for search results" option, in addition to the default "open for sub-node list" is made available on the selected parent node.

Making Search Tree Node Presentations Even More Folder-Like

According to an embodiment, the search tree structures can be browsed in an in-place single-display panel interface using several conventions. These conventions include root nodes being initially displayed as a list of collapsed groups with their own contents hidden. These conventions also include a group or node (and recursively any sub-group or sub-node) that can be opened for its contents to be displayed (after the current contents in the display area are cleared) as either a list of collapsed groups with their own contents hidden (one per sub-node) if the node is a parent node or as a list of individual search result items if the node is a leaf node. These conventions further include a collapsed group being manually "expanded" for its contents, the list of sub-nodes (if any) or the list of search result items, to be displayed under the group header with other node(s) and group(s) in the display area being shifted accordingly, if additional controls are made available.

According to an embodiment, the open and "expand" functionalities may be combined to alter data presentation. According to a further embodiment, after the list of sub-nodes are displayed as collapsed groups, the unsorted sub-node can be expanded to have it displayed as a list of individual search result items, if the unsorted node is a leaf node, or otherwise do nothing further.

According to an embodiment, the resulting content presentations of the current node depend on the characteristics of search queries and the data collections. According to a further embodiment, content can be displayed as search groups mixed with individual result items as shown in FIG. 7(*a*), wherein all sorted sub-nodes are presented as a list of collapsed groups 7100 and the unsorted sub-node is presented as a list of individual search result items 7200, if the unsorted sub-node is a leaf node with a non-empty search result set. According to an embodiment, content can be displayed only as collapsed search groups, like as shown in FIG. 7(*b*) wherein all sorted sub-nodes are displayed as a list of collapsed groups 7100 and the unsorted as an expanded but empty group 7300, if the unsorted sub-node is a leaf node with an empty search result set. A dividing line indicator 7400 is between the collapsed sorted group 7100 and the either list of individual search results 7200 or the expanded unsorted group 7300 of the embodiments shown in FIGS. 7(*a*) and 7(*b*), respectively, and doubles as the header for the unsorted group. According to an embodiment, content can be displayed only as collapsed search groups in an alternative form, like as shown in FIG. 7(*c*) wherein all the sub-nodes, including the unsorted sub-node, are displayed as a list of collapsed groups (7100 for sorted groups and 7500 for the unsorted group), if the unsorted sub-node is a parent node (with a list of sub-nodes) itself, and where there is a dividing line or indicator 7600 between sorted groups and the unsorted group. According to an embodiment, content can be displayed only as individual search result items, like as shown in FIG. 7(*d*) wherein all search results are presented as a list of individual data items 7700, if the current node is a leaf node.

According to an embodiment, unsorted groups are created and maintained automatically by the system and not specified by the users, so presenting them the same way as other user-defined sorted groups may surprise or confuse some users before everybody gets used to the notions. By always expanding the unsorted sub-node and displaying its search result items individually, this node effectively stops being presented as a collapsed group, and all the collapsed search nodes in the main display area are now user-defined groups—making the search tree presentations more natural and easier to adapt to for most users. According to the embodiment shown in FIG. 7(*a*), the optional dividing line 7400, as the group header or indicator with aggregation information, can make the search result items under the unsorted node stand out.

According to an embodiment, after the parent search node is completely sorted into user-defined sub-search-nodes, its unsorted sub-node becomes empty and such an empty sub-group visually disappears from the display area, after the search group icon is expanded and replaced by an empty set of icons for individual items. According to the embodiment shown in FIG. 7(*b*), an "Irregular" sorted group collects all the items that do not fit in the other sorted groups for "Triangle", "Square", and "Circle", making the unsorted sub-group empty under the parent group for "Shapes". According to a further embodiment, an optional dividing line or indicator 7400 can be displayed as a header for the empty unsorted group.

According to an embodiment, if the unsorted sub-node is a parent node itself, no matter if its search result set is empty or not, it is treated the same way as any other sorted (collapsed) nodes or groups for its own list of sub-nodes to get reached and then opened and browsed. In this case, the unsorted node (as a collapsed group) will not surprise nor confuse the users among all other collapsed sorted groups because it has also been user-defined too, that is, the user understands the group and then has it further divided for their own needs. According to the embodiment shown in FIG. 7(*c*), the contents for "Shapes" is shown as a list of search groups, assuming that the unsorted sub-node has been further divided into sub-groups like "singles", "doubles", etc. An optional dividing line or indicator 7600, different from 7400, helps the unsorted group get distinguished more easily from all the other sorted groups.

According to an embodiment, when a leaf sorted node or group (with no sub-node or group of its own) is opened, the search result items can now get displayed individually, like as shown in FIG. 7(*d*). No further browsing or exploring of the search tree structure is needed or allowed or possible any more after this point. According to an embodiment, individual data items in display can still be opened the same way as individual files or file folders are opened in the existing file management systems. According to an embodiment, search groups and data have similar presentation formats, so that users do not need to distinguish the two types and be forced to choose different open operations based on if it is a search group or an individual data item (i.e., a file or a file folder) when they interact with icons for the groups or the items in an interface for search tree management.

According to an embodiment, the presentations for a search node, with its unsorted sub-node always being expanded, become visually similar to the three presentation scenarios for a storage folder in the file management systems, namely a folder with sub-folders only, a folder with files only, and a folder with both sub-folders and files, especially so if the optional dividing line indicator for the unsorted group is removed. According to an embodiment, the logical presentations for a search node, with its unsorted leaf sub-node always being expanded, match with these three scenarios too. In particular, there can be: a search node that has been completely divided into user-defined sub-groups, including the unsorted sub-group, which is either a leaf node but empty already or a parent node with sub-groups of its own, no matter if the search results are empty or not; a search node that has not been divided, so only the set of individual search result items is displayed; and a search node that has been divided into sub-groups, but for which there are still some items that do not belong to any of the sub-groups, just like individual files inside a parent folder that do not belong to any of the sub-folders, so they get placed under the parent but outside of any sorted sub-groups.

According to an embodiment, search trees are built for data collections to get divided into search groups for managing and accessing tasks, and the unsorted groups are like "to-do" lists for data items to stay on only temporarily before they get "crossed-out" from the list once being assigned into a sorted group or groups.

According to an embodiment, by always expanding the unsorted node and displaying its search result items individually, it is easier for users to make direct connections between the individual items from the "to-do" list and all the existing search groups when they are visible together, or, for the users to realize that a particular item within the "to-do" list does not fit in any of the existing groups and a new group needs to be created for it.

According to an embodiment, by keeping the node expanded with individual items (if any) always visible, users will also be able to notice it immediately after the unsorted group becomes empty when all items in the collection (parent node) are all properly divided or grouped, so the expanded-always unsorted node can thus double as a reminder or indicator upon the completion of the grouping tasks for its parent.

According to an embodiment, when the system generated and maintained unsorted sub-node stops being presented as a collapsed group among other user-defined groups, search node presentations become visually, logically, functionally, and operationally close to folder tree presentations. According to a further embodiment, if the individual data items also take similar presentation formats as the search groups, opening a folder and opening a search group in the same interface, and the presentations after either is opened, it will hardly be of any differences to a user since this short-cut for the leaf unsorted sub-group to always get automatically expanded and for its individual search result items to get mixed with the collapsed sorted group presentations not only makes search tree node presentations more intuitive to most users and provides convenience during tree management tasks, but also allows search tree browsing and managing procedure to merge with the existing folder tree presentations in a consistent unified interface. According to a further embodiment, there is a search result toggle button on a folder with the functionality of 6200.

Figure 8:
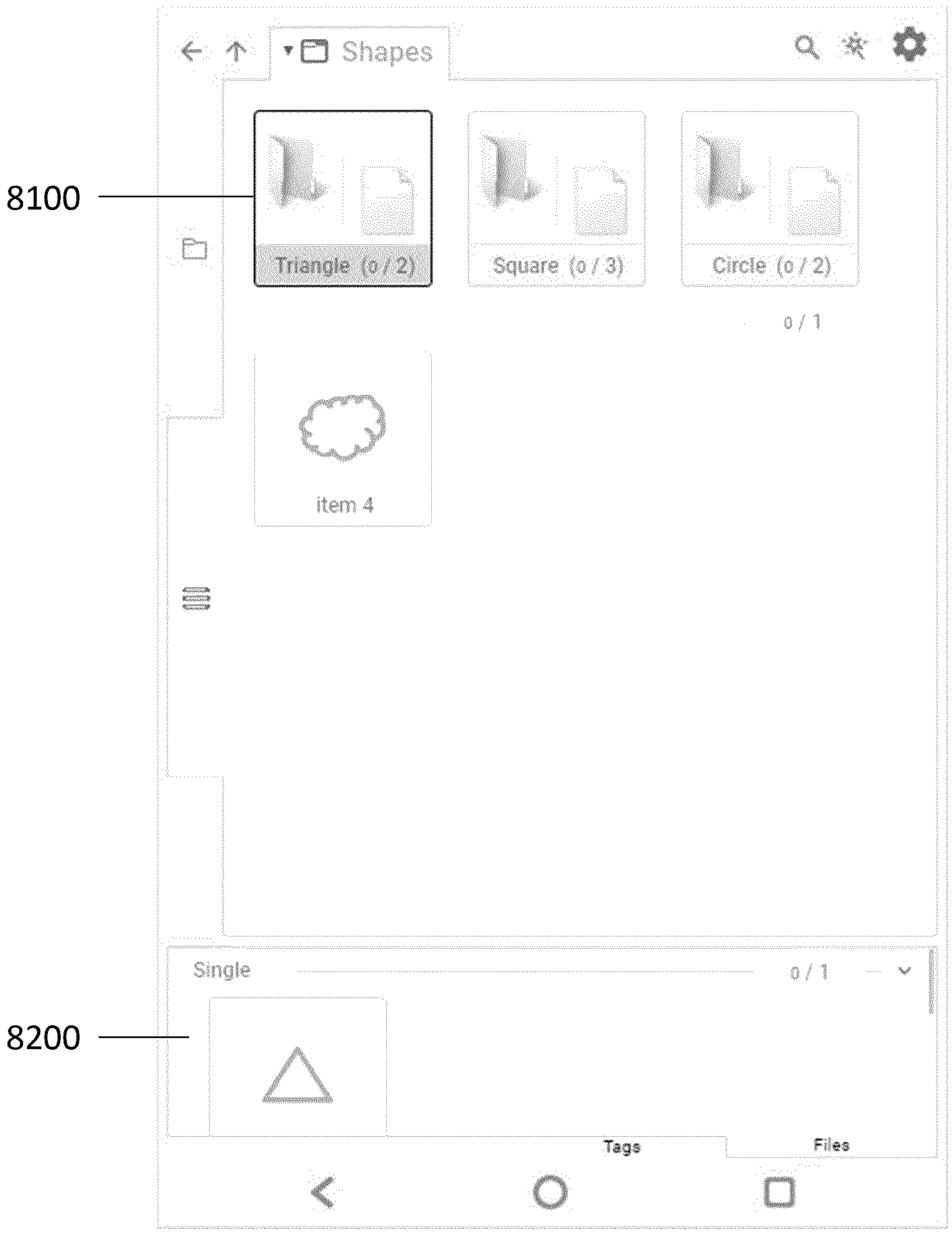
FIG. 8 shows an embodiment with a select functionality in the form of a button and an auxiliary detail-displaying subpanel.

According to an embodiment as shown in FIG. 8, a select functionality or button 8100 and an auxiliary detail-displaying subpanel 8200 permit users to peek at detailed contents or conduct more complicated managing tasks, like grouping, without the search node actually being opened.

Figure 9A:
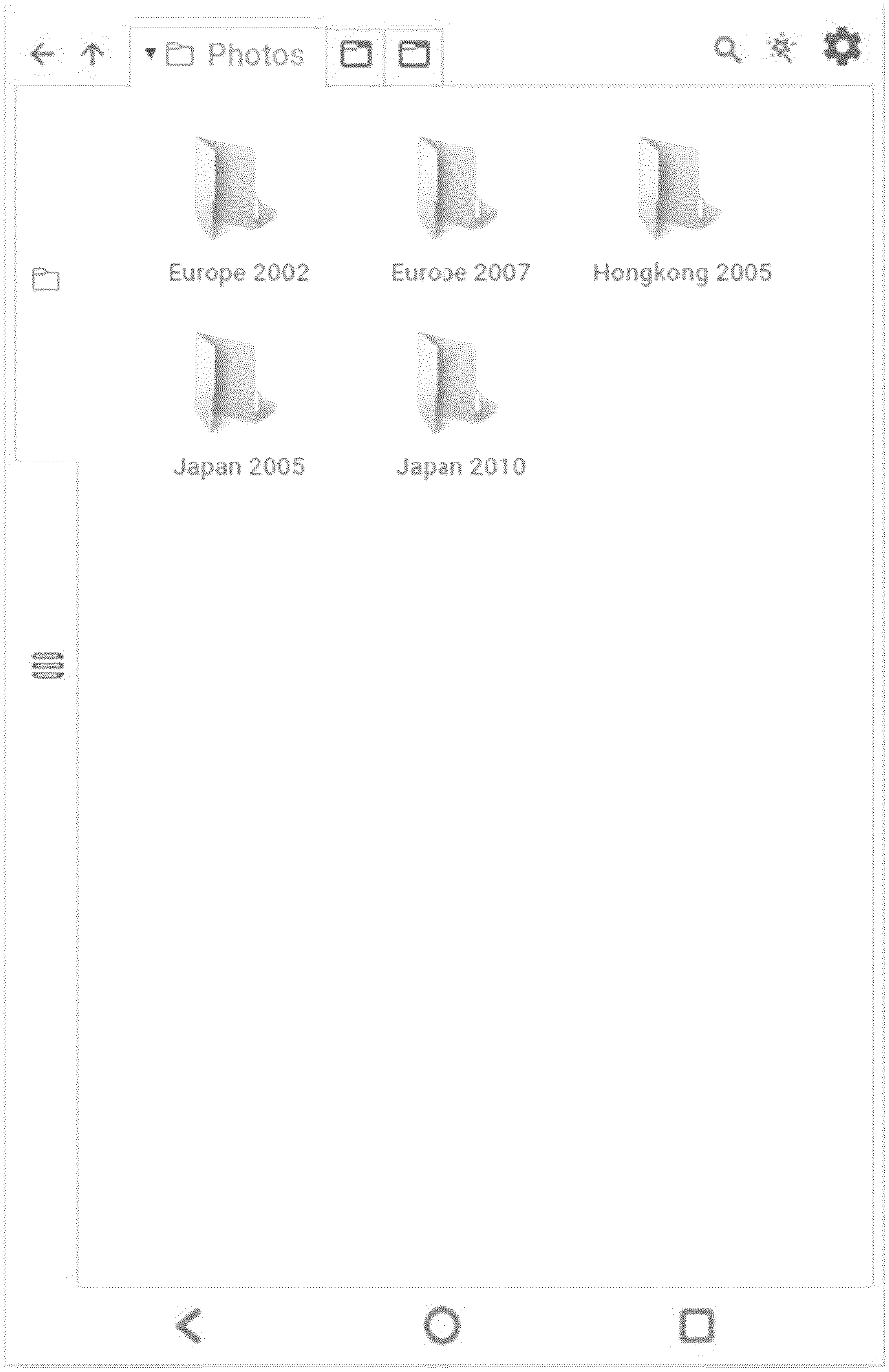
FIGS. 9(*a*) to 9(*c*) show presentation embodiments of folders and search nodes in terms of their contents.
Figure 9B:
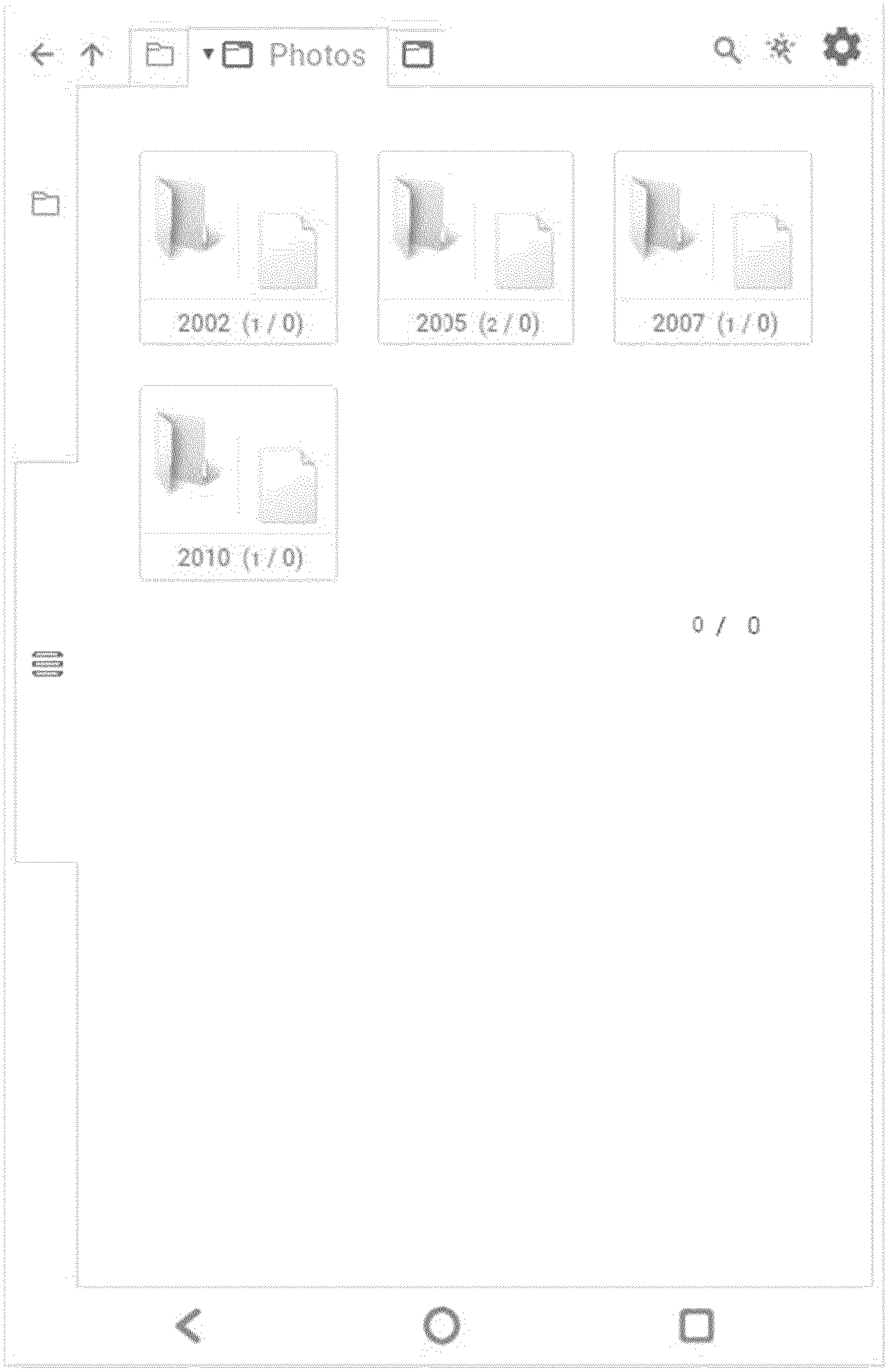
Figure 9C:
Figure 10A:
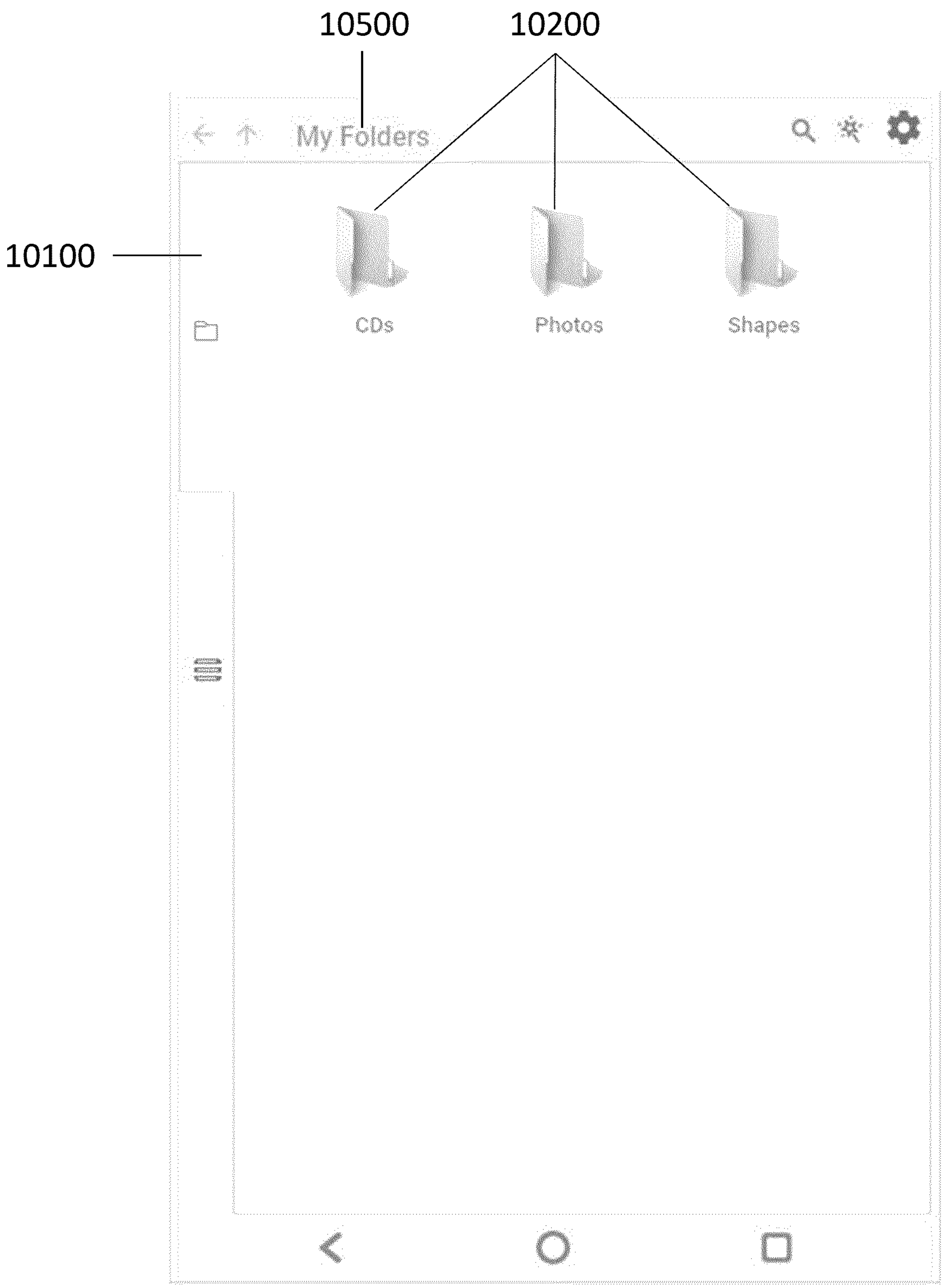
FIGS. 10(*a*) to 10(*e*) show browsing option embodiments for storage folder trees.
Figure 10B:
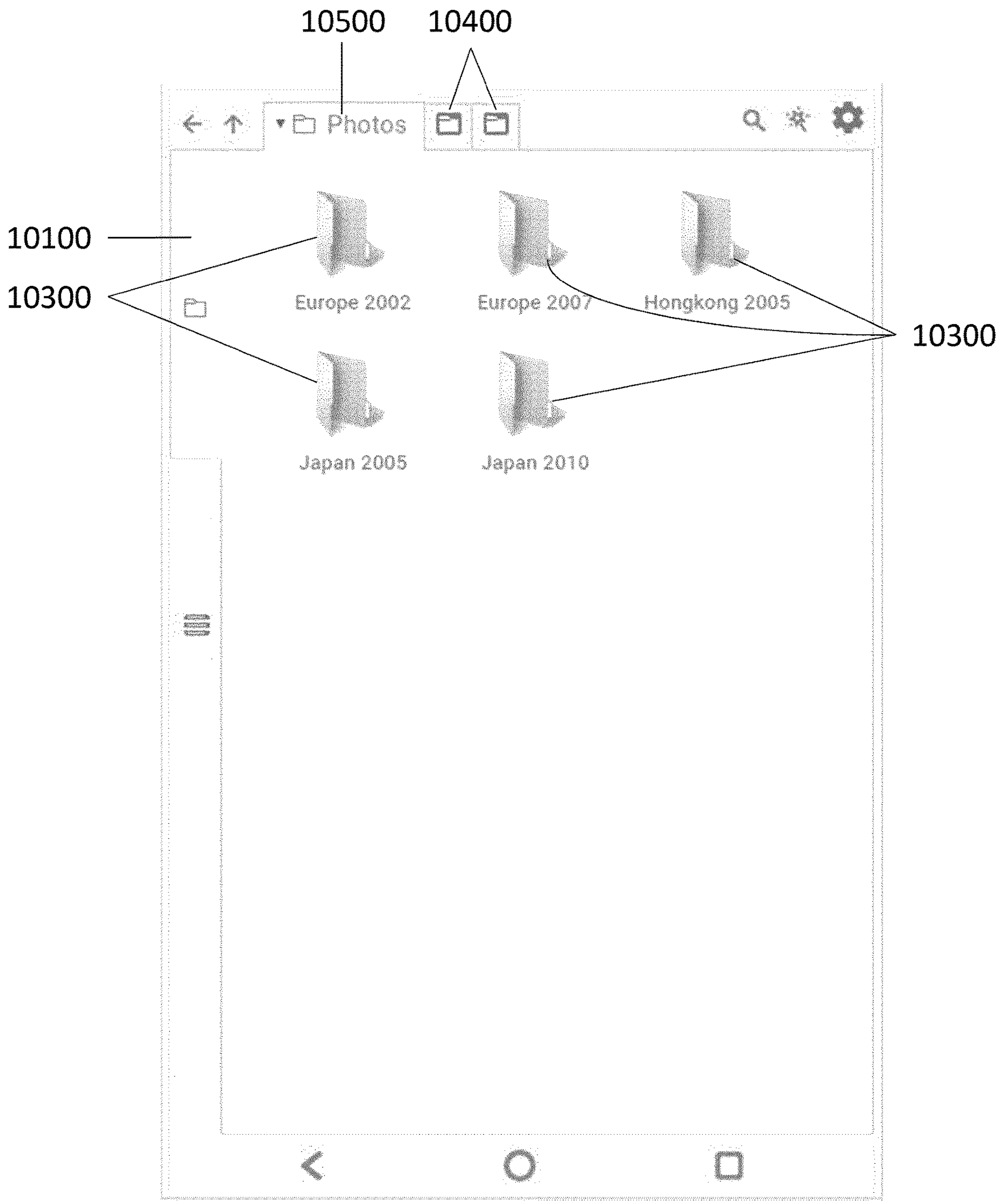
Figure 10C:
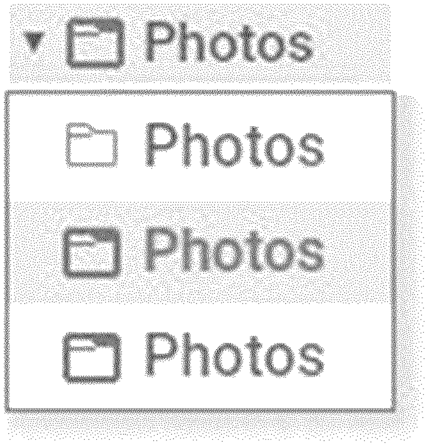
Figure 10D:
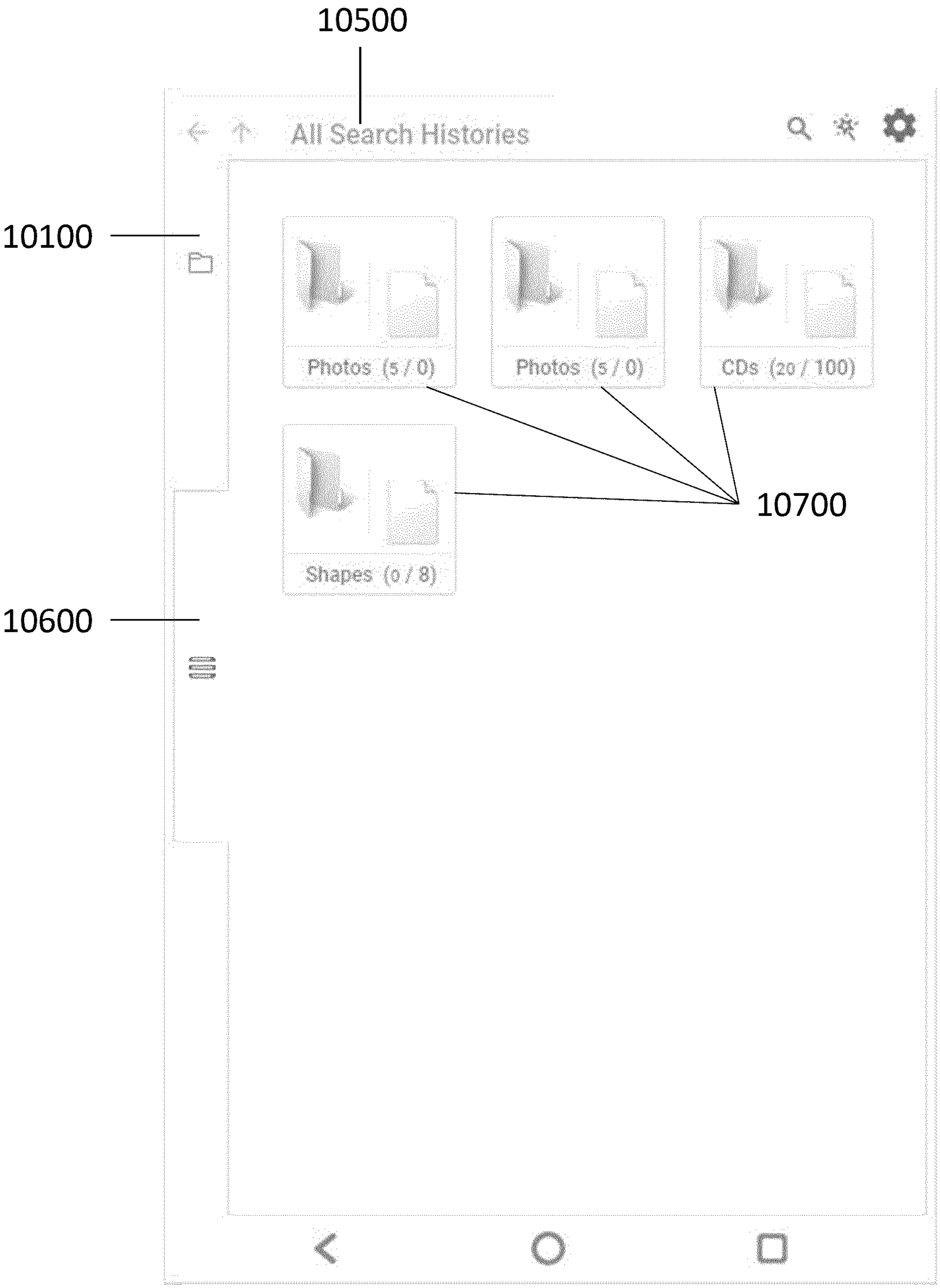
Figure 10E:
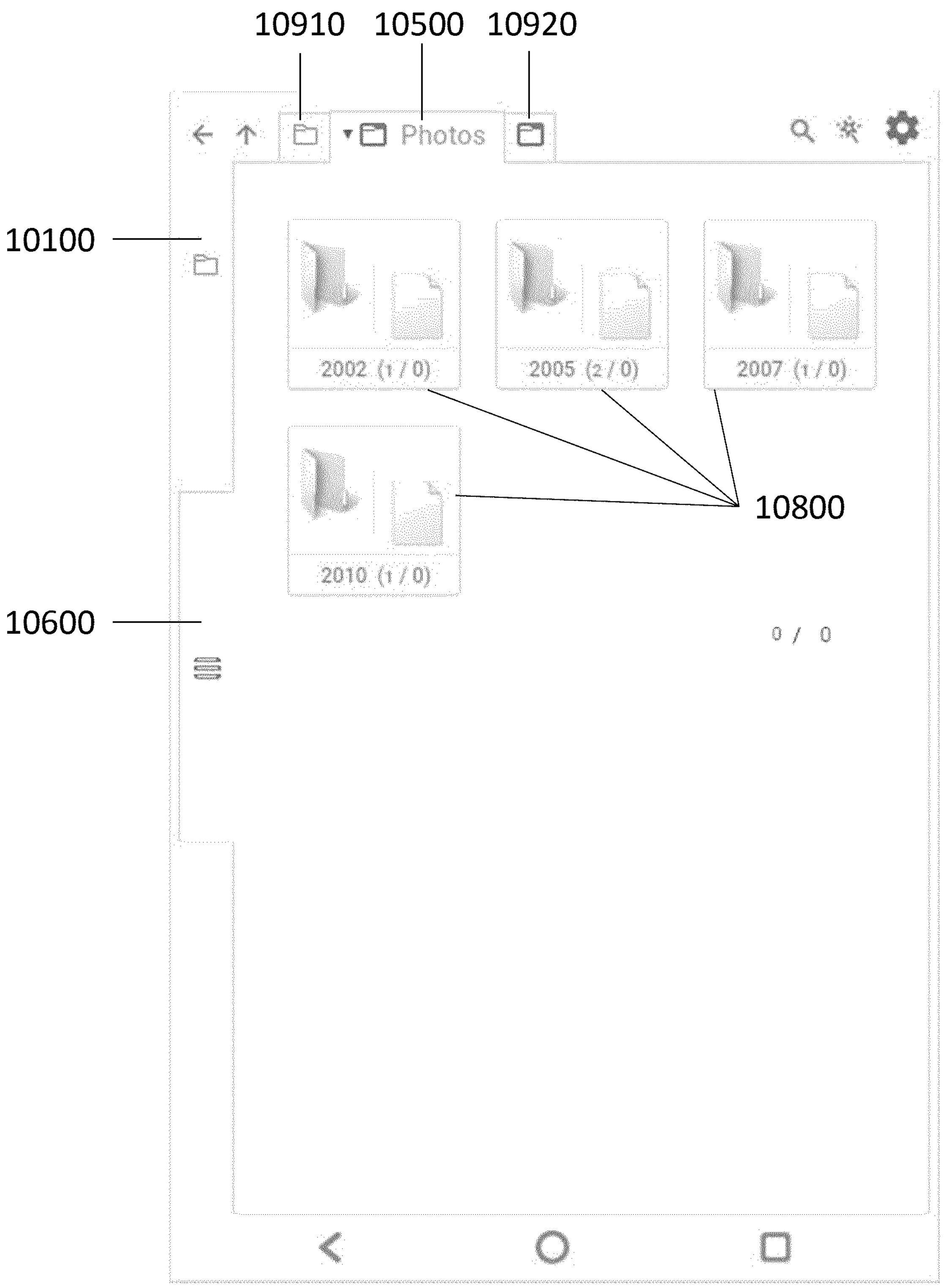

Even though search tree nodes can be made logically, visually, and functionally close to storage folders in a file management system, the two types of tree structures generally cannot be merged as they are different in almost every way. The only time a folder and a search tree node can have something in common is when they both represent exactly the same set of data items and files under the file folder. But, even at that time, the presentations for the folder and the search node still need to be different in terms of their contents if the folder is a parent folder with subfolders of its own or the search node is a parent node with sub-nodes of its own, like as depicted in the embodiments shown in FIGS. 9(*a*), 9(*b*), and 9(*c*). Similarly, different search trees nodes, like those depicted in FIGS. 9(*b*) and 9(*c*) cannot be merged together either. Consequently, from a presentation's point of view, different folder trees and different search trees exist in parallel.

However, keeping track of folders and search tree nodes that logically represent the same collection of data items or files and displaying them closely together benefits users by allowing the different groupings on the same collections to get accessed and examined easily in one place. According to an embodiment, in a system for both the folder trees and the search trees, storage folder trees can be browsed as shown in FIGS. 10(*a*) and 10(*b*) using a storage folder tree browsing mode 10100, the root folders 10200, and sub-folders 10300 of the current folder. According to a further embodiment, additional buttons and indicators 10400 alongside the current position indicator 10500 are accessible when a folder that has been alternatively grouped using search trees is opened and displayed. According to an embodiment, all the alternative ways of grouping the collection, including the storage folder can be accessed by selecting their corresponding tabs and indicators in the interface 10400. According to a further embodiment, the user can decide to create additional search trees while still on this same collection group if none of the existing folder structures and search groups provide the desired organization. According to an embodiment, folder and search groups can be listed as tabs, like in FIGS. 10(*a*) and 10(*b*). According to an alternative embodiment shown in FIG. 10(*c*), folder and search groups can be listed using options lists or other forms that permit easy access and switching between the options using the controls. According to an embodiment, folder and search groups can get displayed and opened at the same time using multiple display panels for the users to compare.

According to an embodiment, users can browse collections using a search tree browsing mode 10600 and root nodes of search trees 10700, like as shown in FIG. 10(*d*). According to an embodiment, in addition to displaying the sub-nodes 10800 of a current search node, tabs or indicators for the folder that define the collection boundary and other search trees on the same collection, if any, can be displayed alongside the position indicator for the current search node, like as shown in FIG. 10(*e*) for the folder tree presentation 10910 and another grouping for the same collection 10920.

According to an embodiment, because folders only represent the set of files inside them, no two folders will be the same and there can only one crossing point (collection), if there is one, between a folder and a search node, which will always be the folder itself. That is, for a search node to represent exactly the same data item or file collection as a folder, the search query for the node can only be something as simple as "list all items inside this folder X".

According to an embodiment, for different search nodes between different trees, such as "Folder [Photos]→2005→Japan" and "Folder [Photos]→Japan→2005", they can cross one another multiple times, for example at both the first or root level and then at the third level, as long as the collections they logically refer to are the same. According to a further embodiment, it is an individual applications' design decision to maintain and present such additional lists to users.

According to an embodiment, different folders and search nodes across different tree structures get grouped and accessed together around the data collections they represent. According to a further embodiment, for each and every presentation of the folders and the search tree nodes that are managed by the system, it is associated with a list of the folder (if applicable) and all the search nodes (including the targeted folder or node itself) that logically represent the same data collection as the targeted folder or node itself. According to an embodiment, the list associated with a folder or node is presented by providing tabs or selections or other toggling controls or opening all the folders or nodes in the list at the same time.

Figure 11:
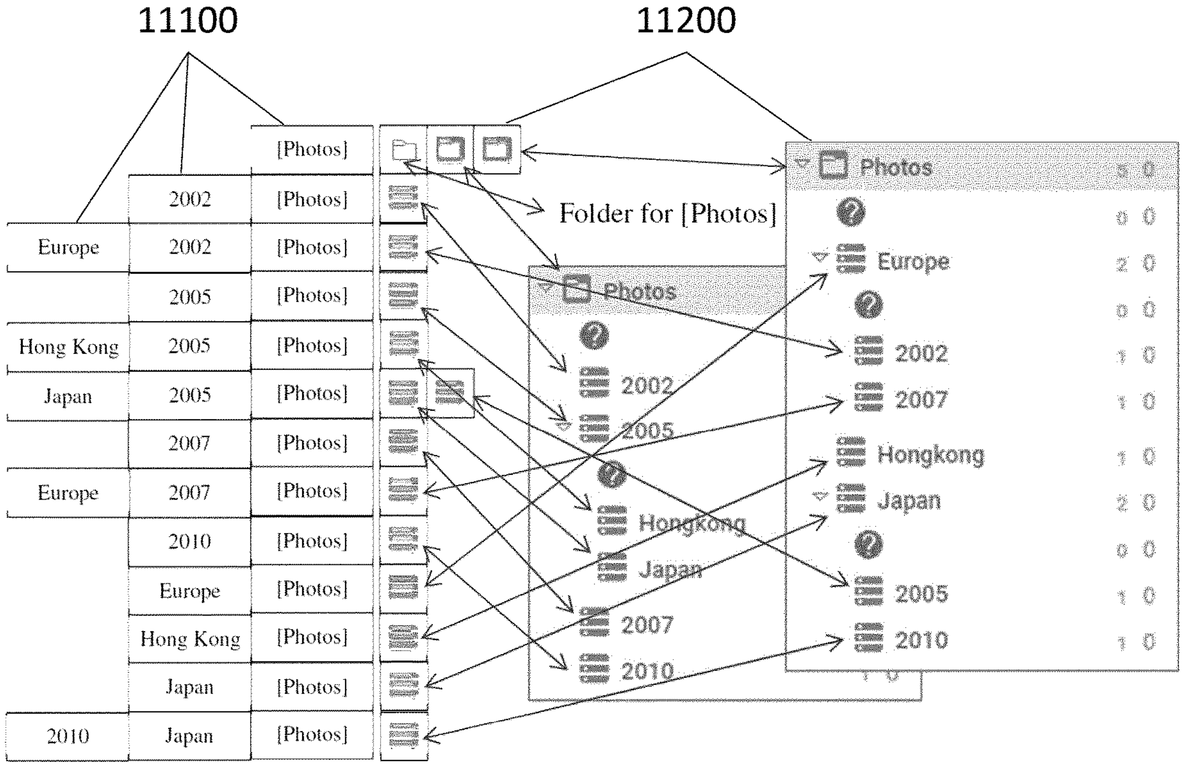
FIG. 11 shows a list embodiment of collection representations, in which an entry is a list of folder and node presentations.

According to an embodiment shown in FIG. 11, a list of collection representations 11100 can be created, in which an entry is a list of folder or node presentations 11200. According to a further embodiment, all the search trees in the system can be traversed and each node put in an entry in the collection representation list that matches the collection the search node represents, creating a new entry if no existing one can be found. The search node and its representation in the collection list can be double linked so that the collection list entry can be reached from the search node and vice versa. Lastly, a folder representation will be put at the top of the entry in the collection list if the entry is folder-only. According to an embodiment, unsorted nodes can be grouped using the same mechanisms as shown in FIG. 11.

Tagging Data Items Using Search Tree Nodes

According to an embodiment, search trees allow users to divide a file collection into different groups based on related search requests, provided that the data items within the collection all have the searchable or identifiable characteristics, be it certain file types, file creation times, or keywords within the file names or text contents, for the items to be recognized by a search engine. That is, data collections (files in storage trees) and the search trees are independent to each other and they only get connected or linked when properties of the data items can be matched with the search request(s) represented by and stored in a search tree node.

Figure 12A:
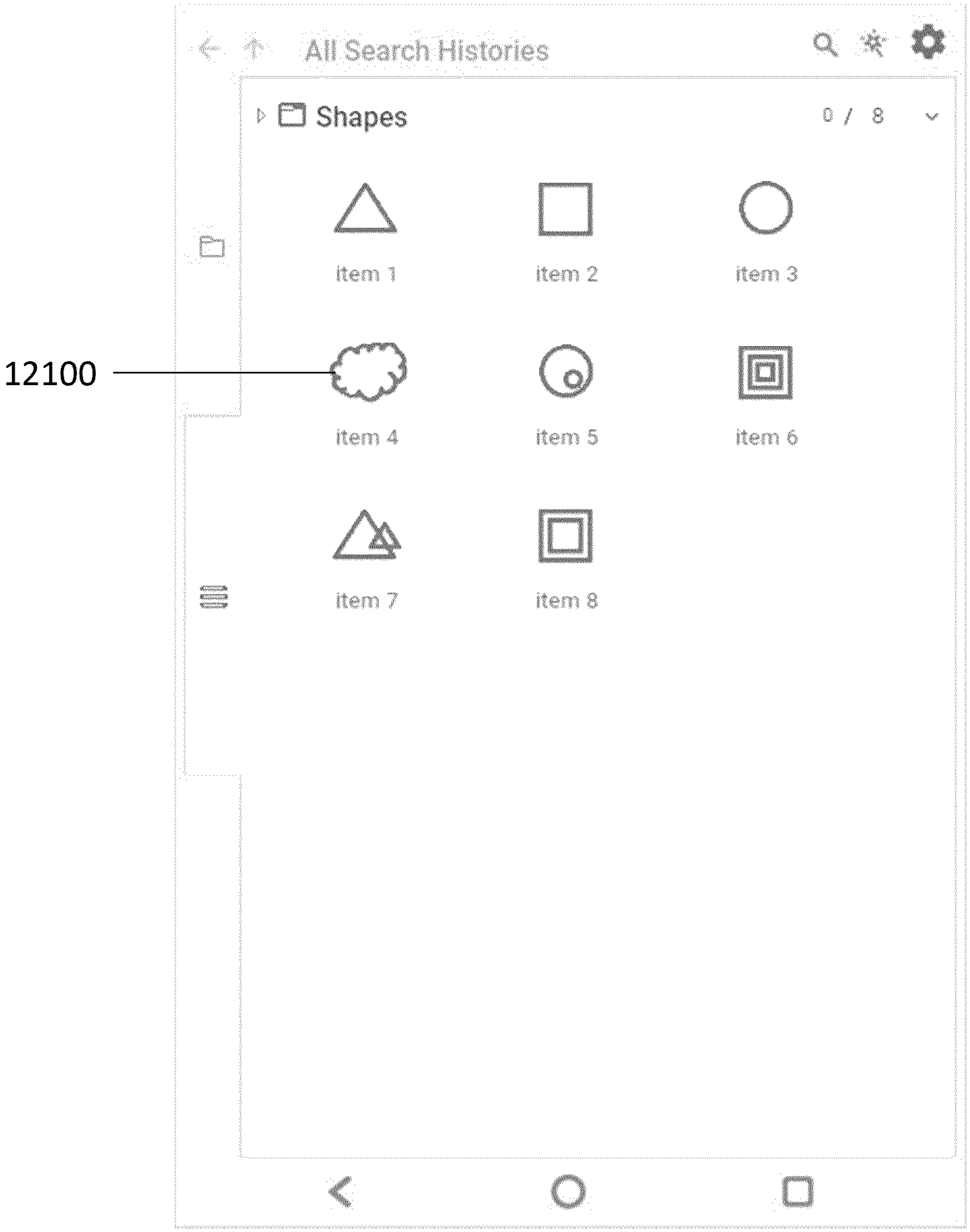
FIGS. 12(*a*) and 12(*b*) show embodiments where image files can be tagged and then grouped by the tag names.
Figure 12B:
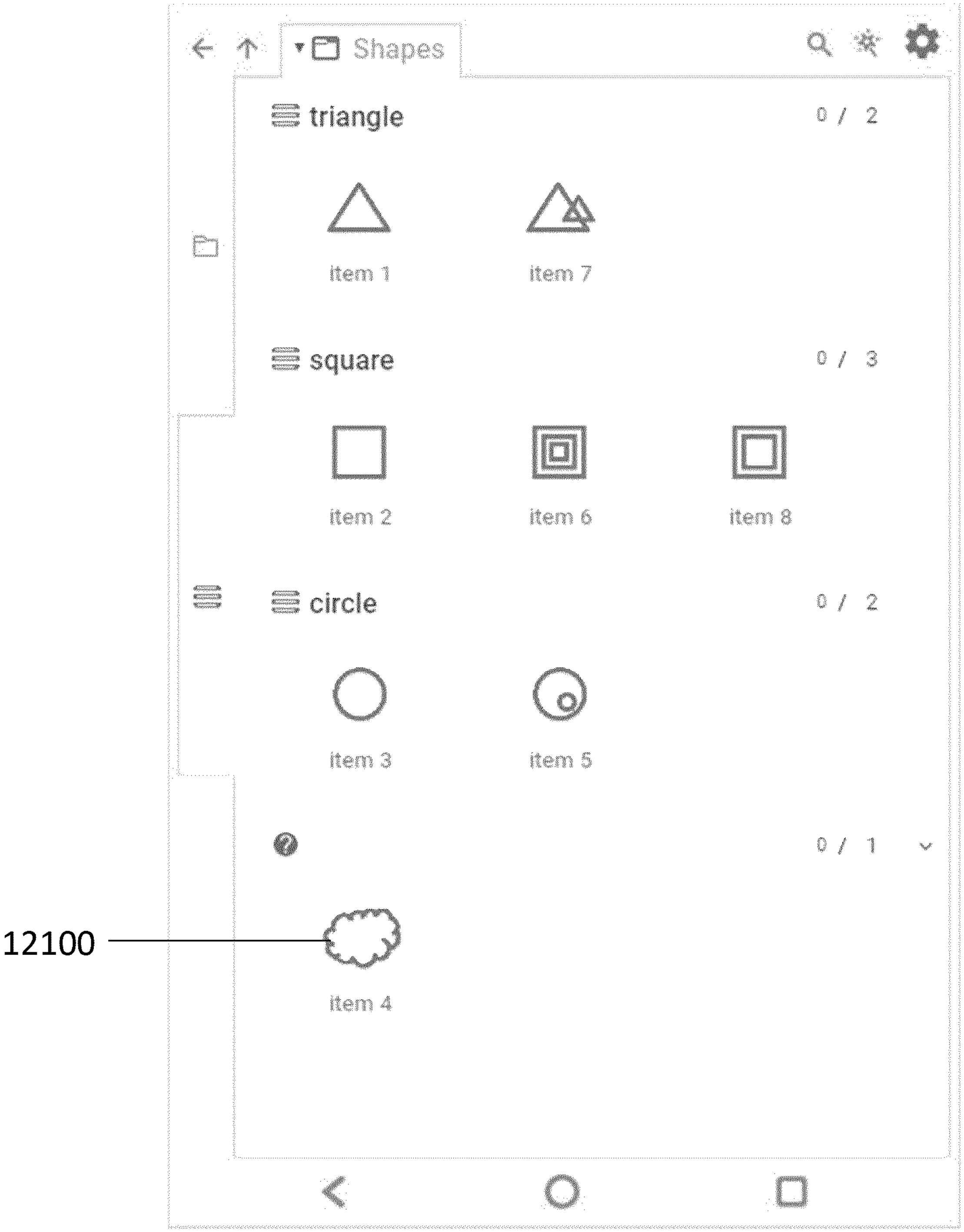

According to an embodiment, when original file names and text contents, if any, are not specific enough, the system allows user-defined descriptive texts to be attached to the files as tags so that the files may get identified and distinguished for file managing tasks using the tags. According to a further embodiment shown in FIGS. 12(*a*) and 12(*b*), image files for different geometric shapes can be tagged and then grouped by the tag names for their shape types. One file for an irregular shape 12100 does not have any tags that match with the shape names, so it is left in the unsorted group in FIG. 12(*b*).

Figure 13:
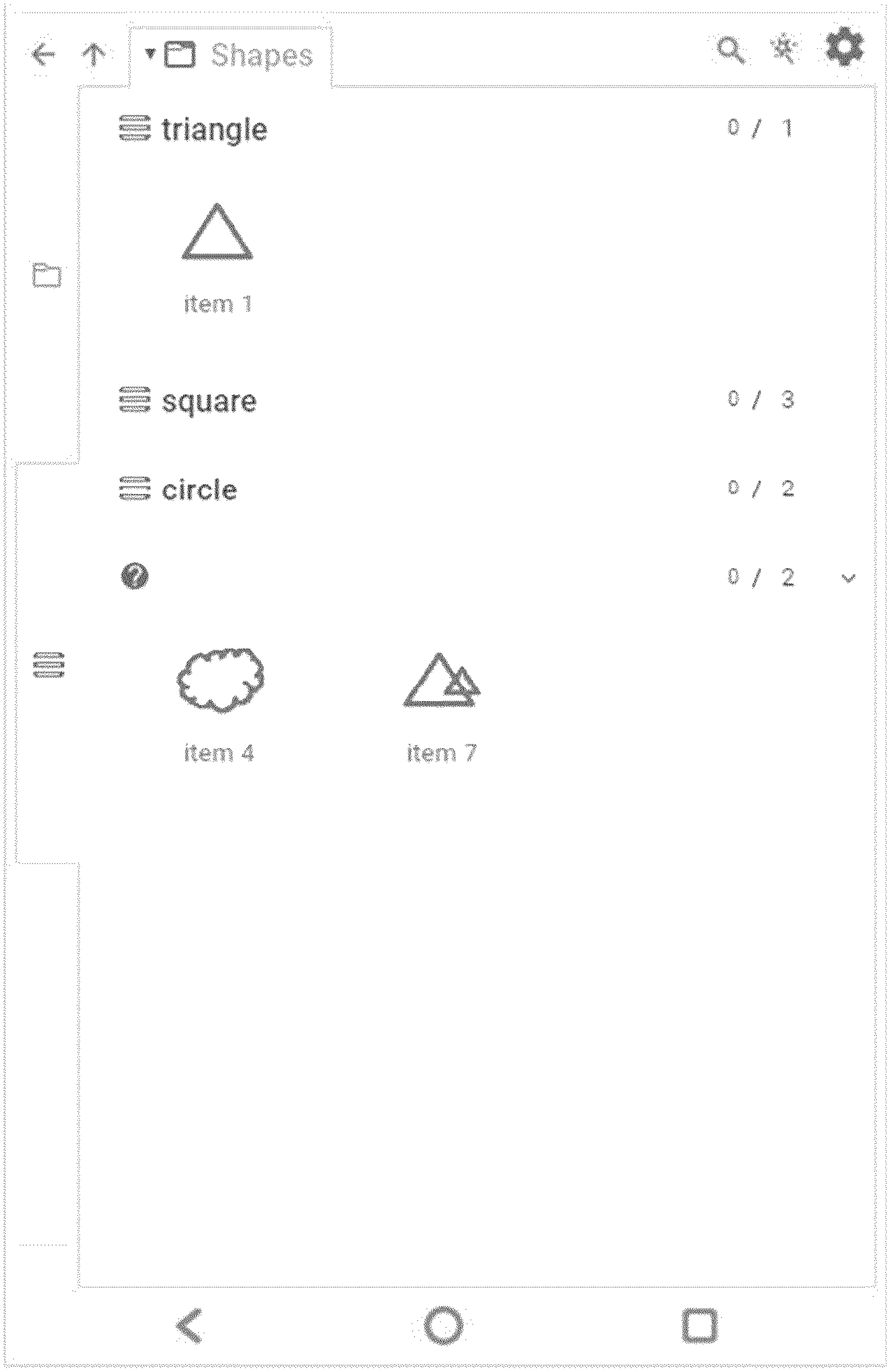
FIG. 13 shows an embodiment with a sortable data item before its searchable characteristics are updated and the data item is moved from the unsorted group to one of the sorted groups.

According to an embodiment, data items need to carry characteristics recognized by the computer system for themselves to get matched with a specific search group or groups. According to an embodiment shown in FIG. 13, "item 7" clearly contains triangular shapes to human users, but, before a keywork "triangle" is tagged, the computer will leave it together with "item 4" for irregular shapes in the unsorted group. Only after its searchable characteristics are updated, through tag-attaching or name-changing or content-changing or stamping, will such an item be able to move from the unsorted group to one of the sorted groups. According to an embodiment, all the search requests are re-evaluated for all the unsorted and unsorted groups before the updated search result lists can be re-fetched and displayed accordingly.

The steps of name-changing or content-updating or tag-attaching and then search-result refreshing are technical details about some customary procedure for users to understand, remember, and follow in order for the data items to get recognized by the computer systems before proper actions can be taken for the tasks. Thereafter, the results can be presented and managed in the user interfaces when a user wants to reorganize the data collection by moving items from one group to another.

According to an embodiment, the graphical user interface has routines available for files and folders to be moved or copied between different locations within the file system while all the internal maintenance work inside the system is kept transparent to the users. According to a further embodiment, such routines are also made available to allow data items to be naturally managed within search tree structures.

Figure 14:
FIG. 14 shows an embodiment both during and after moving a data item by a drag and drop operation.

According to an embodiment shown both during the move 14100 and after the move 14200 in FIG. 14, files and folders can be moved by a drag 14300 and drop 14400 operation. According to an embodiment, movement of files and folders is implemented as a cut and paste operation and other context menu options that get shown by right-clicking on the items or groups. According to a further embodiment, movement is affected by any conventions provided by an operating system or application program.

According to an embodiment, in order for a data item to get moved or copied between different nodes in a search tree, its searchable or identifiable characteristics, such as the file or folder names, text contents of the files, or the tags on the files and folders, are updated. According to an embodiment, the names or contents of the data items are not changed or updated just for file managing tasks and, instead, attaching and detaching the tags on the items is done for file managing tasks. According to an embodiment, only tags are permitted to be attached or detached during move or copy operations on data items between search groups. According to an alternative embodiment, other properties of the data items, including the names or even the contents, are updated, based on the same principle but different application level conventions, when the items are moved or copied between the search nodes.

According to an embodiment, a move or copy operation requires a data item, the existing search node with which the item is associated with, and another search node from the same search tree structure to be specified. According to a further embodiment, moving an item from its current search group to a new group is a two-step procedure involving removing the one or more tags corresponding to its current group then attaching the one or more tags corresponding to the new group. According to an embodiment, copying an item from its current group to a new group involves attaching the one or more tags corresponding to the new group to the item.

As new tags are attached to the data items, duplicates may appear. According to an alternative embodiment, duplicated tags are eliminated. According to an embodiment, the elimination of duplicate tags is not a requirement of the system to work properly. That is, there would be no difference in logic between "this tag appears on the item only once" and "this tag appears on the item multiple times" when the question is "does this tag appear on this item or not?"

According to an embodiment, there are logical restrictions on moving or copying an item between different search nodes where it is not logically feasible. For example, an item cannot be copied from a sorted group to the unsorted group, or the other way around, under the same parent since items cannot be both sorted and not-sorted at the same time. According to an embodiment, there are other logical restrictions, including the current and new search nodes for at least a move operation needing to be between different search nodes within the same search tree structure because the root node of the search tree bounds the entire data collection and represents each and every item within the collection, so, logically, no item can ever be moved out of the data collection for data integrity reasons.

According to an embodiment, existing keywords within the names and the text contents may prevent the files and folders from being freely moved or copied between the search nodes or groups. According to a further embodiment, the system implements extra valuating routines to check for and indicate conflicts, such as by greying-out the illegal moves, and rejecting the requests when conflicts are found.

According to an embodiment, after any searchable characteristics, like tags, of the data items are changed, all the related search requests are re-evaluated, and the group presentations in the interface's display panel are refreshed. According to a further embodiment, whether or not the operations are done automatically after an item is moved or copied is left for the system design and logic to decide. According to a further embodiment, the original and new group are evaluated and refreshed right away for moving by drag and drop and moving from a sorted group to an unsorted group, in the latter case because evaluating all other sorted groups is required for the system to verify if the operation is valid or not.

According to an embodiment, a tag editing interface is available to users in addition to move and copy operations. According to a further embodiment, the move and copy operations provide additional benefits over manual tagging through automatic tagging and de-tagging in an intuitive way, through mouse-only operations that ensure the tag values being attached or detached exactly match with the keyword(s) represented by the search nodes, by eliminating laborious and error-prone typing that can lead to improper tagging. This eliminates error-hunting and the need to go through both the search requests and all the names, text contents and tags of the data items and then compare them very carefully to identify, for example, a missing letter.

According to an embodiment, moving or copying multiple items can be done by putting a loop through the list of the items and applying the same procedure on each and every one of them. According to a further embodiment, files and subfolders and, recursively, any files and folders inside them inside a parent folder can be moved or copied together while maintaining the subfolder structures when the parent folder is moved or copied as a whole. According to a further embodiment, such batch operations can be achieved by allowing the user to specify a current search node to be moved or copied instead of the current node only getting implied when a single data item is specified, duplicating the tree structure under the current node to the new location in the search tree if the current node is a parent node, looping through all data items inside the search result set for each and every node between their original node and the new node within the newly created structure, and removing the current search node if the requested operation is moving. According to a further embodiment, during such batch operations the move or copy operation still gets applied individually on data items one by one the same way when it gets applied on a single item.

According to an embodiment, certain details will affect the results after an item is moved or copied. These details include calculations for the searchable characteristics and properties, for example a set of tags, corresponding to the existing search tree node and the new search node during the move or copy operation. These details also include how the characteristics and properties get attached to or removed from the targeted data item, and whether or not the associations between the data item and the search groups are indeed established or broken by the operations. According to a further embodiment, such details do not affect the success of the moving or copying procedure itself. That is, even if the sets of tags are calculated wrong or if they are not properly added or removed, as long as the steps of removing or adding the characteristics and properties are taken, the moving or copying procedure will be considered complete and successful, just that desired outcome may not get achieved by such bad implementations.

According to an embodiment, general rules are incorporated into the calculation and modification of the sets of tags that correspond to the groups and nodes in a search tree. According to a further embodiment, calculations of the set of one or more tag(s) corresponding to a single search group or node are conducted in the same way as a search query that is represented by a search node and which is used by the search engines against the data collection for the search result set to be formed. According to an embodiment, calculations depend on the type of group or node. According to a further embodiment, for a sorted group or node a set of positive normal tags are represented by the node alone and for an unsorted sub-group or sub-node a set of negated tags are represented by the union of all the sibling sorted sub-nodes under the parent node.

According to an embodiment, the one or more tag(s) corresponding to any node within a search tree is the union sets of all positive and all negated tags along the path from the root node to its current position.

According to an embodiment, different types of tags are added and removed from data items differently. According to a further embodiment, for a positive tag the tag needs to be attached to the items when a positive tag is added to a data item and the tag needs to be detached from the item when a positive tag is removed from a data item. According to an embodiment, for a negated tag the tag needs to be detached from the items when a negated tag is added to a data item (i.e., a ban is put on the data items that prohibits and prevents the tag from being associated with the item) and no action is needed when a negated tag is removed from a data item since the tag is just no longer prohibited from being associated with the data items any more (i.e., the ban that prevents a negated tag from being associated with the data item is simply lifted).

According to an embodiment, there are implementation restrictions on the add or remove operations. According to a further embodiment, the same tag value cannot be added both as a positive tag and as a negative tag to the same data item at the same time. That is, a keyword cannot both appear on an item and be excluded from the same item at the same time.

Creating and Managing Nameless Search Tree Nodes

According to an embodiment, when an interface allows data items to get connected or linked with different search groups without anything being explicitly described by any keywords or search conditions, the search groups (i.e., the connections or links between the items and the groups) can assume various forms, including non-human-understandable ones, as long as they can be handled by a computer system.

Figure 15:
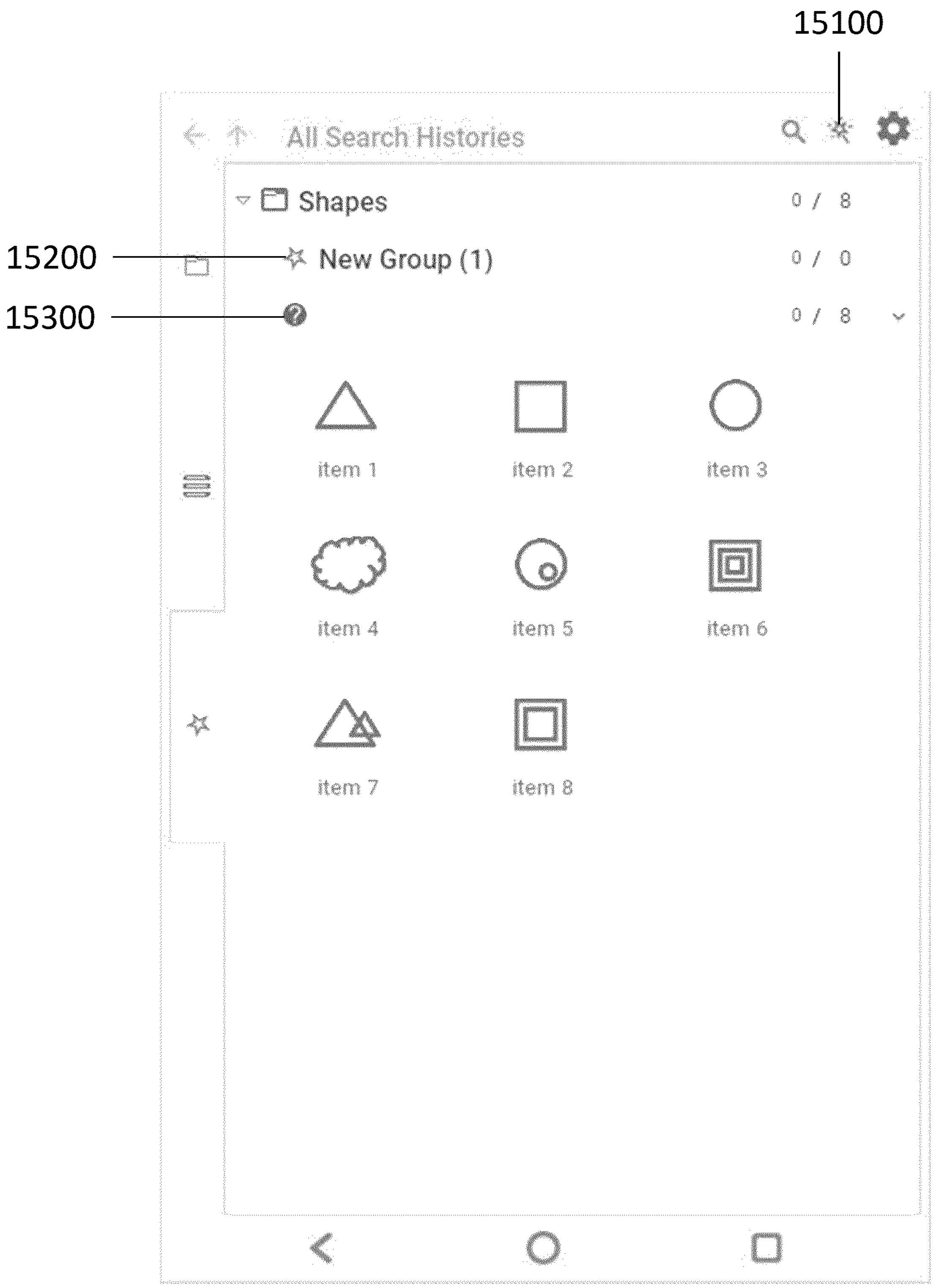
FIG. 15 shows an embodiment with a "create a new group" button.

According to an embodiment shown in FIG. 15, a "create a new group" button 15100, once clicked or tapped creates a new empty search group 15200 as "New Group (1)" under the "Shapes" node and lists all items for "Shapes" under the unsorted group 15300. According to an embodiment, the new search node is created namelessly, with "New Group (1)" acting as placeholder text for the search node or group and not the actual search query condition to be used to match the search node or group with the items in the data collection. According to an alternative embodiment the "create a new group" function is implemented as menu options or any other conventions provided by an operating system or the application program, alone or combined.

According to an embodiment, creating a nameless sorted search node involves several steps. According to an embodiment, after receiving a request with no actual search query being specified by the user when a dedicated control or trigger (e.g., a button or menu option) is activated or clicked or tapped, a globally unique search ID is generated in place for the search query, as if it is received from the user with the request, and a face name is generated that is unique or non-unique depending on the design implementation logic. According to an embodiment, when creating a new search tree presentation or modifying an existing search tree presentation for a new search node, a regular search query is received from the user but the new search node will, instead of storing and representing only the search query for a regular search node, store and represent two pieces of information at the same time. According to a further embodiment, these two pieces of stored and represented information are the internal search ID as the normal search query (to be matched, connected and linked with data items and to be evaluated against the underlying data collection) and the face name as a new field to be used to describe the node to users in a user interface.

According to an embodiment, face names and group search IDs are isolated and separated in the nameless search nodes. This is done because the newly created node needs to be empty, until data items are manually dropped into it by the user, for the nameless grouping mechanism to work, but queries like "New Group (1)" may match with files for text contents like "Creating a 'New Group (1)' is the first step", unintentionally. Furthermore, presenting the system-generated group ID directly for users to see is not practical, either.

According to an embodiment, data items can only get distributed into and connected or linked with the nameless search nodes through the move and copy operations as the search IDs for the nodes are not visible to the users and are only being tagged to or de-tagged from the items, transparently, by the system in the background.

According to an embodiment, a newly created node always has an empty search result set, since, when the search request is evaluated against the data collection, no data items from the collection will yet match with its globally unique search ID. According to an embodiment, if a new node is created under a parent node, an unsorted node will be created, or, the existing unsorted node will be updated, for the data integrity of the search tree structure to be automatically maintained. According to an embodiment, if the new node is created as a root node, the node will still be empty with an empty search result item set and only after the items are tagged with the search ID of the node will they be part of the search result set for the search node.

Figure 16A:
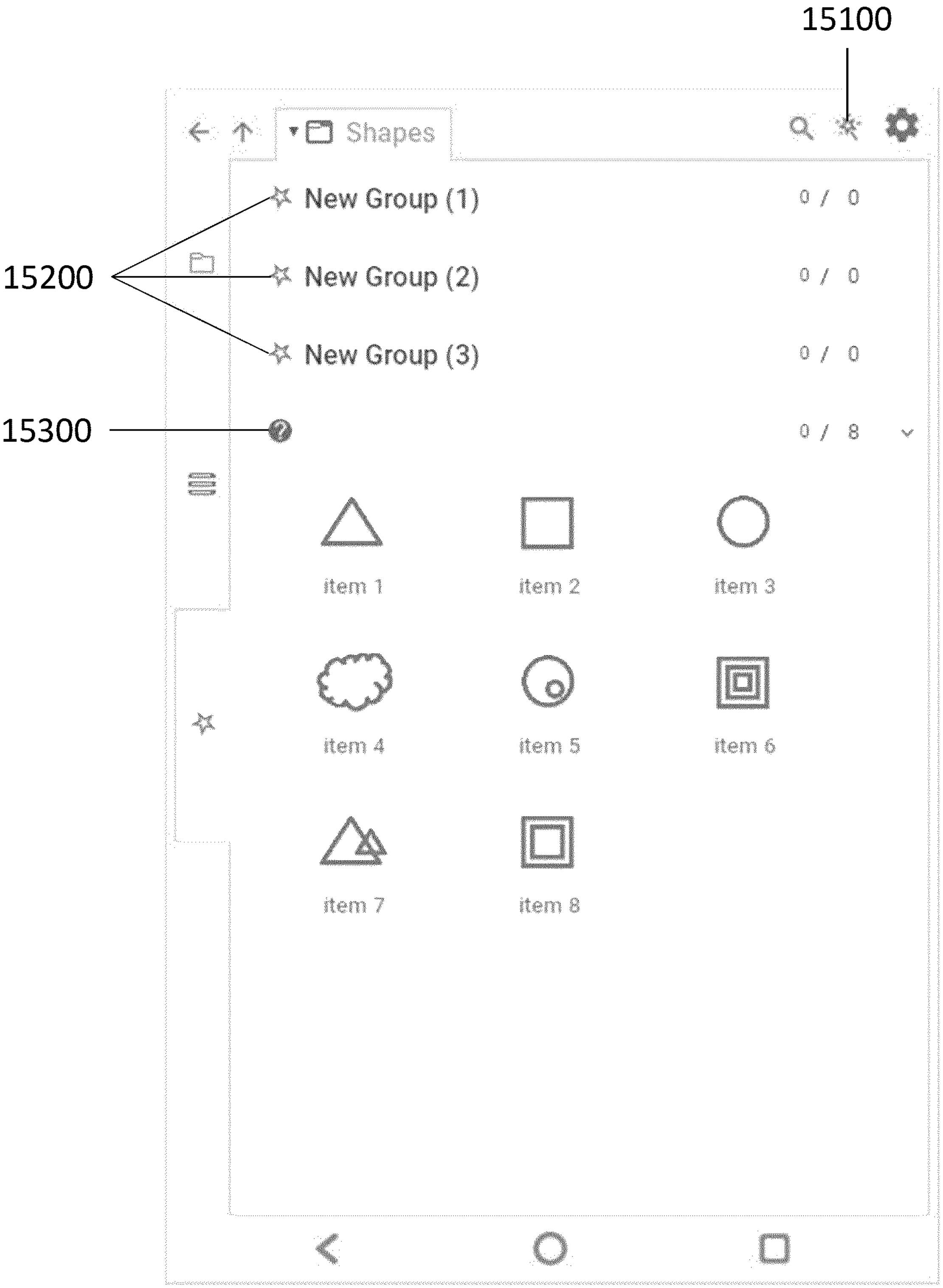
FIGS. 16(*a*) and 16(*b*) show an embodiment both before and after data items are manually distributed into nameless sorted groups.
Figure 16B:
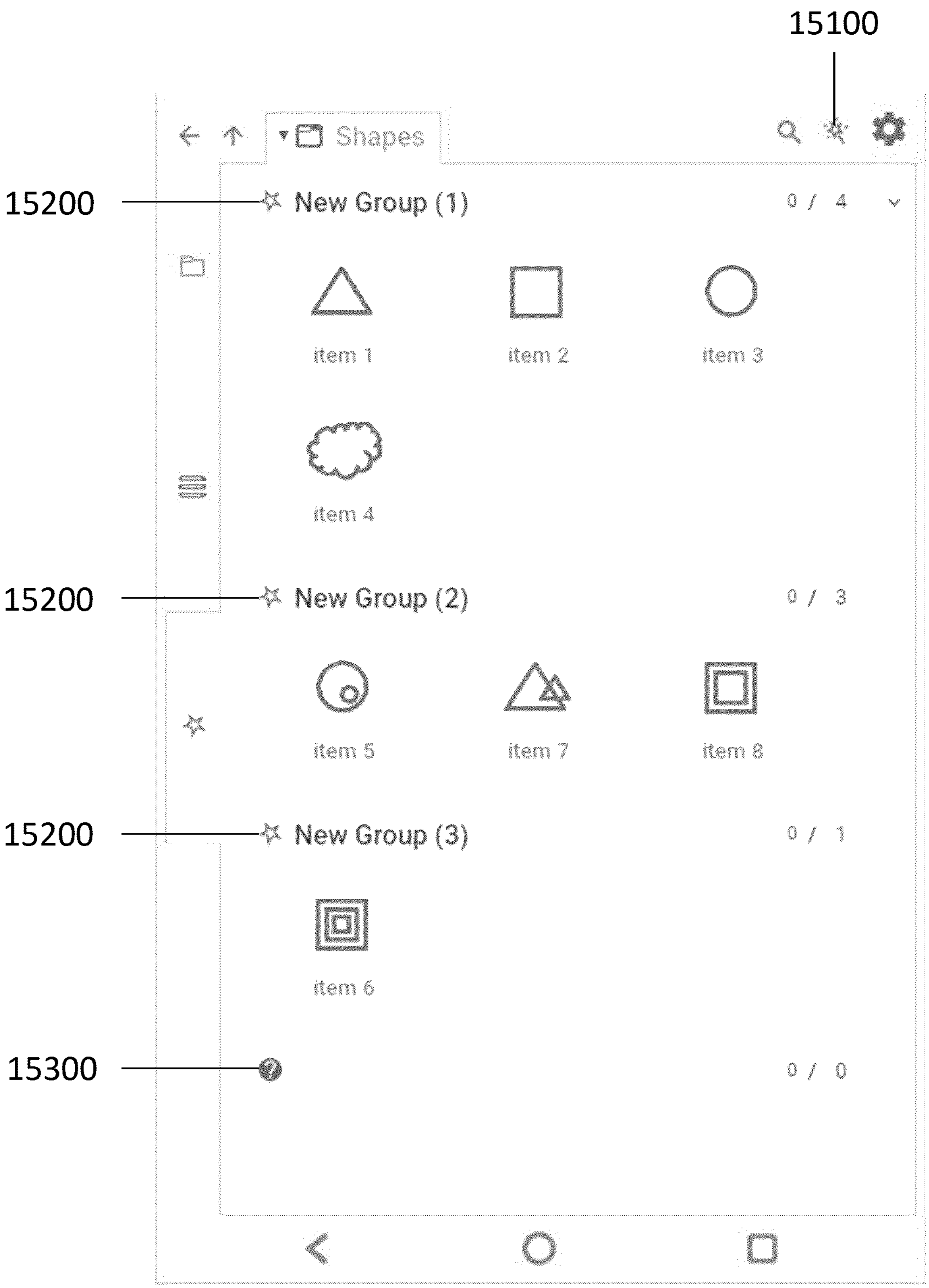

According to an embodiment, as many nameless groups as are needed are created in advance. According to a further embodiment shown in FIG. 16(*a*), all the items remain under the unsorted group 15300 until they get manually distributed into the nameless sorted groups 15200 after the search IDs for the groups get attached to the items as tags, like as shown in FIG. 16(*b*).

According to an embodiment, new nameless groups can be created at any time items are moved from the unsorted partition into the sorted groups as the user, after scanning the list of all existing sorted groups and finding that an item does not fit into any of the existing groups and a new group of its own is needed. According to a further embodiment, existing groups and the unsorted group and items within them remain unchanged before and after the new nameless groups are created. According to an embodiment, this procedure can iterate as many times as needed until an entire collection gets properly sorted, like as shown in FIG. 16(*b*).

According to an embodiment, the uniqueness of the search group IDs ensures that creating a new nameless group and moving items into and out of a nameless group by attaching and detaching the search IDs as tags to and from the data items will not affect any existing search result sets for any other sorted group because that particular search ID does not exist anywhere else in the entire system.

According to an embodiment, a connection can be made between an unsorted item and an existing sorted group and then for the item to be moved into the group or for a new group to be created for the item, if the unsorted item is kept visible together with all the sorted groups to the user at all times. That is, the sorted nameless groups are collapsed, so that as many as possible sorted groups can be fitted into the main display panel together with at least the currently targeted item from the unsorted group.

Figure 17:
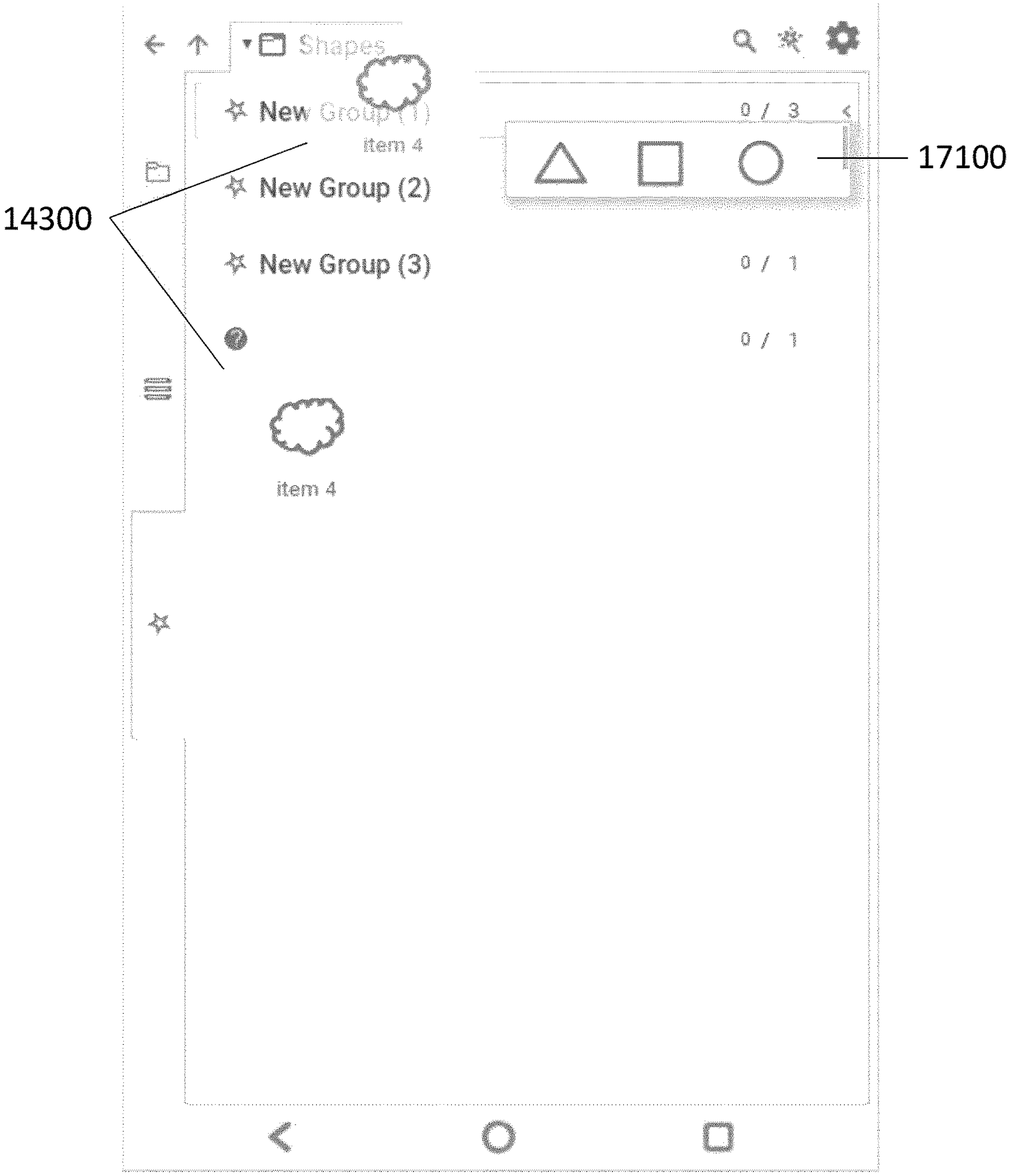
FIG. 17 shows an embodiment with a pop-up preview of group contents.

According to an embodiment, a pop-up preview 17100 of the contents of the groups, like as shown in FIG. 17, helps identify and distinguish the search groups when the user drags 14300 an item over a node or group and compares the item with the group. According to an embodiment, previews do not need to be complete as long as the visible part can get the group positively identified. According to a further embodiment, the preview can be in forms other than graphics, like as a list of names for the items.

According to an embodiment, meaningful search group names can be assigned to help users identify the grouping criteria of each group without requiring the individual items in the groups to be visible at all times. According to an embodiment, since group names are separated from the actual search queries (group IDs), the face names for the groups can be updated and customized to any values at any time after a nameless group is created, before or after any data item is linked to the group, without the search results getting affected by the changes in face names.

Figure 18:
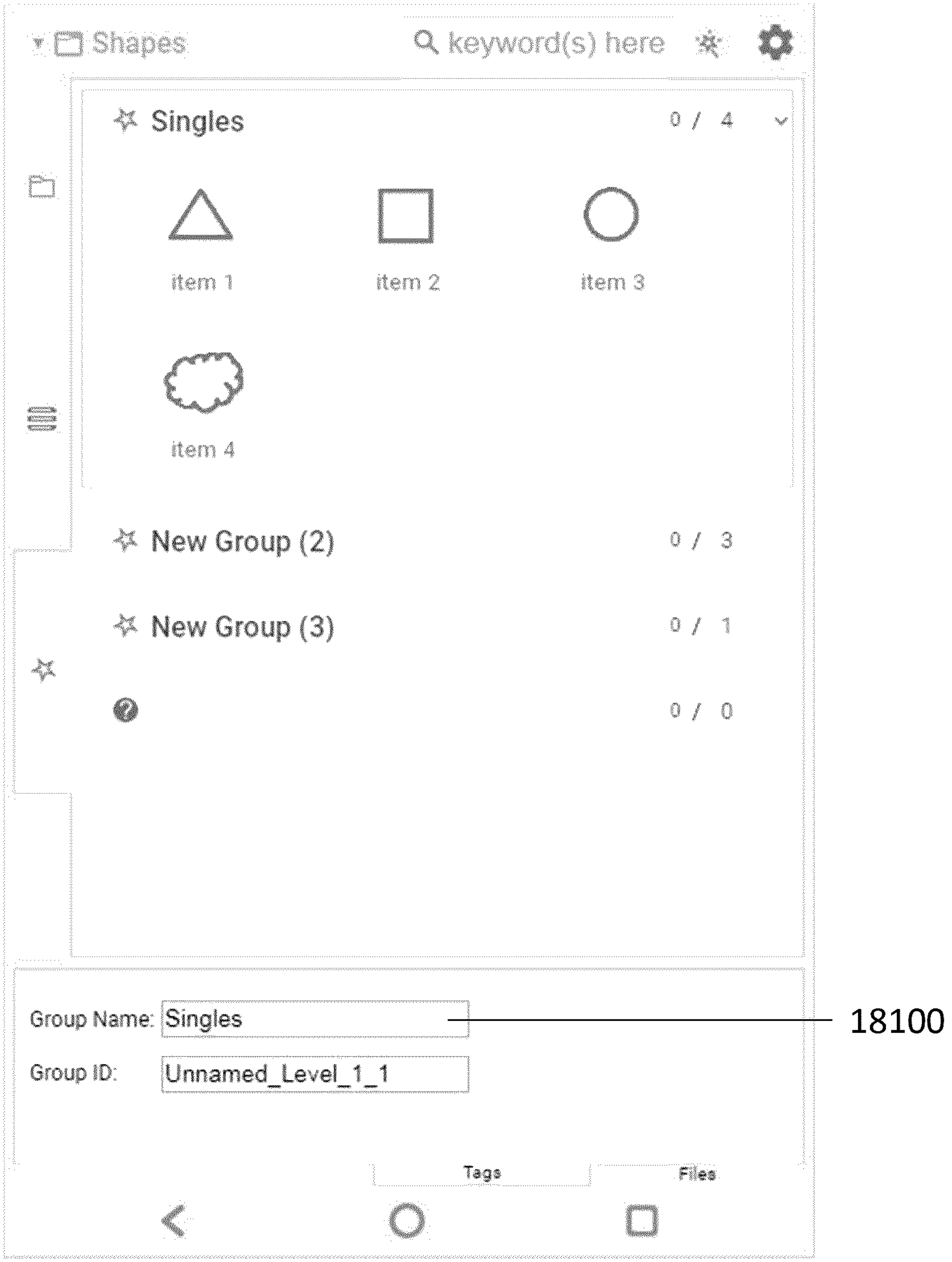
FIG. 18 shows an embodiment with editable text fields for updating the face name of a nameless group.

According to an embodiment, controls for updating the face name of a nameless group include any file and folder name renaming conventions. Such conventions include using editable text fields, like as shown in FIG. 18 for the face name of the group 18100, context menu commands, or by permitting a slow double click to change it to editable on the name itself without the search ID part being explicitly displayed.

According to an embodiment, the tree structures for nameless groups are not regular search trees but grouping trees that allow data items to be grouped without any search query being specified. According to a further embodiment, at least different icons for the nodes or groups are used for the two types of trees to be distinguished within the interfaces.

Figure 19:
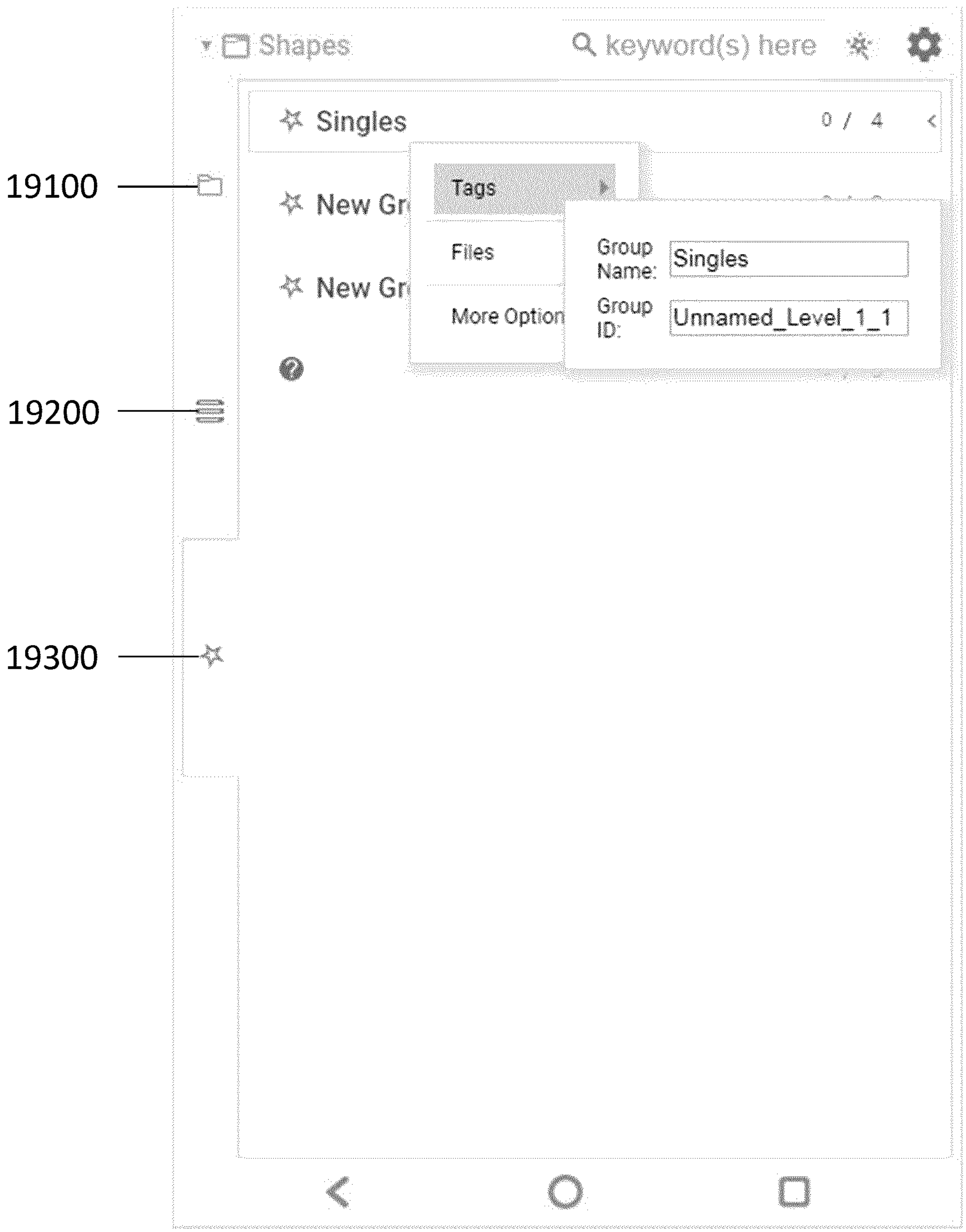
FIG. 19 shows an embodiment with different browsing modes for folder trees, search trees, and grouping trees.

According to an embodiment, implementations of the interfaces avoid nodes of different types from getting mixed or created together by implementing different browsing modes. According to an embodiment shown in FIG. 19, these include a different browsing mode for folder trees 19100, search trees 19200, and grouping trees 19300 separately.

According to an embodiment, grouping trees are one type of search tree, where a single node represents two separate pieces of information at the same time, namely the new representation value of the node, which makes the grouping trees different, and the search query of the node, which makes the grouping trees still search trees.

Figure 20A:
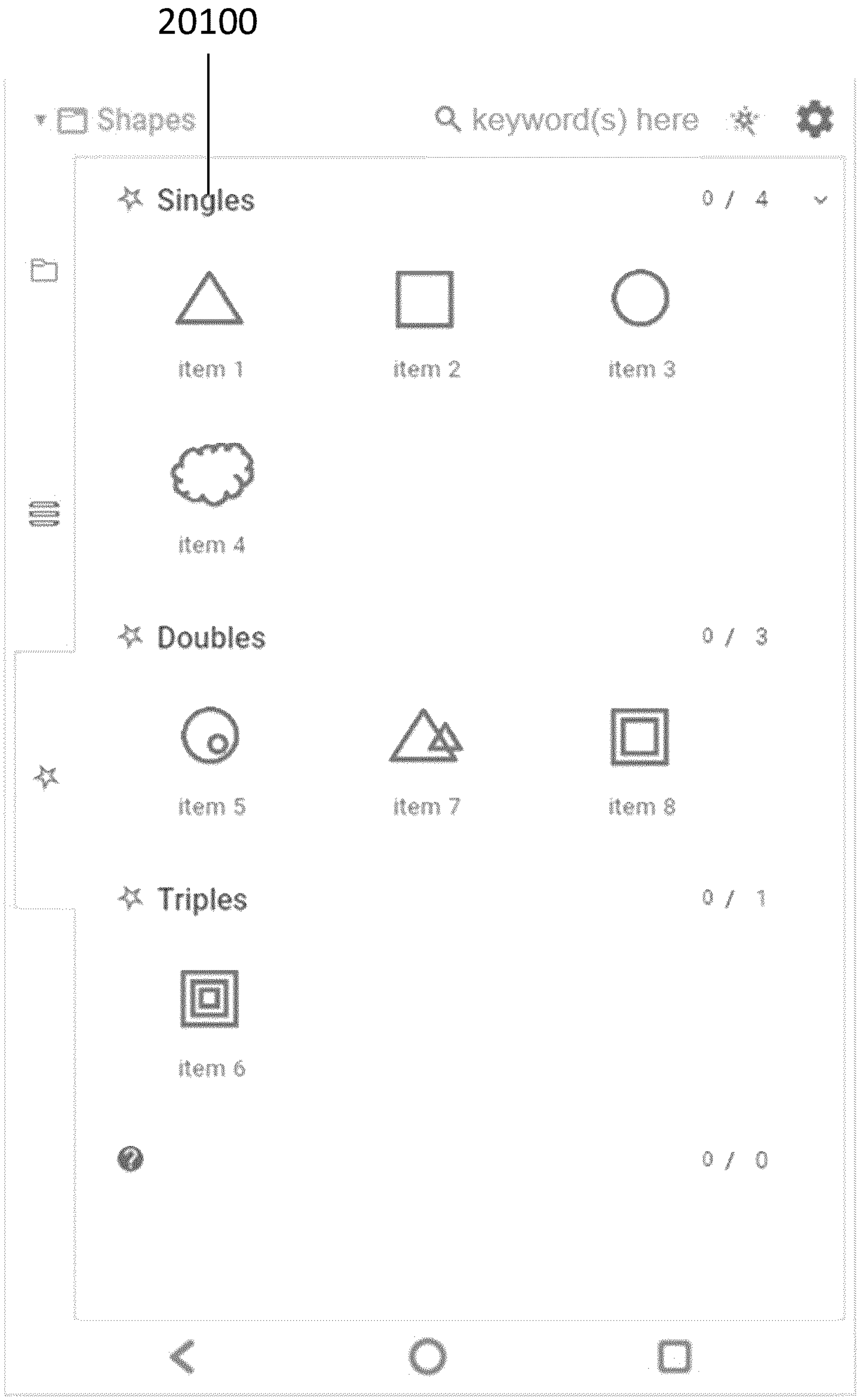
FIGS. 20(*a*) and 20(*b*) show embodiments with intuitive group names and visual graphic previews of individual items within a search group.
Figure 20B:
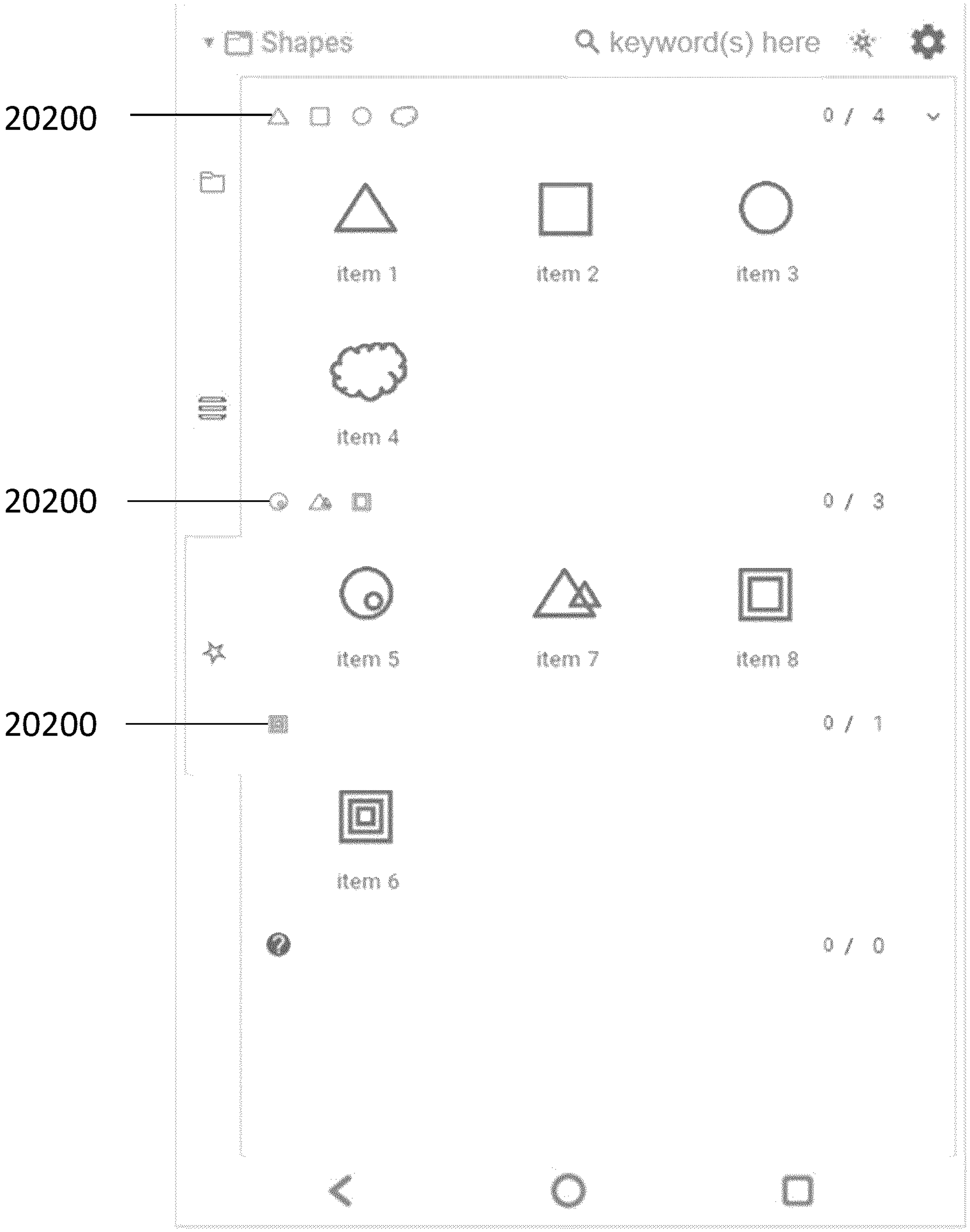

According to an embodiment, any regular search tree node can be converted by having an extra node presentation part inserted and its value initially set to the same as the search query. According to a further embodiment as shown in FIG. 20(*a*), the value can be updated to a more natural group name 20100 like "Singles" when the keyword for the group is "single". According to an alternative embodiment, group presentations of the nodes are not in text form. According to a further embodiment shown in FIG. 20(*b*), group presentations can be visual graphical previews 20200 of individual items within the search group. According to a further embodiment, additional functionalities are enabled by the group presentations of the nodes between the users and search queries in the search trees.

According to an embodiment, nameless groups are one type of application of grouping trees, where the search queries are, instead of user-defined query conditions in normal grouping trees, system-generated globally unique search IDs. According to an embodiment, nameless groups are grouping trees and not regular search trees, so even if the users get access to the internal search IDs and enter them as a search query, the resulting search node created will be a regular search node, not a grouping node. According to an embodiment, the uniqueness of the search IDs ensures that creations or modifications or deletions of a nameless group node and tagging or de-tagging the items in data collection using the unique search IDs will never affect any other sorted search result sets within the search trees.

According to an embodiment, nameless search groups allow users to be more focused on which items should be grouped together and how the groups should be arranged without worrying about how to describe the groupings to the computers before the data items are actually grouped. According to a further embodiment, items can be moved around more freely between different search groups, except for being in a sorted group and the unsorted group at the same time. According to an embodiment, nameless grouping permits files to be grouped arbitrarily without any interference from existing keywords. According to an embodiment, data items within a nameless group can be tagged using one or more common keywords for one or more other search trees.

Customizing the Search Tree Nodes and Using ID-Only Sub-Nodes

According to an embodiment, search trees can divide a file collection into different groups based on related search requests when the tree structures are presented to users for data managing tasks. According to an embodiment, items in a data collection can be identified and distinguished for any routine or operation or procedure in computers using search queries in general.

Figure 21A:
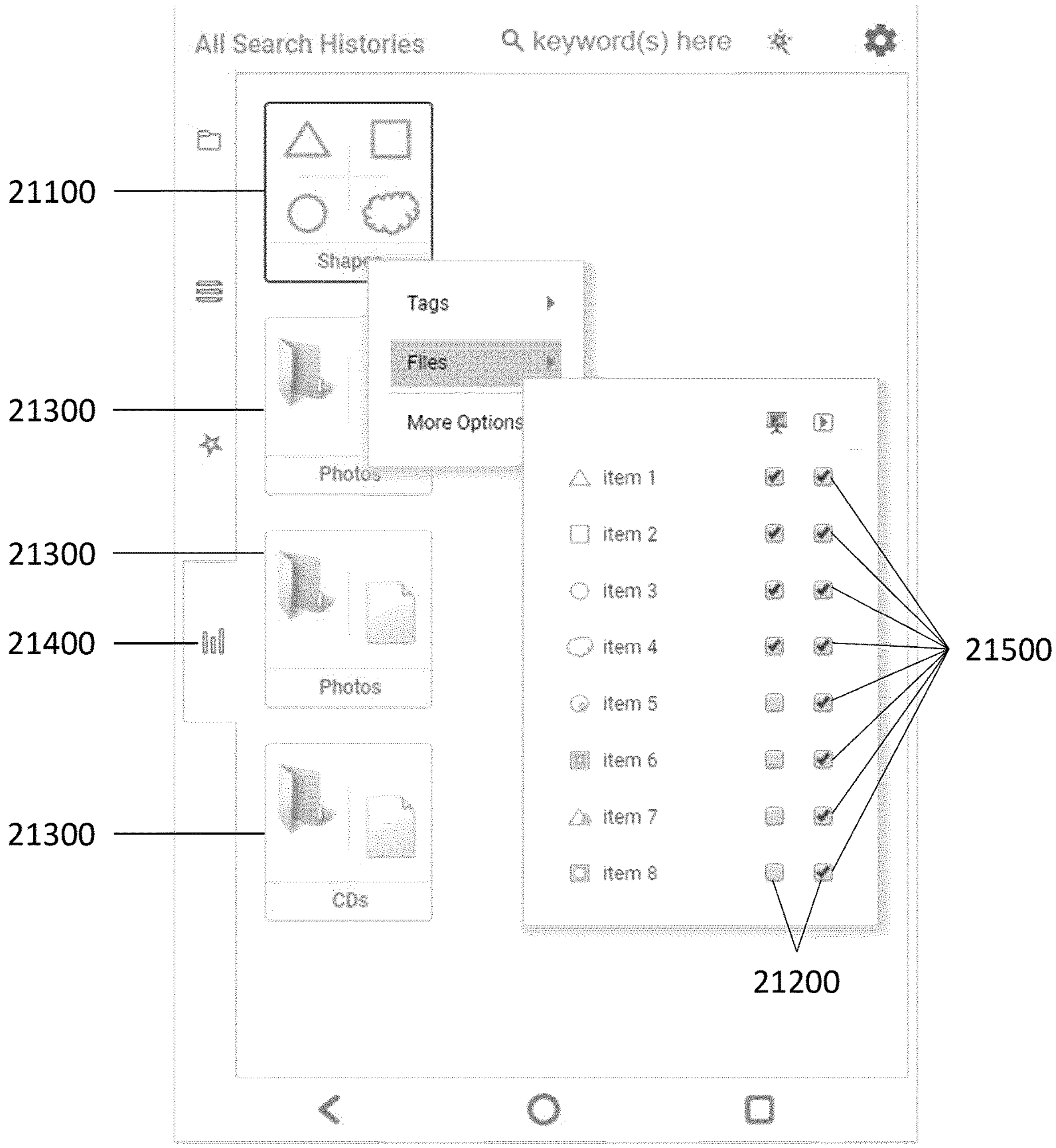
FIGS. 21(*a*) and 21(*b*) show an embodiment with customizable group presentations and file access controls using checkboxes or an auxiliary display panel.
Figure 21B:
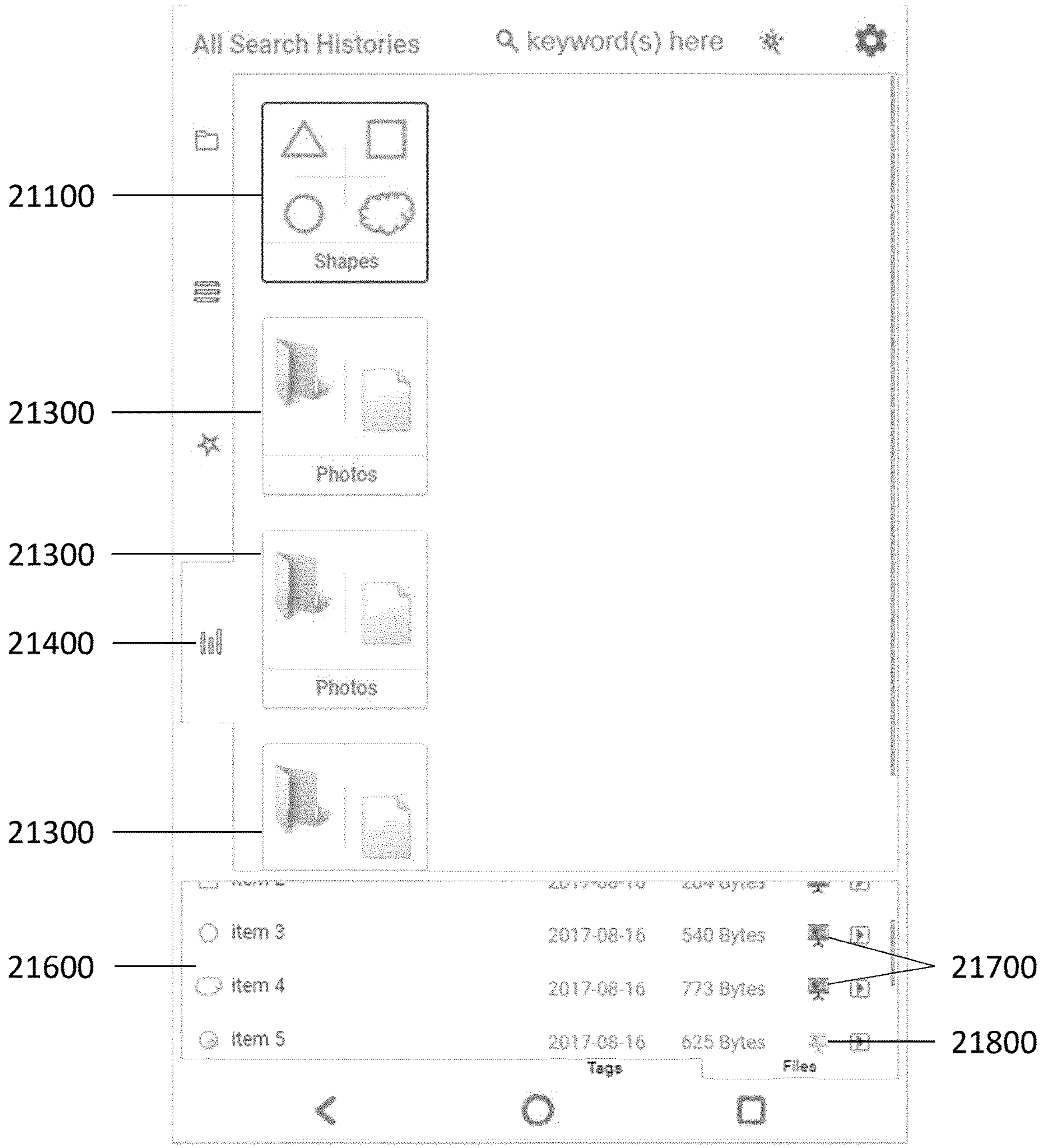

According to an embodiment shown in FIG. 21(*a*), there is an interface that provides customizable group presentations and file access controls in a search tree management system. In particular, FIG. 21 shows a node or group with a customized presentation 21100, and corresponding checkboxes for group presentation selection 21200, alongside groups without customized presentations 21300 in bookshelf mode 21400, wherein opening a group will get the selected items to directly play if the direct play checkbox is selected 21500 for an item. According to a further embodiment, the checkboxes for group presentation selection 21200 are disabled for non-image files. According to an embodiment shown in FIG. 21(*b*), there is an interface that provides customizable group presentations and file access controls using an auxiliary display subpanel 21600, showing selection toggled on 21700 and toggled off 21800.

According to an embodiment, the interface is designed to allow users to select data items inside a search group such that the group looks and functions like a single object instead of separate data items. According to a further embodiment, this is achieved by permitting users to control the preview image for the group using image files or preview images of any items and define a main functioning part of contents for the group and open the selected files directly when an open operation is requested on the whole group.

According to an embodiment, the interface is constructed to help the digitalized contents on a computer get presented and accessed as close to real-world objects as possible. For example, different music albums can be represented by their cover art or poster images and the songs from an album can be opened directly after users click on that cover image when both the cover art and the music files are grouped by, under, or inside the albums or together with other files.

According to an embodiment, the file management system can accommodate arbitrary files of arbitrary types in their storage structures or handle collections using the same program.

According to an embodiment, data items are worked on by a search engine so that customized selections are not cached or stored by the application program as a static list, but instead as a search query to the search engine. For example, "List the 3 files with the most recent access time from my working directory" where the number "3" may also be customized in the interface. According to an embodiment, the result list is continuously updated so as to always be up to date, even if files have been moved or renamed after their creation.

For data items being managed in a search tree, such selections are like sub-nodes under a parent search node as all the items for the selection are from the same data set for the parent node and have the same characteristics and properties that can be identified by the same search query. According to an embodiment, selections are integrated as sub-nodes of the parent node into the search tree structures. According to a further embodiment, such ID-only sub-nodes are like all other search sub-nodes under their parent tree nodes in that each of them still represents a search query and each of them still represents a set of data items within the collection defined by the parent search node and identified by the search query of the sub-node.

However, according to a further embodiment, the ID-only sub-nodes are not normal search sub-nodes for several reasons. The ID-only sub-nodes need to be isolated and excluded or separated from normal search sub-nodes using a processing indicator for their own sub-node type when being stored in the same sub-node list as all other normal sub-nodes under the parent node or by being stored in a separate list that links to the parent node so that each gets worked on in an isolated workspace, is not presented to the users, does not affect the unsorted node under the parent (if one exists), and does not participate in any routines for normal search sub-nodes. According to a further embodiment, each ID-only sub-node is associated with one specific processing routine by an operation-ID that can match the ID-only sub-node with the routine. Consequently, each ID-only sub-node stores a single selection of items from a data collection for a single processing routine, which are represented by the search query of the sub-node, the parent search node, and the operation-ID of the sub-node, respectively.

According to an embodiment, associations and dissociations of the processing routines and the search groups or nodes get controlled by attaching or detaching such ID-only sub-nodes to the nodes. According to a further embodiment, one search node can have multiple ID-only sub-nodes with different operation-IDs for different customizable routines to work on it. According to an embodiment, the same processing routine is linked with different collections or search-nodes in different ID-only sub-nodes using the same operation-ID.

According to an embodiment, by attaching individual ID-only sub-nodes with the same operation-ID value under different search nodes, the same customizable routine can work on different data collections, represented by the different search nodes, using different selection criteria, represented by different search queries in the individual ID-only sub-nodes. While this may seem redundant when the selection is something like "Listing the first X files with the most recent access time from the collection" because the same query will be stored over and over again in different places, it will also make the value for "X" in the queries customizable for different collections, for example, "2" for "collection # 2" and "5" for "collection # 3".

According to a further embodiment, there are use cases where search queries always need to be different for different collections, even for the same processing routine. According to a further embodiment, when the selections are arbitrary one-by-one selections on a list of arbitrary data items, a technique similar to that used for nameless grouping can be applied in that one globally unique search-ID is generated and stored in the ID-only sub-node for the selection query and the data items are tagged, and then later can be identified, using the globally unique search-IF for the selection.

According to an embodiment, only by using different search IDs will the data items that belong to different selection lists be allowed to get identified for different collections. Such search-IDs and their use as tags on the data items will not interfere with any normal search functionalities, not only because they are globally unique, but also because they are part of the ID-only sub-nodes.

According to an embodiment, such tags can be saved separately for different applications so that they can be removed when the application is uninstalled, or, they can be saved normally to be visible to everyone, including human users, to provide an additional communication mechanism between applications. According to a further embodiment, the processing routines that work on search tree nodes and use the customizable selections can perform several subsequent functions. These include checking if the routine itself is set to run on the collection (i.e., search group or node), if an ID-only sub-node with its operation-ID exists under the search node. These functions also include getting back the customized selection using the ID-only sub-node by evaluating the corresponding search query, including normal keywords, other search conditions, or the globally unique search-ID, against the data collection. According to a further embodiment, if no customization has been defined (i.e., no corresponding ID-only sub-node or the search result set for the selection comes back empty), then processing will be redirected to a default routine. According to an embodiment, using the ID-only sub-nodes under the normal search nodes, items in a data collection are dynamically identified for processing routines within search tree management systems.

Tagging the Tags: Customizable Grouping without Using Search Trees

In addition to the functioning data, such as the digitalized texts, images, videos, etc., that make their contents useful to human users, files in computer systems are also often associated with attributes and properties maintained and utilized just for file managing tasks. File and folder names are one of the most important and commonly used properties in tasks, and there are several other properties, like file types, sizes, creation times, etc., that are useful for file management too.

Figure 22:
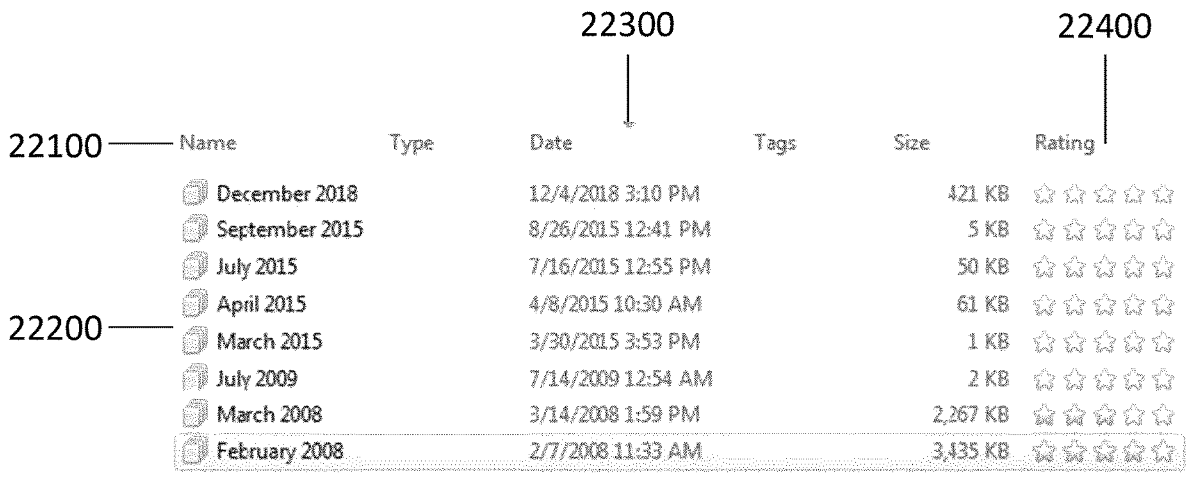
FIG. 22 shows an embodiment where attributes and properties can be displayed as details of files and folders for use in recognizing, distinguishing, accessing, and organizing files and folders.

According to an embodiment shown in FIG. 22, attributes and property can be displayed as details about the files and folders for use in recognizing, distinguishing, accessing, or organizing files and folders. In particular, there is a header row 22100 for property names, with property values 22200 being displayed in columns, and the file list being sortable 22300 based on property values.

Figure 23:
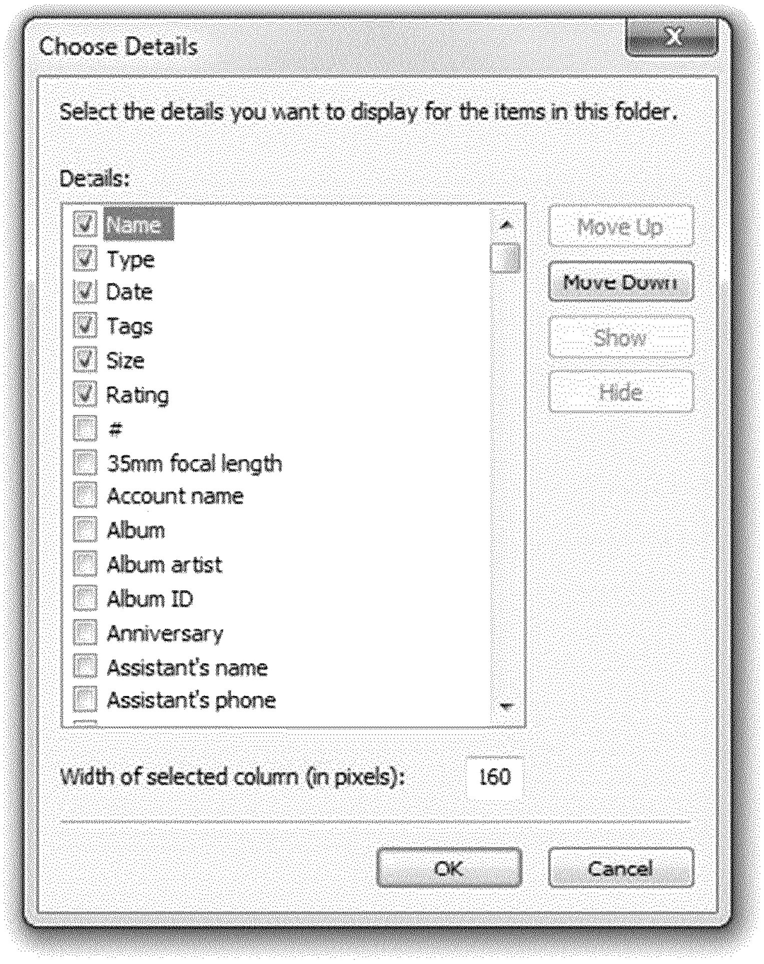
FIG. 23 shows a long list of possible attributes and properties that are provided to users in an embodiment.

According to an embodiment shown in FIG. 23, a long list of possible attributes and properties are provided to users to cover as many choices as possible and to make the interface as flexible and comprehensive as possible for a diverse range of users. Nonetheless, there is a need for system created or maintained attributes and properties.

Properties are data that describe other data in the form of name:value pairs. For file properties in file management systems, the name is a text label that refers to a common aspect of all files across the entire collection and the value is the actual data, of any type, associated with a particular file for describing that particular file with respect to that particular aspect referred to by the name.

Figure 24A:
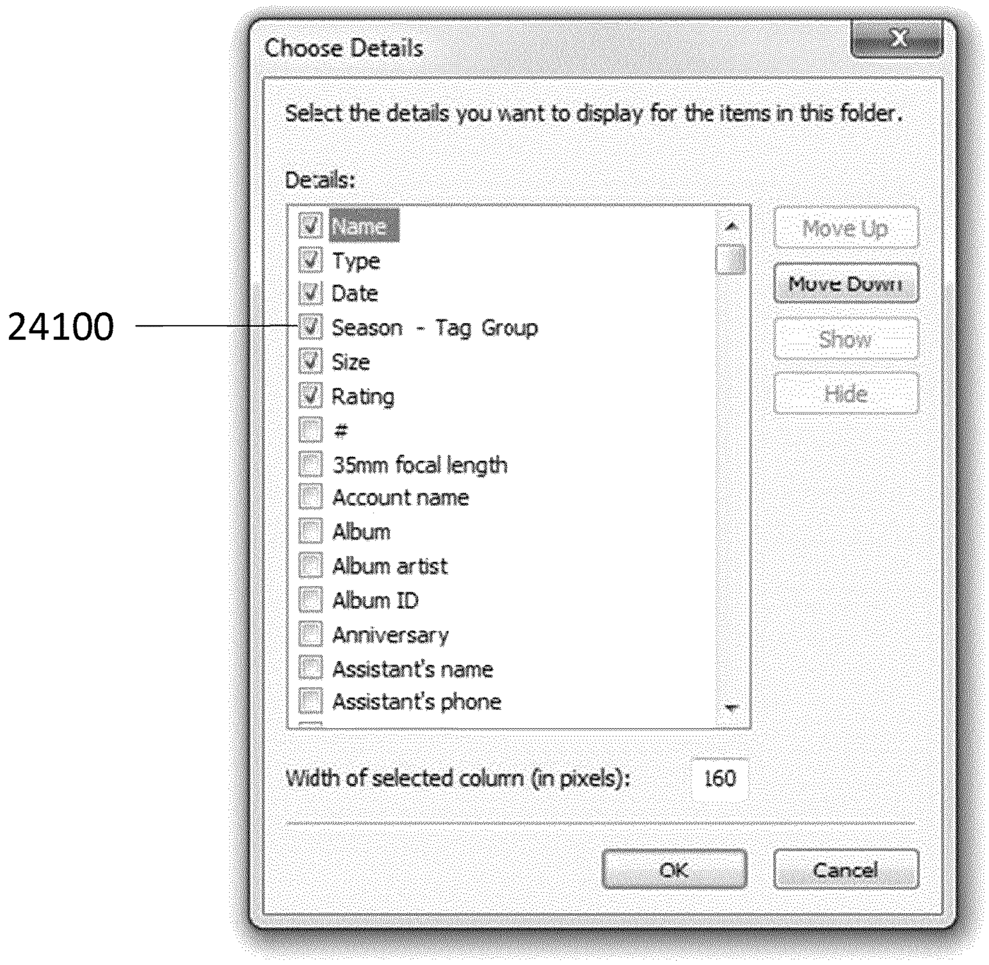
FIGS. 24(*a*) and 24(*b*) show embodiments where user-defined tags are presented in the same way as system-generated properties and can be displayed in a column alongside other detail groups in an interface for individual values.
Figure 24B:
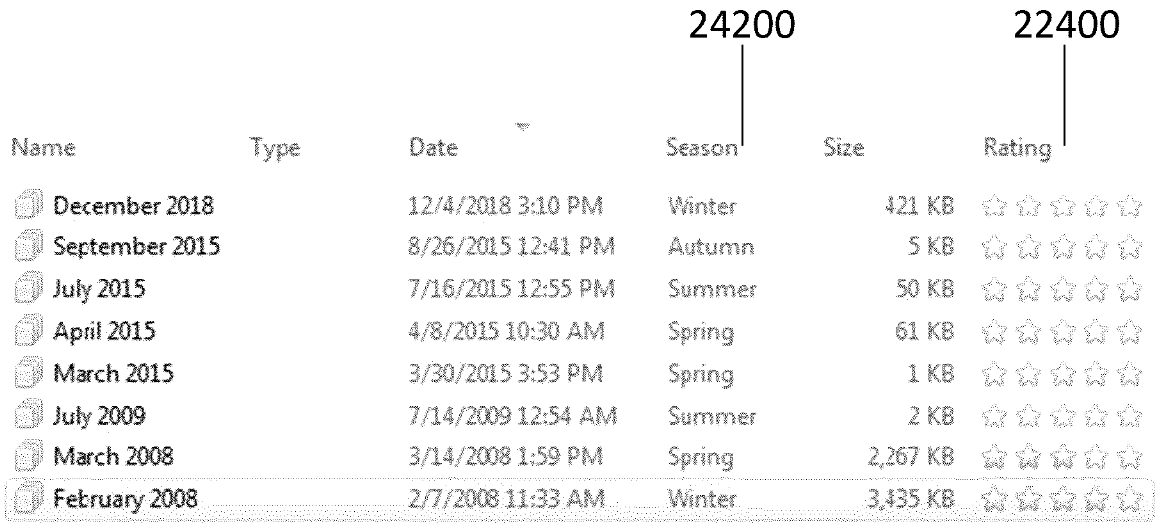

According to an embodiment, customizable file properties are available to users. Once user-defined tags are generated, stored, and used in the same form of name:value pairs, they are presented in the same way as system-generated properties. According to an embodiment, tag groups can be listed and displayed in the same way as system-generated properties. According to an embodiment, the name "Season" of a group of the user-defined tags is listed as an option 24100 together with other system-generated properties in FIG. 24(*a*) so that an independent column 24200 can be placed in the interface for individual values (e.g., "Spring", "Summer", "Autumn", and "Winter") of the tags under the group "Season" to be displayed alongside all other detail groups, like as shown in FIG. 24(*b*). According to an embodiment, different groups of tags can be listed in the same way under different columns.

Figure 25A:
FIGS. 25(*a*) and 25(*b*) show embodiments where tags can be grouped by tagging the tags through an interface and which may have autocompletion or other operating system assistance when adding and using group name tags.
Figure 25B:
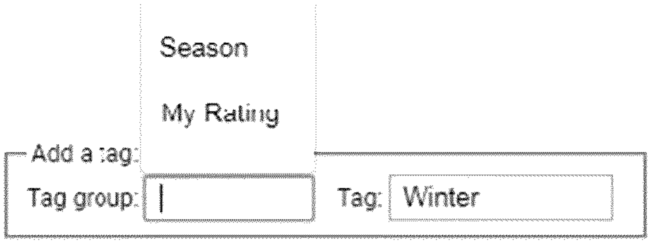

According to an embodiment, tags can be grouped by tagging the tags by adding a common group-tag to the tags that belong to the same group. According to an embodiment shown in FIG. 25(*a*), an interface allows users to add or modify a tag on a file or files with a group name being set. According to a further embodiment shown in FIG. 25(*b*), operating systems provide assistance, like through auto-completion, for the same group names, to be re-used more easily in the interfaces.

Figure 26:
FIG. 26 shows an embodiment where an additional field type can be added for sorting and presentation choices after tags with similar characteristics are grouped together.

According to an embodiment, while the name part in a name:value pair is generally a string of text that describes the group, the property value can be any data that is capable of describing that particular aspect of that particular file. According to a further embodiment, it can be a number, a Boolean (true or false) statement, a text string, or another indicator or programming instructions. According to a further embodiment shown in FIG. 26, an additional field type (e.g., texts, numbers, dates, etc.) can be added for proper sorting and presentation choices after tags with similar characteristics are grouped together. According to an embodiment shown in FIGS. 22 and 24(*b*), more sophisticated implementations permit user-defined values to be presented in a more complicated way, like by defining a field type for "0 to 5 (Integer by Stars)" and then using a mapping between a numeric value and an image presentation to create a "Ratings" user-defined value and tag column 22400.

According to an embodiment, tags are all plaintexts managed by the file systems so that they are visible and accessible to all application programs at all times. According to a further embodiment, there are additional conventions for storing and maintaining the different types of values when they are in non-text formats so that the tags can still be presented or processed properly. According to an embodiment, there are additional conventions for storing and maintaining the group-value pair relationships. According to a further embodiment, these conventions include using a delimiter between the group name part and the value part of a grouped tag.

Figure 27:
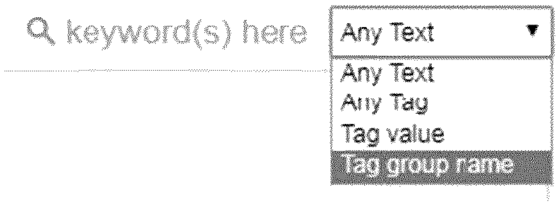
FIG. 27 shows an embodiment where users can specify the keywork type when searching within search interfaces to determine how tag group names are handled.
Figure 28A:
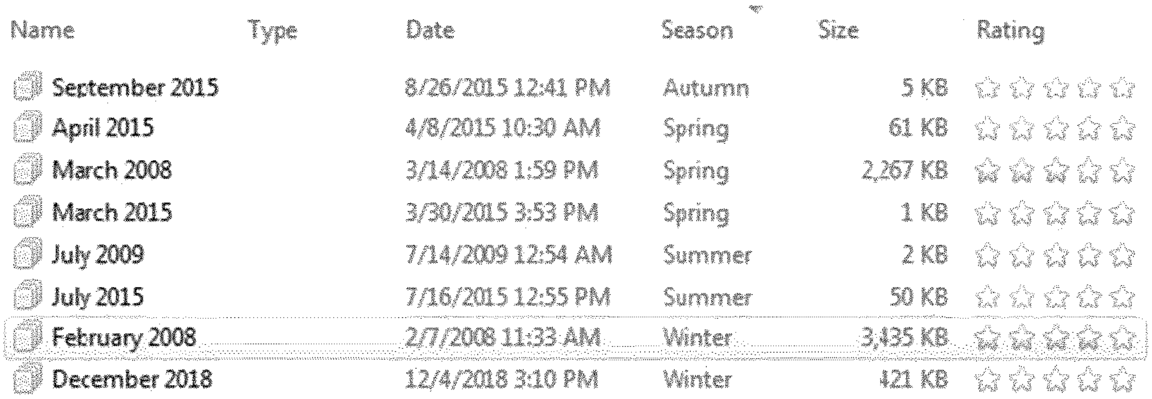
FIGS. 28(*a*) to 28(*g*) show embodiments with customizable sorting functions and interfaces.
Figure 28B:
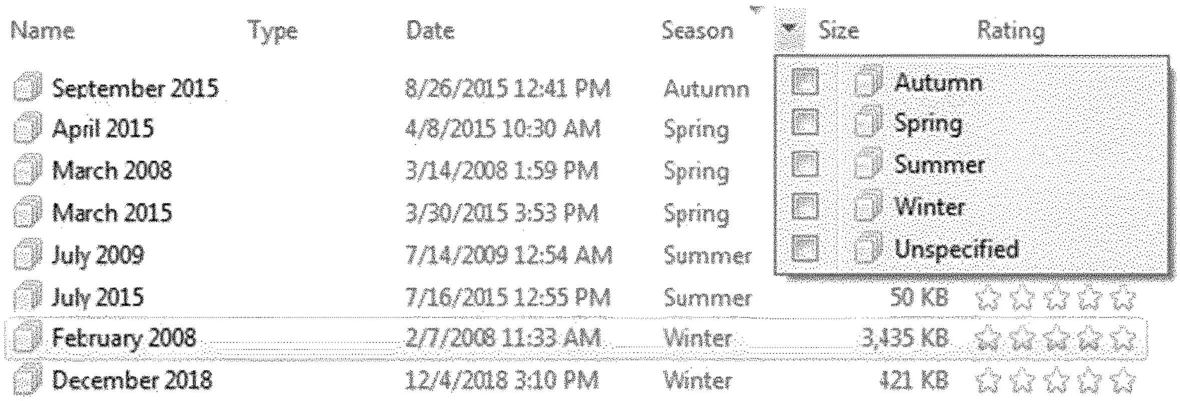
Figure 28C:
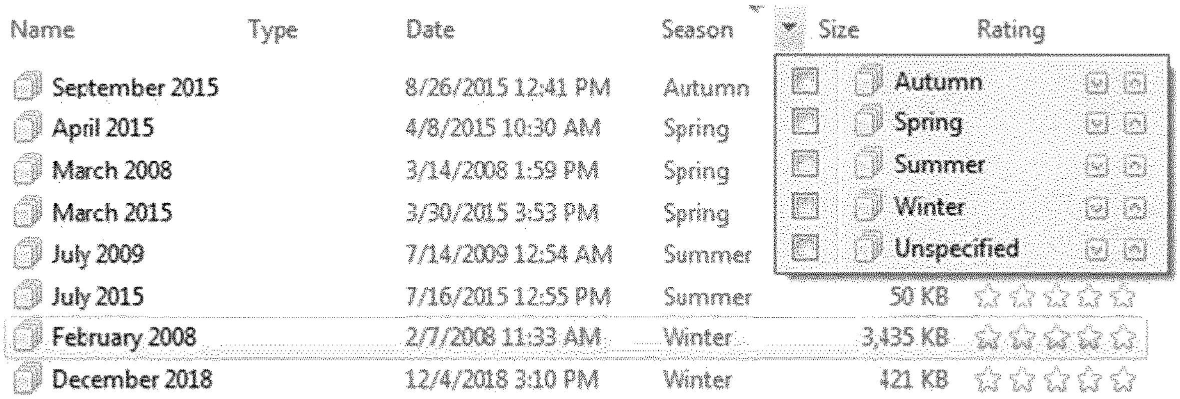
Figure 28D:
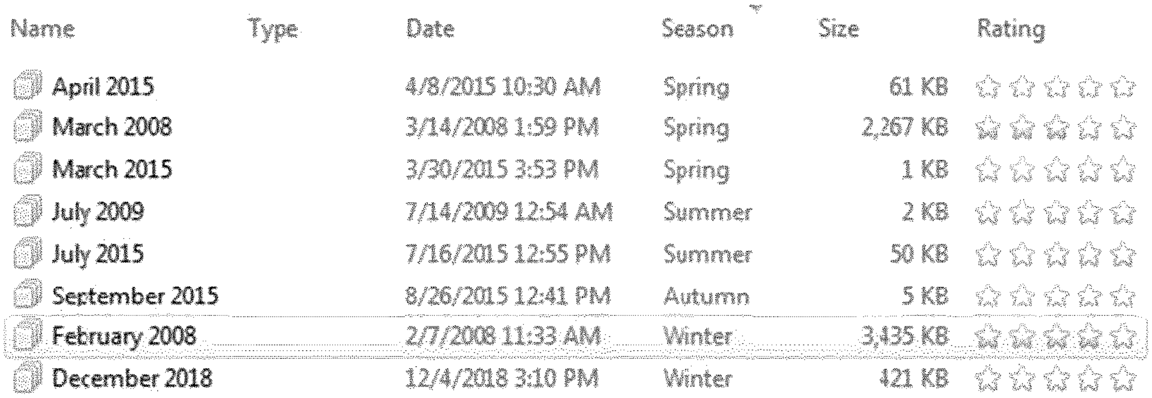
Figure 28E:
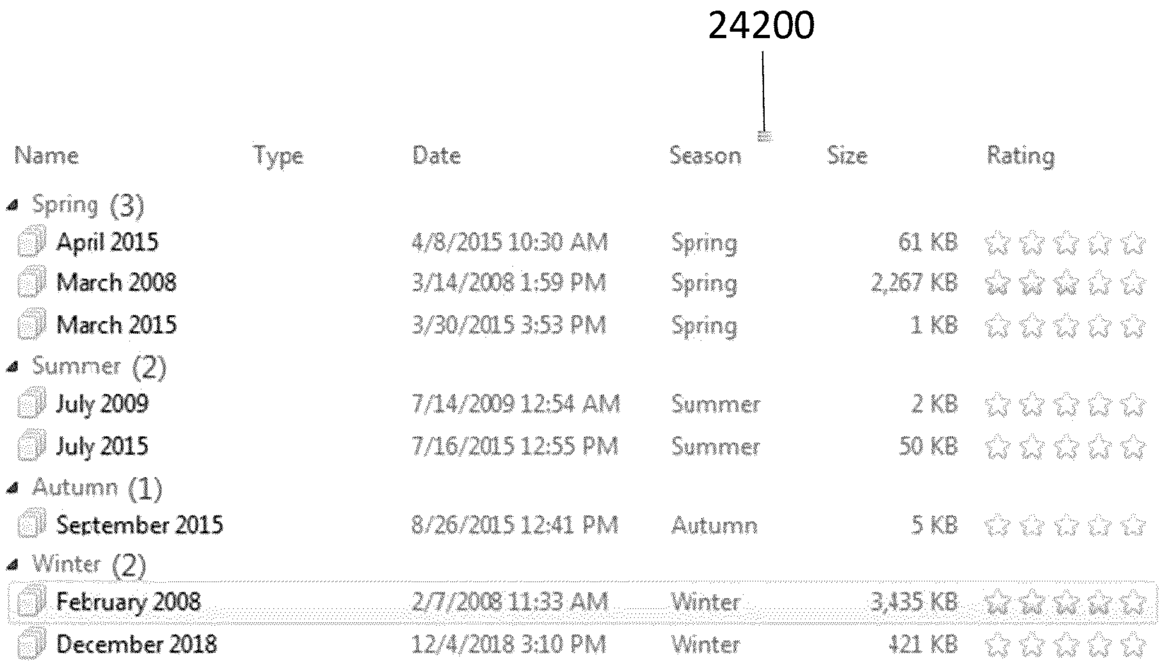
Figure 28F:
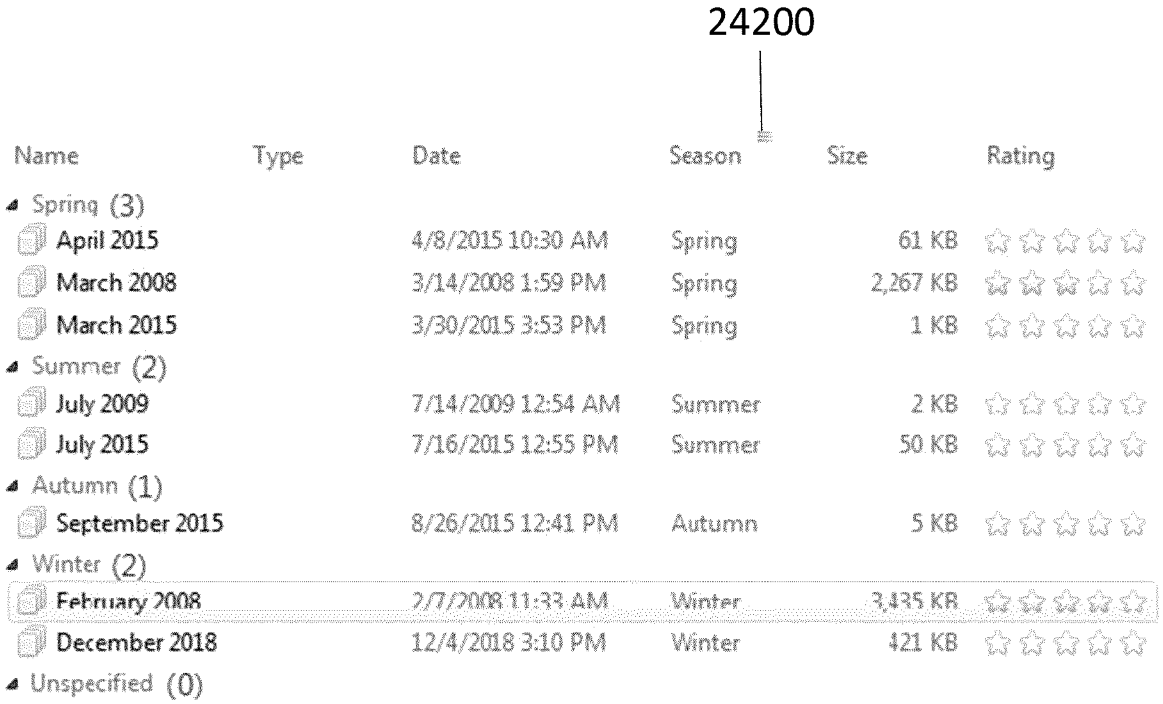
Figure 28G:
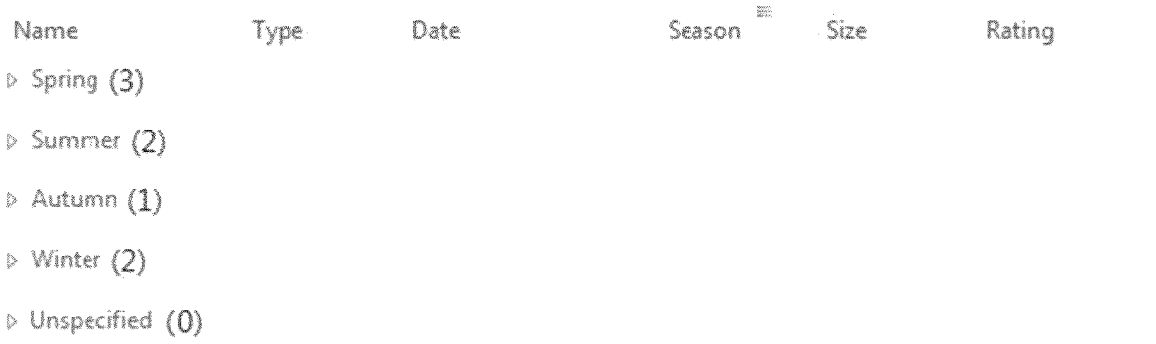

According to an embodiment, tag group names and tag types are, by default, excluded as keywords when the file location is searched, since they only contain additional data regarding the tags and not information regarding the files being searched within the collection. So, when they do appear in the queries, like the ones on the system-generated-and-maintained properties, the requests are normally in a form like "List files with FileSize≥2G" with both the name and the value of the property specified, and never something like "Is the property FileSize available among the files?" for property names alone. On the other hand, unlike the system-generated properties, tags are user-defined and may still be relevant in questions like "Has Season been defined as a group of tags?" when querying on tag group name alone. According to an embodiment, tag group names and tag types are not excluded by default as keywords. According to a further embodiment shown in FIG. 27, users can specify the keyword type when searching within the search interfaces to determine how tag group names should be handled.

According to an embodiment, separate data structures or search indexes are built for the additional queries on tag group names and types. According to a further embodiment, the separate data structures or search indexes are built depending on the data collection characteristics and usage patterns. For example, the system may need to keep track of all tag group names; otherwise, all the data items in the collection will need to be scanned just for the tag groups to be recognized and listed for additional options.

Another restriction on system properties and attributes is that one file or folder normally can only have one associated value. That is, a file cannot have multiple file names, multiple file types, or multiple modification times and in such cases, sorting on the values will fail, too, because one file would have to be appearing multiple times within the sorted list for the multiple values it has in that field. According to an embodiment, for user-defined tags within a tag-group and depending on system requirements and implementations, care need not be necessary to ensure such rules are enforced. According to an embodiment, if multiple values are allowed, like if "season—Summer" and "season—Autumn" on a file from "End of August", extra routines are implemented to handle both presentations and operations in the application.

File managing systems normally allow files and folders to be listed in order by the values of an attribute or property. According to an embodiment, after groups of user-defined tag values get recognized and represented the same way as system-generated property values, a file list can be sorted by such values. According to an embodiment shown in FIG. 28(*a*), the file list can be sorted alphabetically by the "Season" values. According to an embodiment shown in FIG. 28(*b*), interfaces may also provide additional options like displaying or suppressing files by attribute or property values.

According to an embodiment, the interface can be adapted so that the sequence or order in which the values appear when being sorted can be customized or specified. According to a further embodiment as shown in FIG. 28(*c*), such an interface adaptation permits shifting "Autumn" downwards to a slot between "Summer" and "Winter" to permit sorting the "Season" values in the order they naturally occur in a calendar year, like as shown in FIG. 28(*d*). According to an embodiment shown in FIG. 28(*e*), after the files are sorted by tag values they can be grouped by adding group names (using the tag values), collapse or expand controls, statistic information, and a dividing line and can be flagged with a "Grouped" indicator 28100. According to an embodiment shown in FIG. 28(*f*), an unspecified group is made available for all items without any value for the attribute or property or tag-group. According to an embodiment shown in FIG. 28(*g*), the groups are collapsible.

Figure 29:
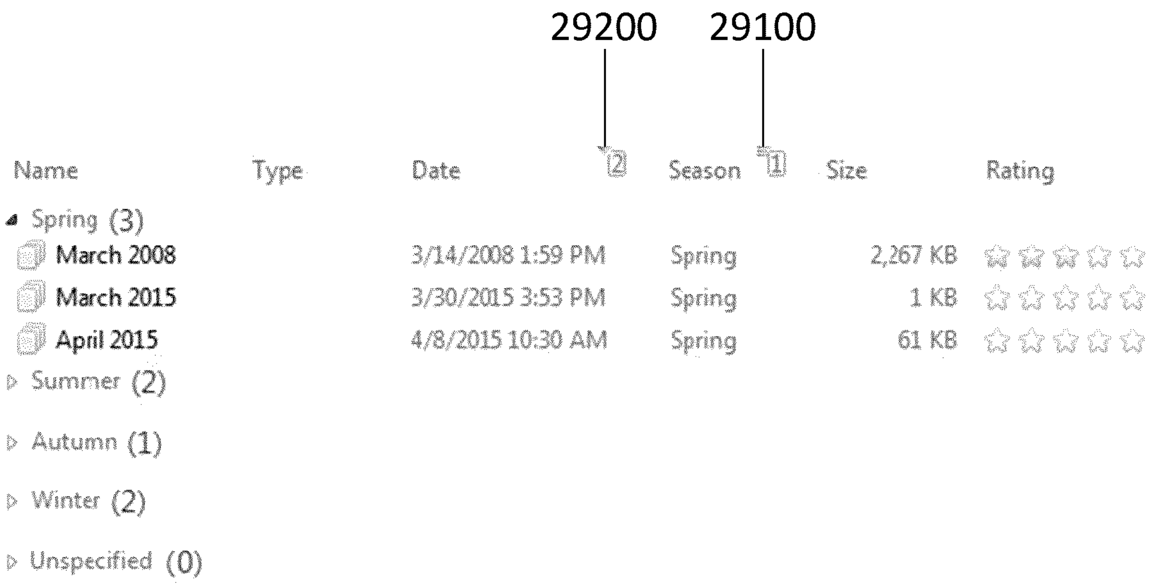
FIG. 29 shows an embodiment where files are first grouped by one value then sorted by another.
Figure 30:
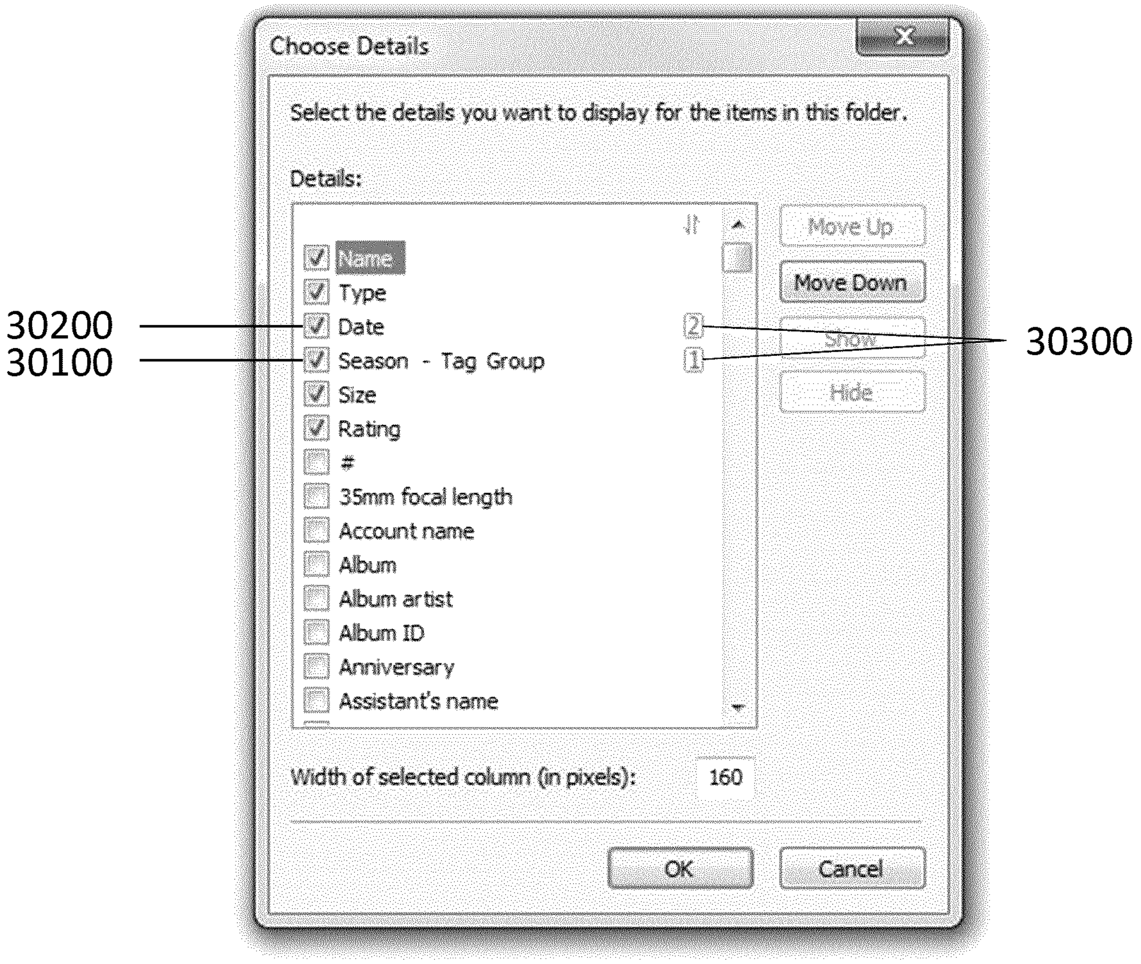
FIG. 30 shows an interface embodiment that allows multi-level sorting and grouping.
Figure 31A:
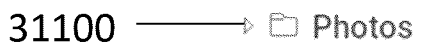
FIGS. 31(*a*) to 31(*f*) show folder presentations of embodiments with a children-list toggle, an individual item toggle, a select button, and an open button.
Figure 31B:
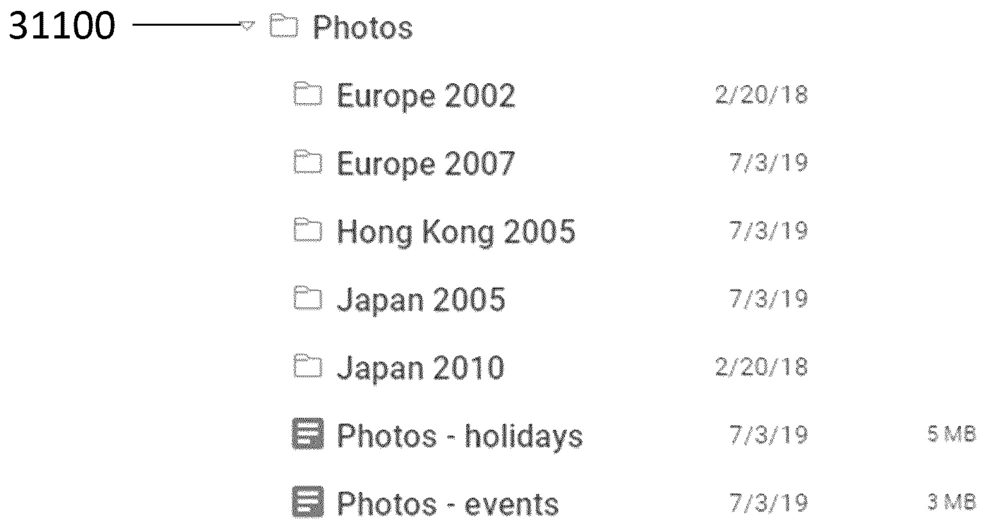
Figure 31C:
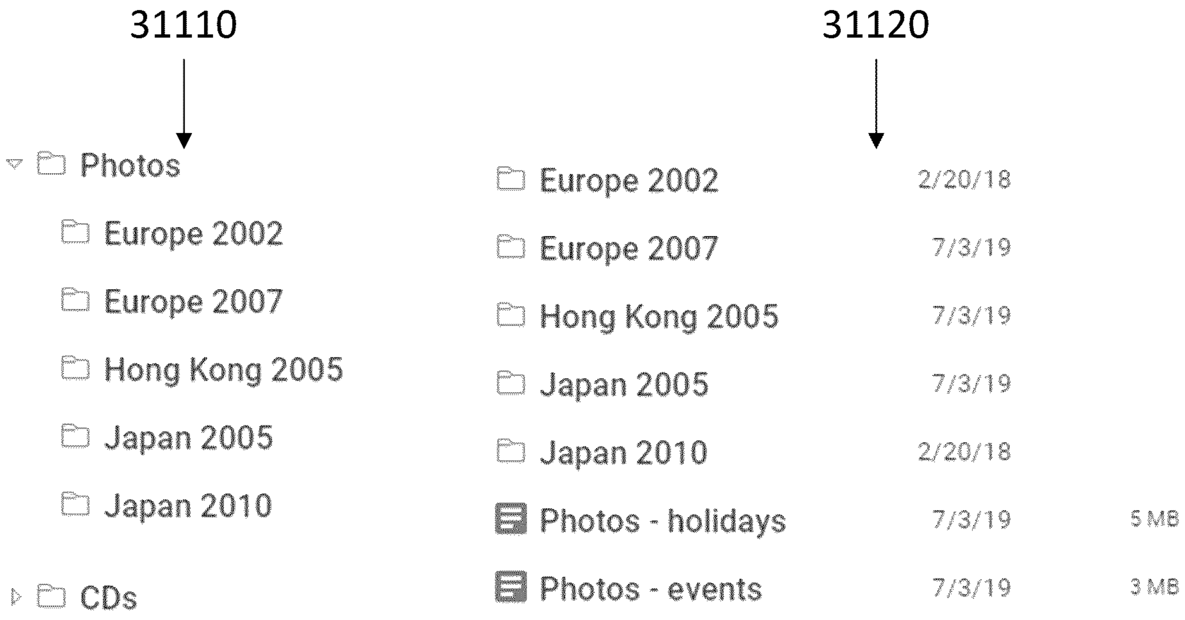
Figure 31D:
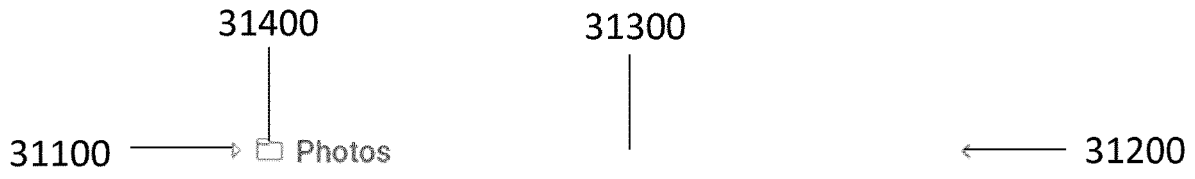
Figure 31E:
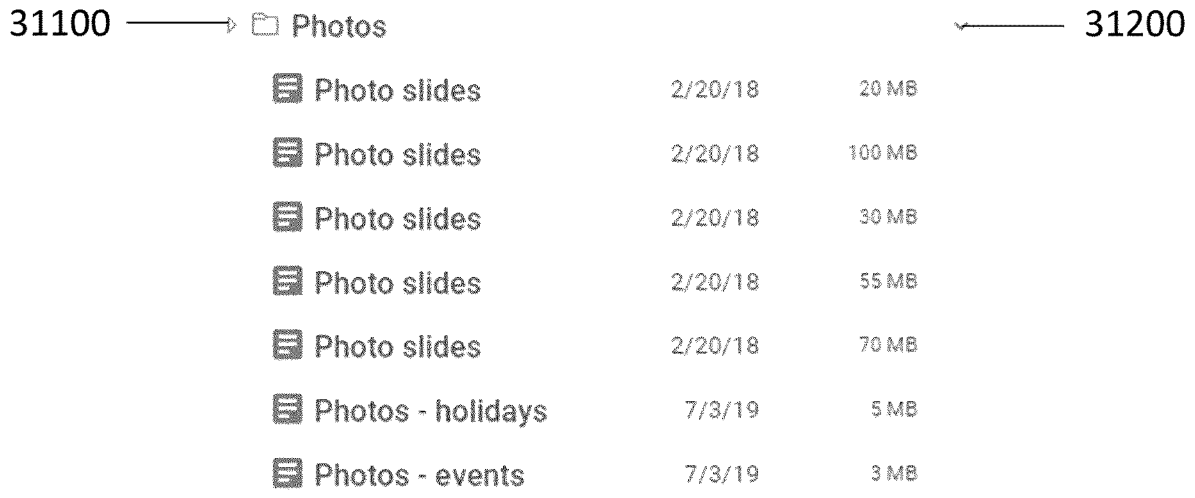
Figure 31F:
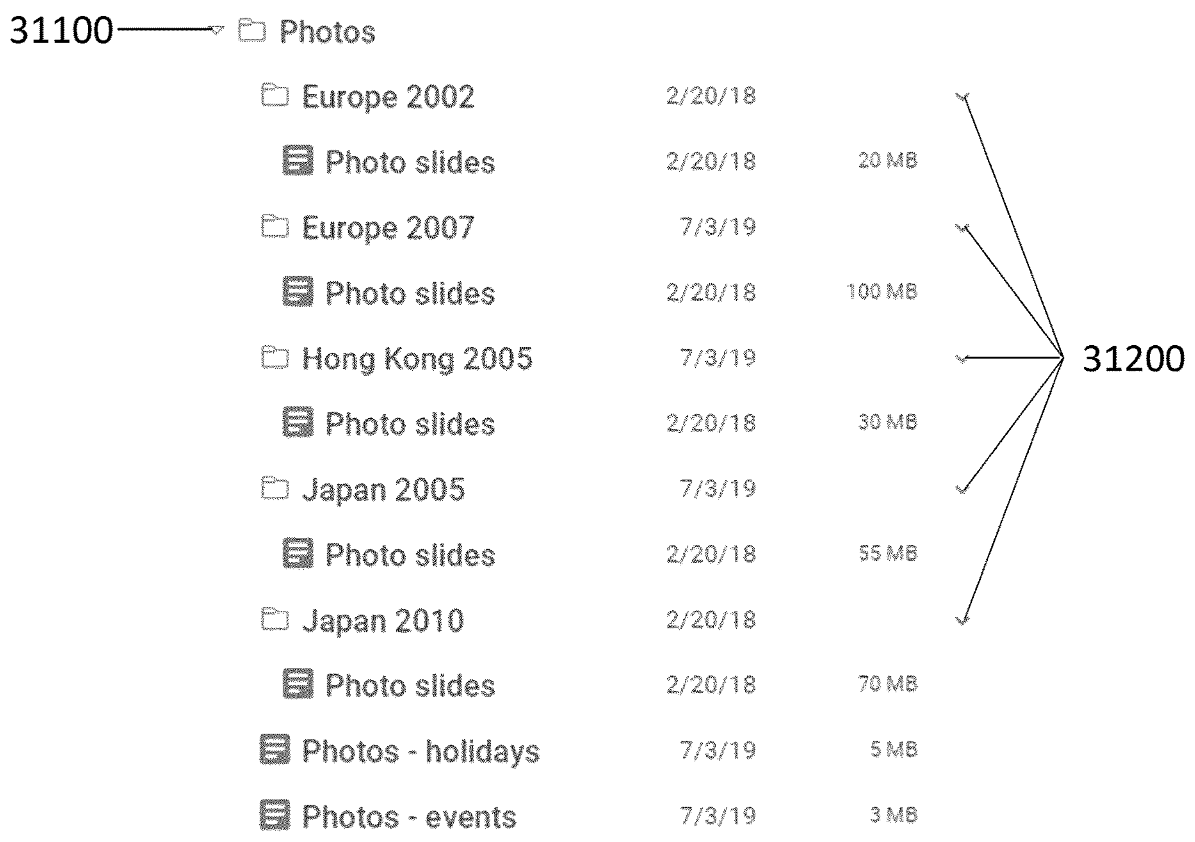
Figure 32A:
FIGS. 32(*a*) to 32(*d*) show a sample storage-folder structure and its search tree presentation.
Figure 32B:
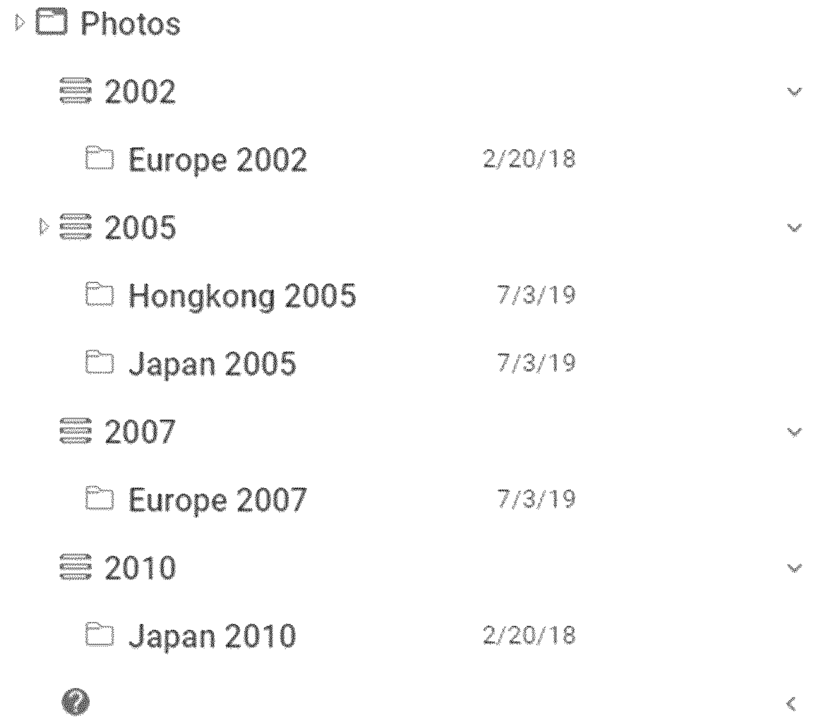
Figure 32C:
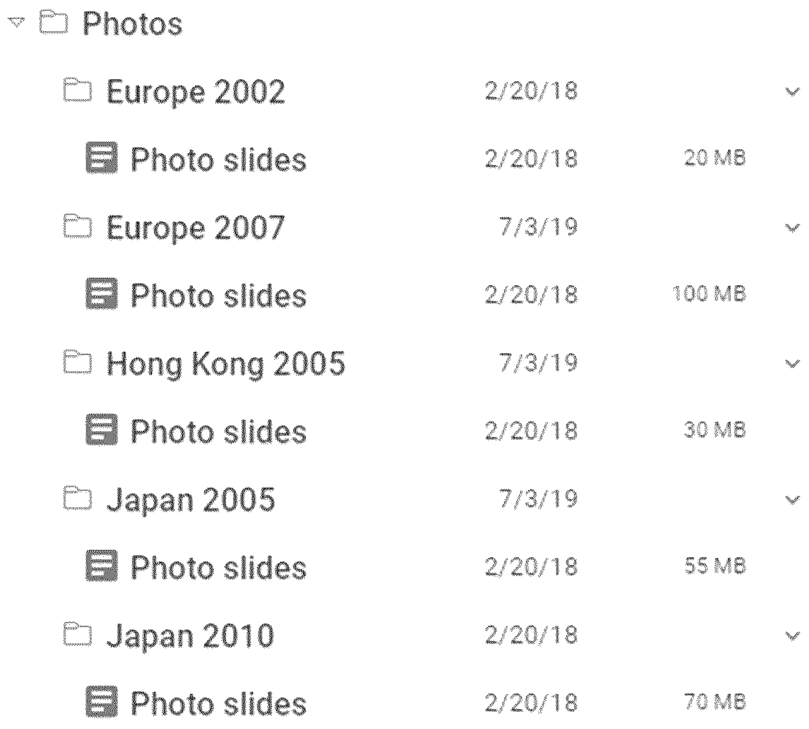
Figure 32D:
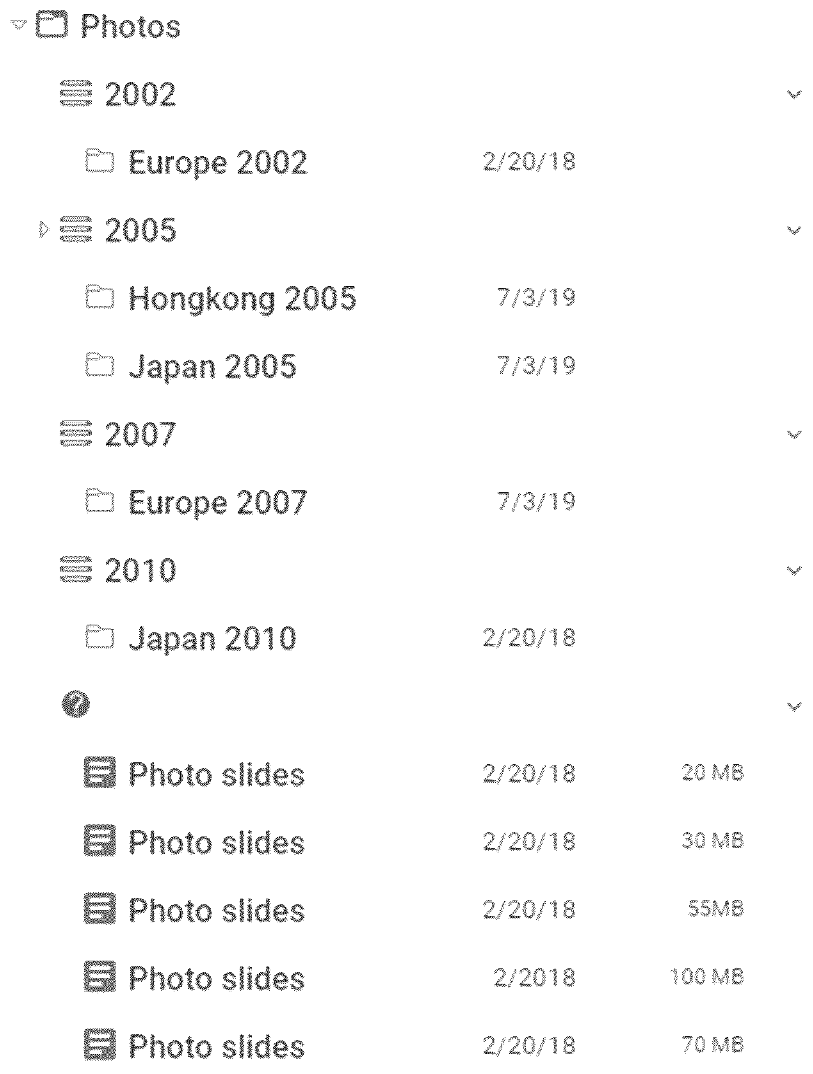

According to an embodiment, multi-level grouping is achieved by sorting by multiple attributes. According to an embodiment show in FIG. 29, files are first grouped 29100 by their "Season" values and then the files in the group for "Spring" are sorted 29200 by their "Date" values. According to an embodiment, any sorted groups can be subsequently grouped at any level. According to an embodiment, there is an interface that allows multi-level sorting and grouping, like in FIG. 30 wherein "Season" 30100 and "Date" 30200 values are selected to be grouped and sorted at the same time, with the order specified for the grouping and sorting by the numerical indicators 30300.

Merging Search Trees and Folders Together Using a Single Hierarchical Structure

According to an embodiment, one purpose of building the additional search trees is to provide alternative "accessing-paths" to the folders and the files in the storage folder trees. According to a further embodiment, where both the search nodes and the folders are presented and managed together, it will be beneficial or even critical for them to be visually, logically, functionally, and operationally similar to each other. However, such presentation forms have typically lacked the flexibility required for search tree management.

According to an embodiment, folder presentations have analogous functionalities to 6100, 6200, 6300, and 6400. According to an alternative embodiment, the four functionalities can be implemented as menu options or any other conventions provided by an operating system or the application program, alone or combined.

According to an embodiment shown in FIG. 31(*a*), a button 31100 with similar functionality to 6100 is available and visible on parent folders with subfolders as a children-list toggle. According to an embodiment shown in FIG. 31(*b*), after 31100 is expanded, the sub-folders, together with the files directly under the parent folder (if any), become visible under the parent folder. This presentation is slightly different from either of the two existing commonly-used presentations for folders depicted in FIG. 31(*c*) that have either an incomplete content list 31110 or that do not display the parent folder 31120, and, according to an embodiment, it is as if both are combined together under the parent folder so that the parent folder, the list of immediate sub-folders, and the list of individual files under the parent folder can be visible together in one place. According to an embodiment, 31100 differs from existing sub-folder toggles in folder tree navigation because the child files directly under the parent folder are also visible, making both the tree structure display and the content (child lists) display complete, in one place for a parent folder.

According to an embodiment shown in FIG. 31(*d*), a button 31200 with similar functionality to 6200 is available on all folders as an individual item toggle. According to an embodiment shown in FIG. 31(*e*), after 31200 is expanded, a complete list of all the child files without any hierarchical tree structure of the sub-folders becomes visible under the parent folder. According to an embodiment, the 31200 file-list toggle corresponds to the file-only search result on the parent folder, so it is easy to implement in a system where searching functionality is readily available.

According to an embodiment, any file under the parent folder or under any sub-folder of the parent is accessible at any level inside the folder tree structure, which is convenient for when the files are needed for customized folder presentation at an arbitrary level, for example.

According to an embodiment, 31100 and 31200 work together to provide a flexible and complete presentation that includes both the tree structure and individual file items as shown in FIG. 31(*f*). Because, in terms of displaying the detailed contents of the parent folder, presentations are always complete using either button 31100 or button 31200, the presentations of a parent folder using both the buttons on different folders and sub-folders will be guaranteed logically complete, no matter what the end forms of the presentations are. Like 6100 and 6200 on search tree nodes, 31100 and 31200 need to be coordinated, too, so that they do not get expanded at the same time for the same folder.

According an embodiment, a select button 31300 and an open button 31400 with similar functionality to 6300 and 6400 are incorporated. According to a further embodiment, 31300 and 31400 are incorporated as shown in FIG. 31(*d*).

According to an alternative embodiment, using 31100, 31200, 31300, and 31400 presentations and controls, the search tree nodes and the storage folders behave similarly when being managed in the same system interface. However, they are still separate tree structures. Due to the fact that existing search engines only work on the relationships between the search requests and individual items in the data collections and do not recognize anything (particularly relationships) between the files and folders, the parent folders, sub-folders, or individual files all get treated equally and mixed up in the search result sets as separate independent items. The logical and hierarchical (i.e., containing) relationships represented by the folder tree structure are completely lost after the collections go through the searching process. Consequently, the search tree nodes and the folders are not logically merged together using a single hierarchical structure.

For example, for a sample storage-folder structure depicted in FIG. 32(*a*), the search tree presentation in FIG. 32(*b*) seems to look fine for the folders (and only for the folders) to be grouped using some keywords. However, problems arise as soon as the folders actually contain individual files in them, like in FIG. 32(*c*). Within the search tree, despite the fact that the individual files are inside their corresponding parent folders, they are not considered as matching with the keywords, because existing search engines do not recognize the containing relationships between the folders and the files. According to an embodiment shown in FIG. 32(*d*), files that are not considered as matching with the exact keywords of a grouping will get listed under the unsorted node.

Figure 33:
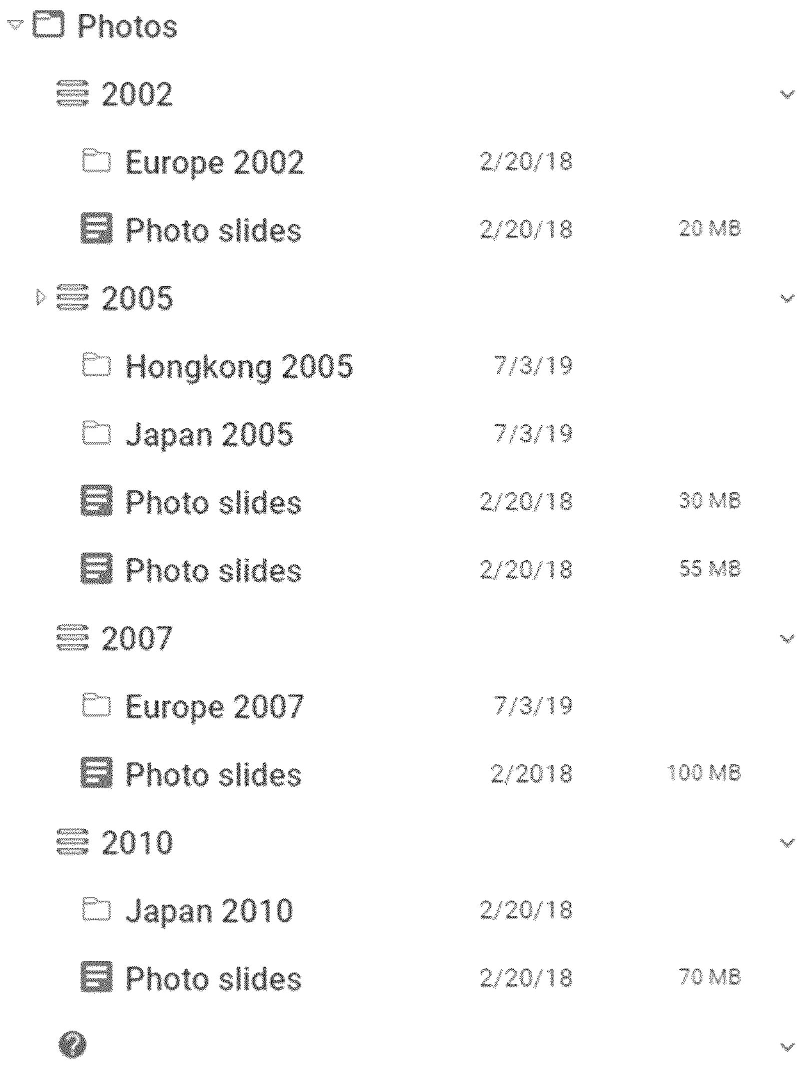
FIG. 33 shows problems that persist even if files have the same searchable characteristics and are listed under the same search node as their parent or containing folders.

Even if the files have the same searchable characteristics (for example, after being manually tagged, one by one, using the same keywords as their parent folders) and they do get listed under the same search node as their parent folders, problems still persist. For example, in FIG. 33 it can be hard for users to distinguish which “Photo slides” is originally under “Hong Kong 2005” and which is originally under “Japan 2005” when they are all detached from their parent folders in the search result list, leaving the unsorted node empty.

Figure 34:
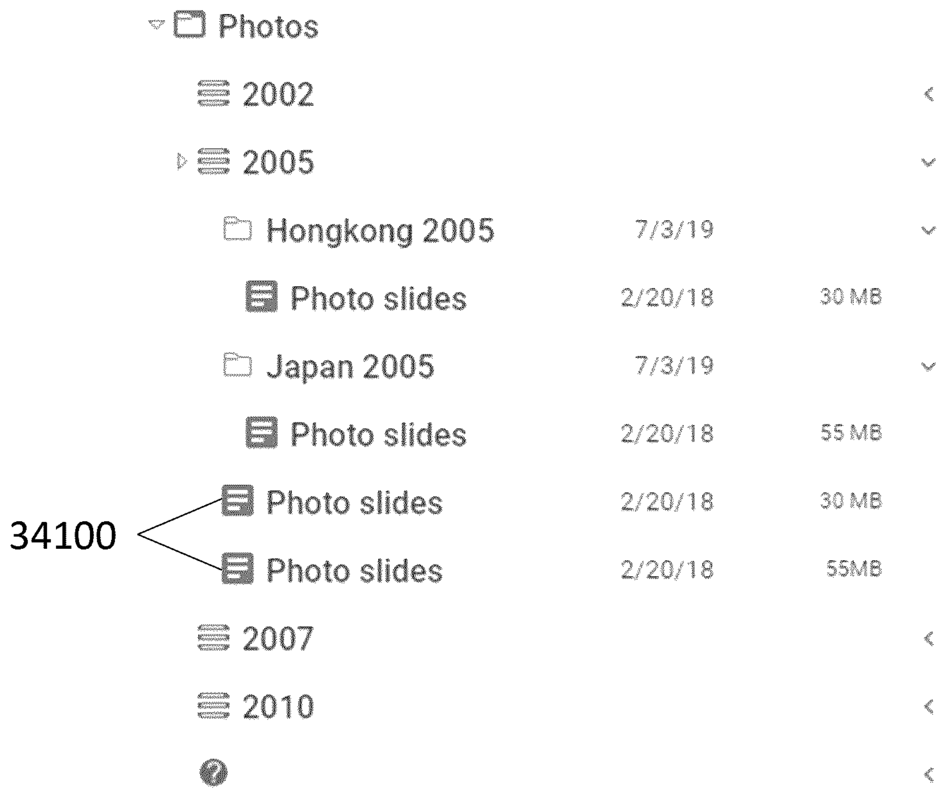
FIG. 34 shows why it is problematic to expand a folder listed under a search node for the files inside the folder to get displayed under the same search node.

It is also logically wrong to expand a folder listed under a search node for the files inside the folder to get displayed under the same search node, because, as shown in FIG. 34, those particular files may have been listed under the search node separately by themselves 34100 already in parallel to the parent folder.

Existing search engines treat both the folders and the files in them exactly the same way (separately and independently) because they do not recognize the folder structures when the search requests are evaluated against the stored collections. So, both the folders and the files end up being listed the same way in the plain result lists of data items returned for the search requests.

According to an embodiment, these issues are rectified if the data collection itself is stored in a plain list (like most photo collections on cell phones are) or, if the user intentionally wants the existing folder structure to be completely ignored, by building direct accessing paths for all individual files in the collection and makes searchable characteristics available on each and every file, like though tagging. But the existing folder structure can be very helpful for the data collections and all the files within the collections to be properly recognized and organized.

Figure 35:
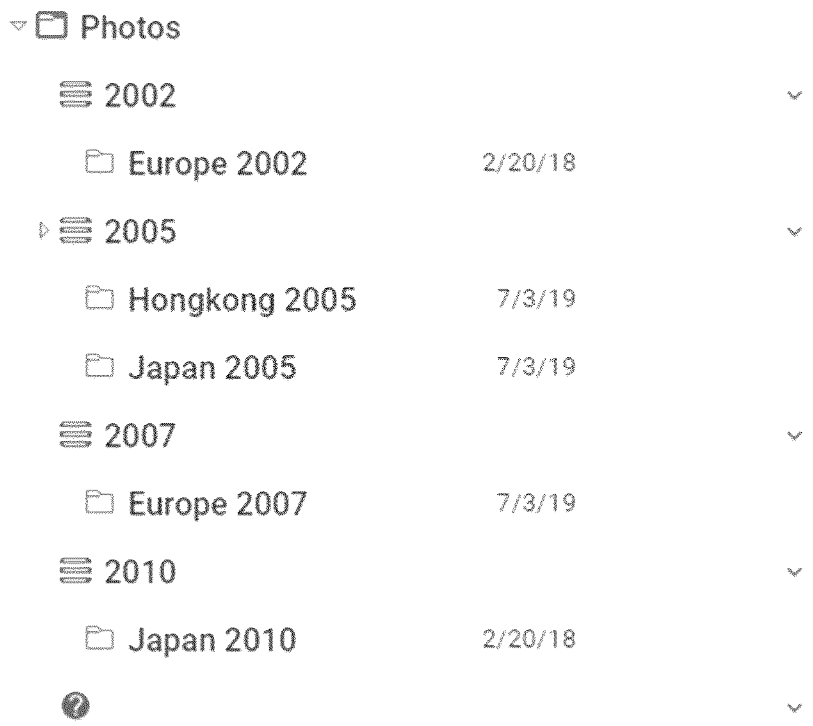
FIG. 35 shows an embodiment with the top-most matching folders in search result sets when traditional search processing is used.

According to an embodiment, the search request processing procedure is adjusted for the existing folder tree structure to be recognized and respected. According to a further embodiment, this is achieved by returning only the top-most (parent) folders, instead of all the folders found from the data collection, that match with the search request as the initial search result set and displaying all the remaining search results under the top-most folder using the presentation forms for folder tree structures with 31100, 31200, 31300, and 31400. According to an embodiment shown in FIG. 35, the top-most matching folders are in the search result sets when traditional search processing is used, so, the initial search result display from folder-aware search processing is similar to previous embodiments, but has an empty unsorted node.

According to an embodiment, among all the parent folders and the sub-folders and individual files inside the parent folders that are positively identified by a search request, the containing relationships between them imply that, when a parent folder matches with a search request, all the sub-folders and files inside this parent folder also, logically speaking, match with the same request even when the required searchable characteristics are not technically or explicitly available on the sub-folders or the individual files. In other words, both the parent folder and all the contents under it should be returned within the result set for the search request.

Figure 36:
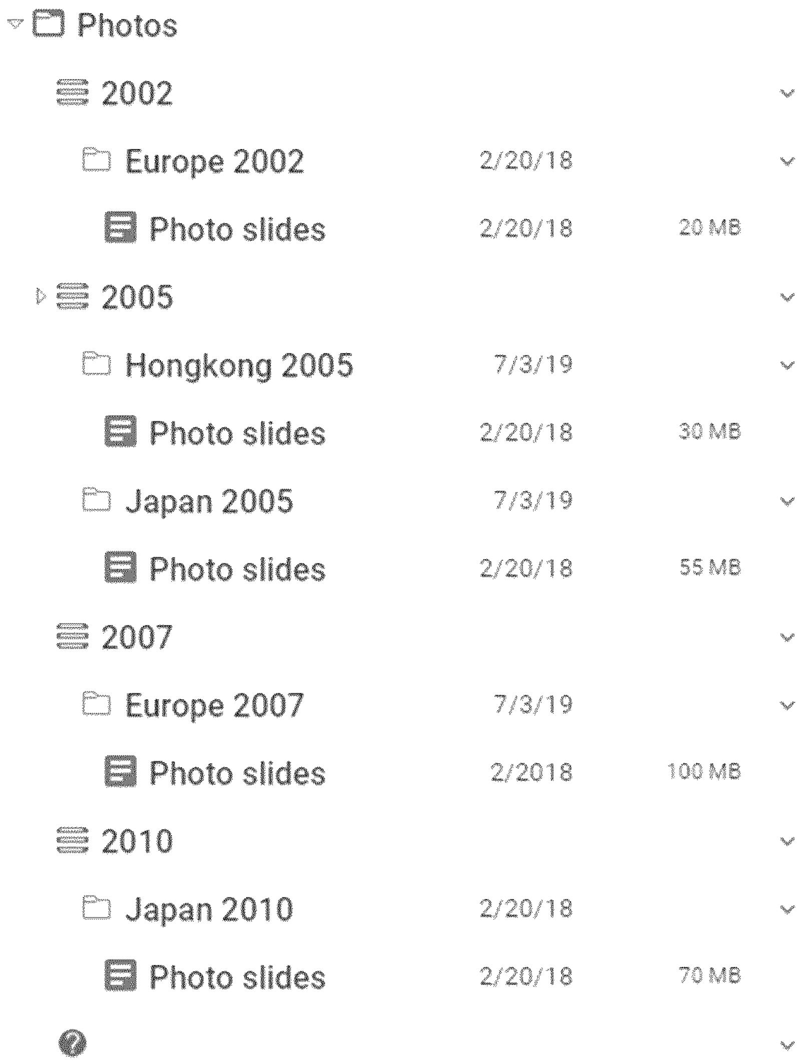
FIG. 36 shows an embodiment where duplicates or conflicting folders and files will not appear within result presentations as long as the top-most folders only appear once within the search result sets.

According to an embedment, by using 31100, 31200, 31300, 31400 controls complete contents of the entire tree under the parent folder can be displayed in various forms, with all the individual files from any level visible or hidden under the parent folder or any of the sub-folders at any level. According to a further embodiment, the initial search result set can be reduced to the top-most folders alone, but the rest of the search result set can still get displayed, as needed, under the parent folders with their integrity and completeness always being maintained. According to an embodiment shown in FIG. 36, duplicates or conflicting folders and files will not appear within result presentations as long as the top-most folders only appear once within the search result sets because a well-built and maintained folder structure ensures that no folders will overlap with one another in any way.

According to an embodiment, search trees and folder trees can be merged together within the same hierarchical presentation, making the management system unified, after the search request processing and result presentation procedure is made folder-aware as described in previous embodiments.

According to an embodiment, when the top-most folders are initially collapsed, the search result set is in a minimal form. According to an embodiment, when the folders, at any level, are expanded the details of the search results are presented with their hierarchal information preserved.

According to an embodiment, even though the size of the initial result sets are minimized, the size of the entire result sets get consistently maximized, as the searchable characteristics of the parent folders get inherited by and projected onto all the sub-folders and child files automatically, no matter whether such characteristics and properties explicitly exist on the sub-folders and child files or not.

Figure 37A:
FIGS. 37(*a*) and 37(*b*) show embodiments with same level presentations of folders and individual files.
Figure 37B:

According to an embodiment, using the folder-aware search method causes individual files to still appear directly under a search node, but only when they do not belong to any parent folder that also matches with the node. A further embodiment is shown in FIG. 37(*a*) of individual files under a search node that do not belong to any parent folder that also matches with the node, with both folders and individual files at the same level. According to a further embodiment shown in FIG. 37(*b*), the file "Other 2002" is listed directly under the search nodes in parallel to folder "Europe 2002" because it doesn't have any parent folder of its own that matches with the search request.

Figure 38A:
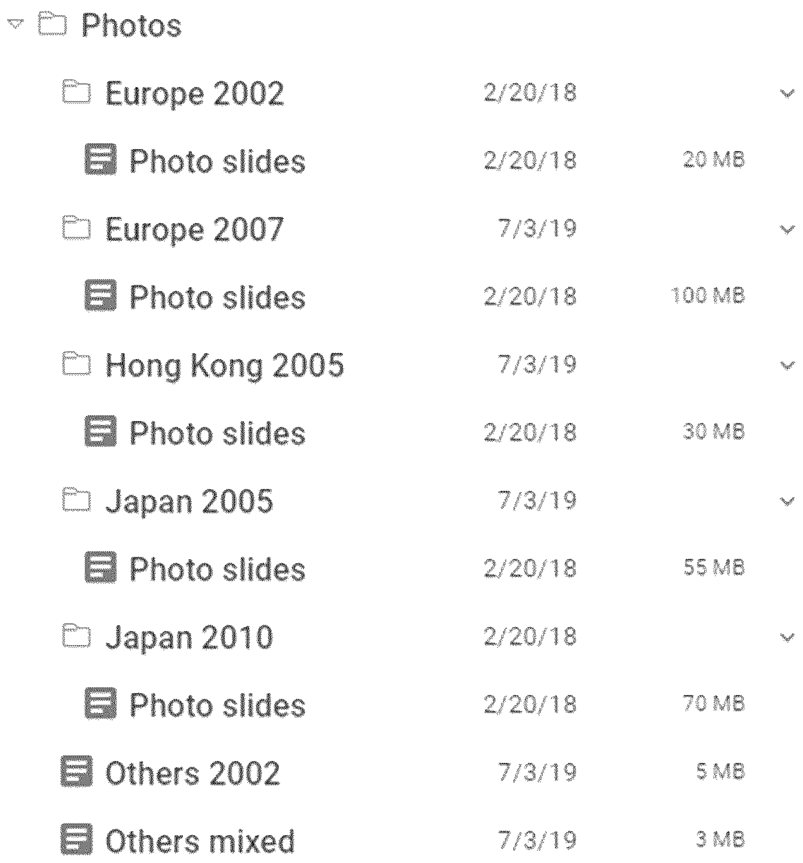
FIGS. 38(*a*) and 38(*b*) show an embodiment that compares folder and search tree structures for folders and files both before and after reorganization.
Figure 38B:
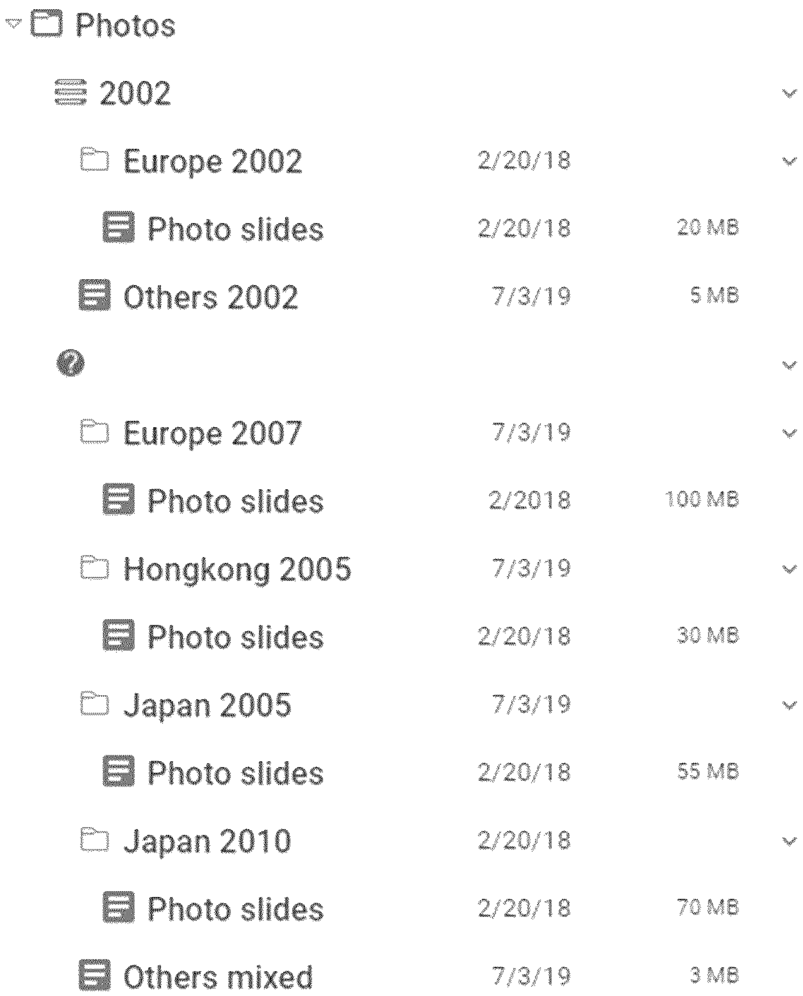
Figure 39A:
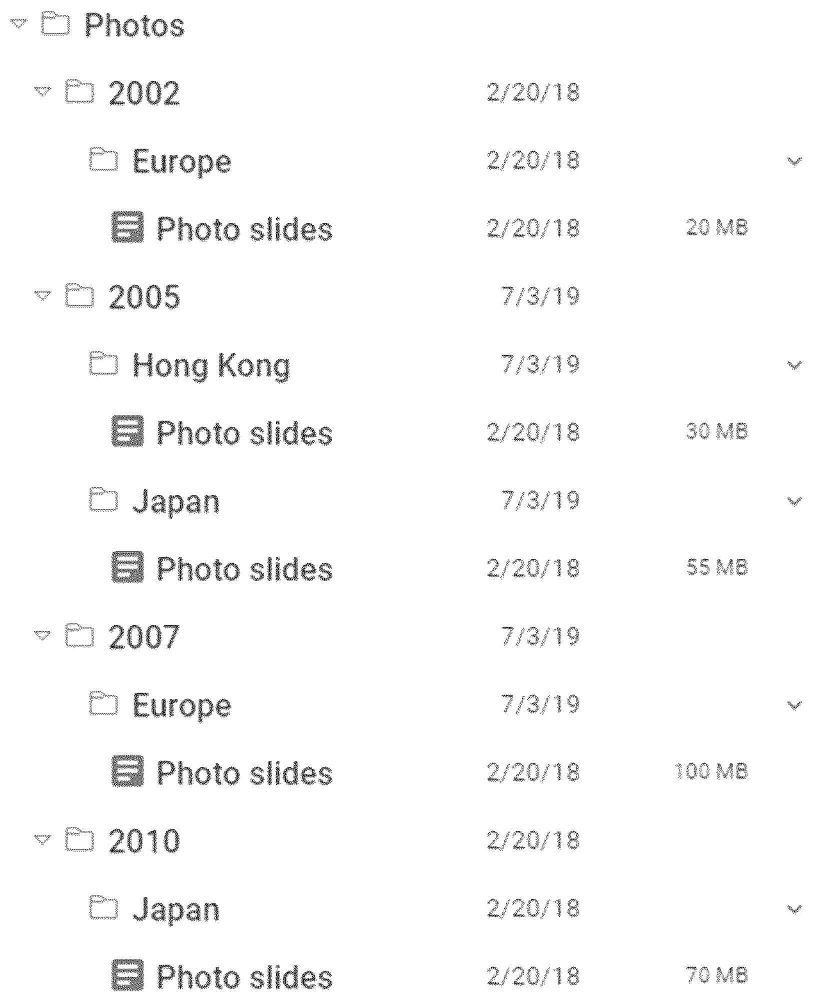
FIGS. 39(*a*) to 39(*d*) show embodiments of folder structures where files have first been divided by dates, then by locations.
Figure 39B:
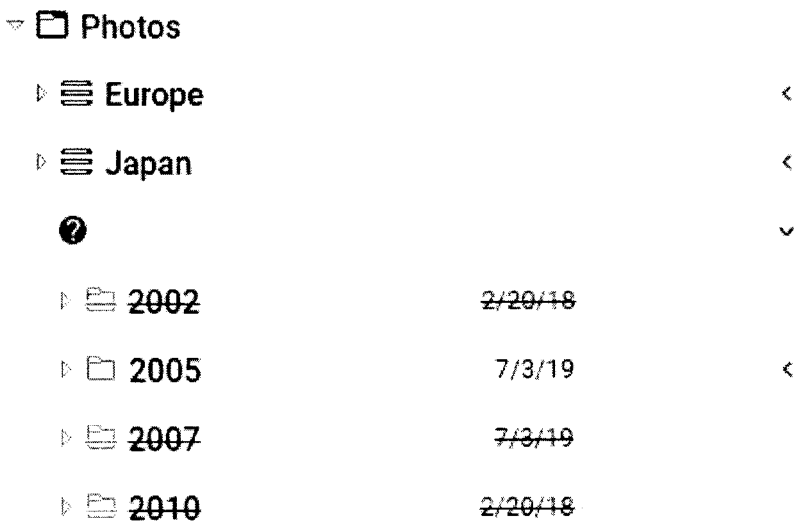
Figure 39C:
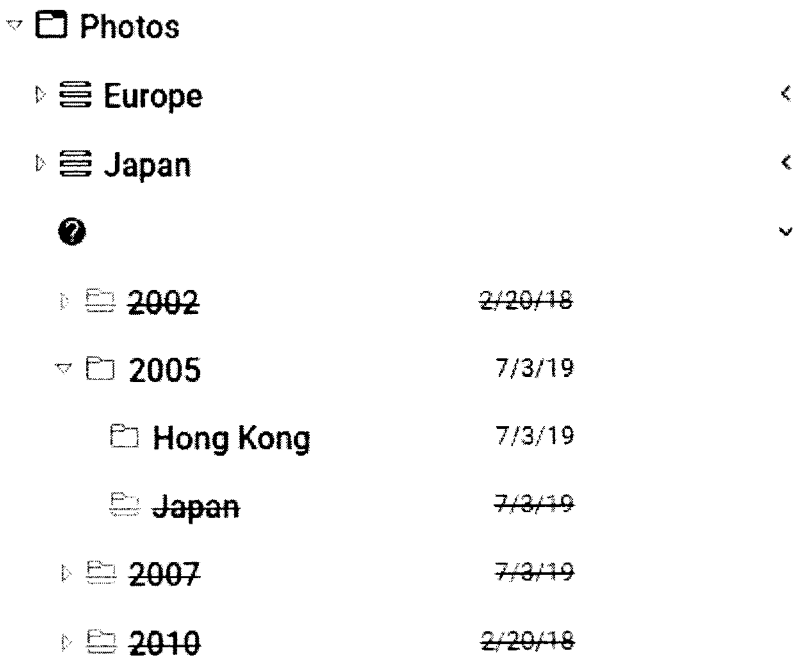
Figure 39D:
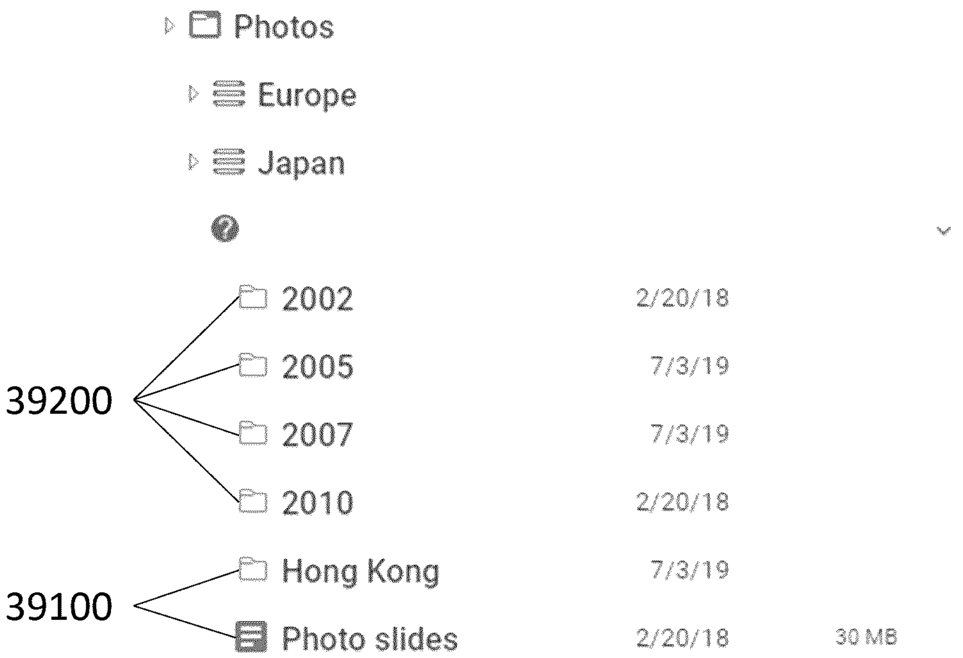

According to an embodiment and by comparing an original folder structure shown in FIG. 38(*a*) and the search tree structure shown in FIG. 38(*b*), despite folders and files being reorganized from FIGS. 38(*a*) to 38(*b*) using the search trees, the folder structures for both the folders and files being reorganized in the sorted search nodes and the remaining folders and files in the unsorted node remain intact during the sorting operations.

According to an embodiment, the presentations for search nodes correspond to positively identifying search requests, where the containing relationships between a parent folder and its sub-folders and child files under it allow all the sub-folders and files inside a matching parent folder to be included in the search result set even when the searchable characteristics are not explicitly set on them. According to a further embodiment, within a search tree, these nodes are the sorted-only nodes with their corresponding search requests only containing Boolean operator AND or, if any, and not any Boolean NOT According to an embodiment, for the unsorted nodes and the sorted nodes under an unsorted node within a search tree where their corresponding search requests are completely or partially "negated" by, at least, a Boolean NOT operator, no such containing relationships can be implied between a parent folder and its sub-folders and child files under it. According to an embodiment, all the folders and files need to be explicitly matched with the requests in order for them to be a valid item in the result sets for these nodes.

According to an embodiment shown in FIG. 39(*a*), a folder structure can be built where the "Photo slides" files have been first divided by the dates, then by the locations. In order for the grouping of the files to be reversed or re-organized, search trees will be built on this collection, so that the files get divided first by the locations, then by the dates, for the sample folder tree. According to an embodiment, the top-most matching folders are still listed for such completely or partially negated requests. According to an embodiment, by definition, all the top-most folders that explicitly match with the search request need to be listed within the result set for those search nodes. According to an embodiment, all folders and files that do explicitly match with the search request can only be either these top-most folders or sub-folders and files inside them, (because all the folders and files outside them would have matched with at least one sorted node, making them impossible to match with the "negated" request any more), either a complete-set or a sub-set of the folder tree under the top-most folder. So, according to embodiments shown in FIG. 39(*b*) and FIG. 39(*c*), the folders "2002", "2005", "2007", and "2010" are listed under the unsorted node after files and folders for "Europe" and "Japan" are grouped together, and some of the top-most folders, such as "2002", "2007", and "2010", are crossed-out or marked or disabled to reflect the fact that none of the sub-folders or files under them matches with the negated request, and only the top-most folder "2005" is left with actual contents ("Hong Kong") to be further processed.

Logically speaking, listing the folders for "2002", "2007", and "2010" in the result set is useless and even confusing when none of their actual contents match with the search request for the unsorted node. However, according to an embodiment, top-most folders like those still cannot be removed or omitted from the search result sets, because, technically speaking, they do match with the negated request by themselves.

According to an embodiment, folder-aware search request processing checks the status on individual sub-folders and files inside a parent folder, and then sets or updates the status on the parent folder based on the status on its contents, so that the top-most folders can be distinguished and marked accordingly as not-logically-matching, disabled, matching-partially, or matching-completely.

According to an embodiment and in order for the completeness of their contents to be maintained for the matching-partially parent folders, all the sub-folders and the files directly under them are displayed together when the parent folders are expanded. According to a further embodiment, sub-folders and files in such cases are further distinguished and marked accordingly. According to an embodiment, those individual not-matching sub-folders and files are actually duplicates since they must have matched with some sorted node before they can be considered not matching for a negated node within the same tree structure.

Even though all the different types of requests, folders, files, duplicates, and the logic between them sound complicated, the resulting presentations are easy to understand in embodiments where the "disabled" folders and the duplicates are properly marked or presented. According to a further embodiment, users can make connections between the unsorted items and those that are already sorted in the same context under the same parent folder using such a presentation. Overall, these embodiments are an improvement over result sets from traditional search request processing where the matching sub-folders and individual files are listed separately and independently 39100 from the top-most folders 39200, like as shown in FIG. 39(*d*), making the result set larger and more complex to examine.

Figure 40:
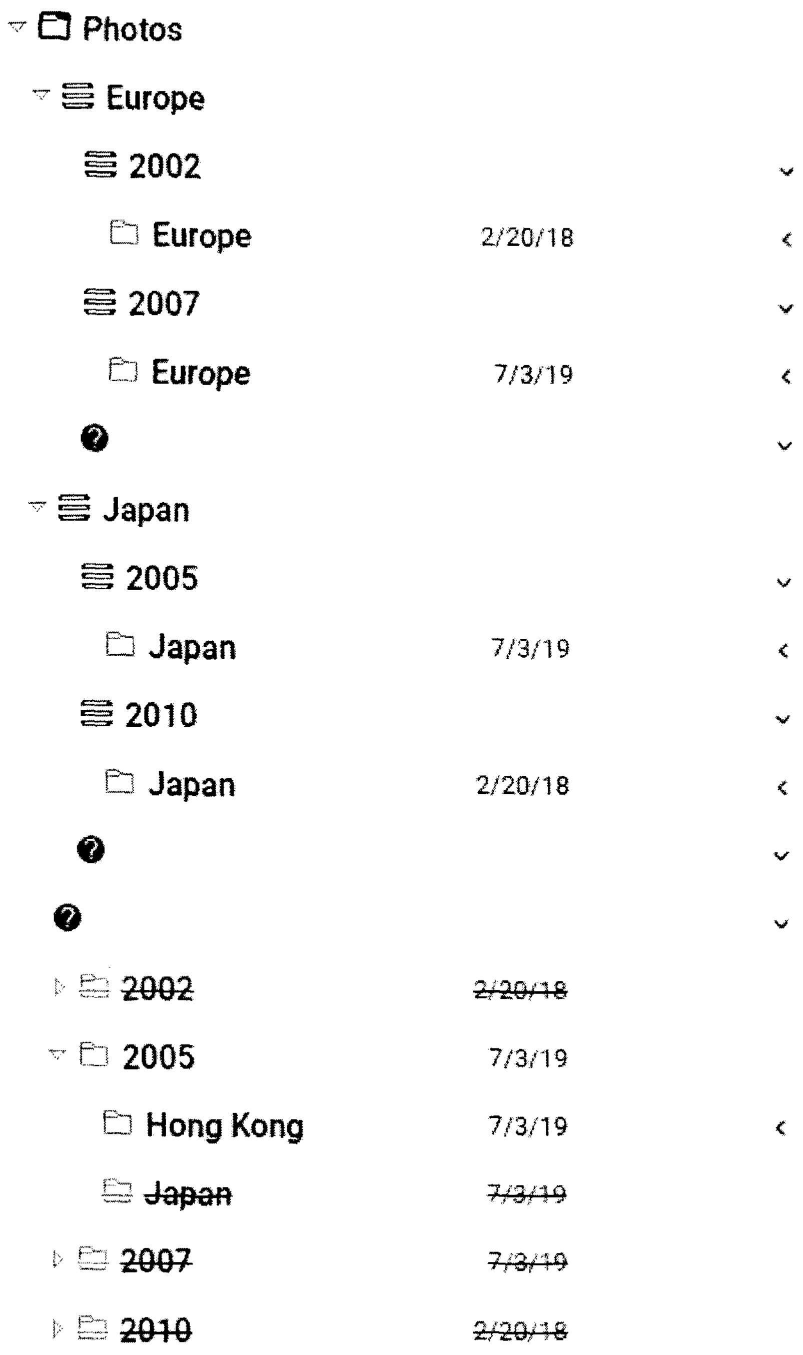
FIG. 40 shows an embodiment of a search request processing system.

According to an embodiment, a folder-aware search request processing system automatically projects search characteristics downward from the parent folders onto the sub-folders and the files inside them for positively identifying search requests. According to a further embodiment, a folder-aware search request processing system automatically derives the matching status upward from the sub-folders and the files to their parent folders for completely or partially negated search requests. According to an embodiment, a folder-aware search request processing system preserves the context and hierarchal information with integrity and completeness. According to a further embodiment, the preservation of context and hierarchal information is for all positively identifying and completely or partially negated search requests. An embodiment of such a search request processing system is shown in FIG. 40 where dates are under the location names in the search tree and duplicated records and not-matching folders under a partially matching parent folder, like the unsorted folder for "Japan", are recognized and marked or crossed out.

Figure 41:
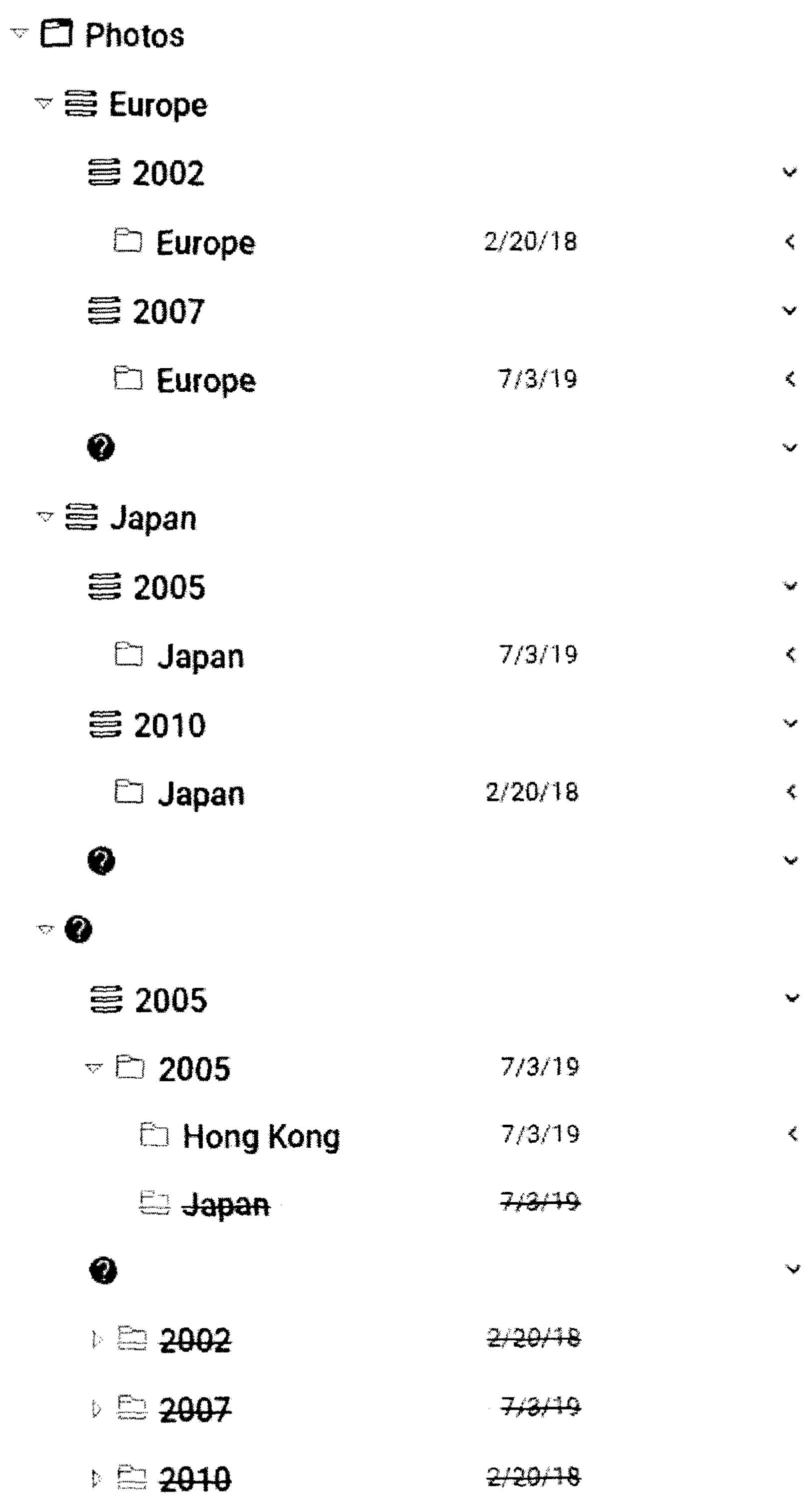
FIG. 41 shows an embodiment where a search node that is sorted, when looked at by itself, can represent a partially negated search request when it is under an unsorted node within the entire search tree structure.

According to an embodiment, a search node that is sorted, when looked at by itself, can still represent a partially negated search request when it is under an unsorted node within the entire search tree structure, like the "2005" search node under the unsorted node in FIG. 41. According to a further embodiment, such a search node must be presented the same way as a completely negated unsorted node. According to the embodiment shown in FIG. 41, an unsorted node under an unsorted node will be marked as not-logically-matching or disabled.

According to an embodiment, the search request processing system can be used in combination with traditional search request processing modes.

According to an embodiment, the methods and systems described above can be implemented on computing devices including a processor, a display and a memory that have access to data items. The storage tree and associated collection of data items need not only be accessible to the computing device of the user, for example through a wired or wireless network connection, and need not be on memory at the user's computing device although that will often be the case.

Various embodiments of the invention have been described in detail. Since changes in and or additions to the above-described best mode may be made without departing from the nature, spirit or scope of the invention, the invention is not to be limited to those details but only by the appended claims. Section headings herein are provided as organizational cues. These headings shall not limit or characterize the invention set out in the appended claims.

What is claimed is:

1. A computer-implemented method for presenting a search tree of a storage tree associated with a collection of data items, wherein the search tree incorporates at least one parent search tree node, the at least one parent search tree node having one or more sorted child search tree nodes and one or more unsorted child search tree nodes, wherein the at least one parent search tree node comprises a search query parameter, the search query parameter corresponding to a search query of one or more terms or non-term conditions for searching through the storage tree associated with the collection of data items and for providing a search result set of data items identified by the one or more terms or non-term conditions, and a search result parameter, the search result parameter corresponding to the search result set of data items identified by the search query;

wherein each of the one or more sorted child search tree nodes comprises a search query parameter, the search query parameter corresponding to a search query of one or more terms of non-term conditions for searching through the storage tree associated with the collection of data items and for providing a search result set of data items identified by the one or more terms or non-term conditions, and a search result parameter, the search result parameter corresponding to the search result set of data items identified by the search query of the sorted child search tree node and wherein each of the one or more unsorted child search tree nodes comprises a search query parameter, the search query parameter corresponding to a search query for providing a search result set of data items that belong to the search result set of data items of the at least one parent search tree node and do not belong to any of the search result sets of data items of the one or more sorted child search tree nodes, and a search result parameter, the search result parameter corresponding to the search result set of data items that belong to the search result set of data items of the at least one parent search tree node and do not belong to any of the search result sets of data items of the one or more sorted child search tree nodes; and wherein a standalone representation of at least one of the one or more unsorted child search tree nodes in the form of the search result set of data items of the at least one of the one or more unsorted child search tree nodes is automatically generated and incorporated in a representation of the at least one parent search tree node of the search tree within a single displayed presentation.

2. The method of claim 1, wherein the data items of the collection of data items are tagged using tags in the form of name: value pairs.

3. The method of claim 2, wherein the tags are groupable by adding a common group tag to tags belonging to a user-identified unifiable group.

4. The method of claim 2, further comprising moving or copying at least one data item wherein the data items are moved or copied by a drag and drop operation that removes one or more tags corresponding to a current group and attaches one or more tags corresponding to a new group upon moving at least one data item or that attaches one or more tags corresponding to a new group upon copying at least one data item.

5. The method of claim 1, further comprising creating at least one identification-only search tree node that is associated with at least one child search tree node within the search tree and which identifies specific data items within a collection defined by a parent search tree node for a specific processing routine.

6. The method of claim 5, wherein the identification-only search tree node stores a single selection of data items from the collection of data items for a single processing routine by associating the identification-only search tree node with the search query for identifying the selection of data items from the collection of data items, a node-type indicator, and an operation-identifier.

7. The method of claim 1, further comprising browsing search trees using a position indicator and a single content display panel for a current node.

8. The method of claim 1, wherein non-term conditions include sub-node toggle, search result toggle, select, or open functions.

9. The method of claim 8, wherein the sub-node toggle, search result toggle, select, and open functions are implemented as buttons, menu options, or other conventions provided by an operating system or an application program, alone or combined.

10. The method of claim 1, wherein the storage tree for a parent folder displays subfolders and individual files concurrently.

11. The method of claim 1, wherein folders and search tree nodes are grouped and accessed across storage folder trees and search trees by associating each folder and search tree node with a same-collection-node list of at least one folder or search tree node where each folder or search tree node in the list logically represents a data item collection the same as the folder or a search result of the search tree node.

12. The method of claim 1, further comprising a pop-up preview or content summary feature.

13. The method of claim 1, further comprising different browsing modes for storage trees, search trees, or grouping search tree nodes.

14. The method of claim 1, wherein display search tree representation and file access controls are user-customizable.

15. The method of claim 1, wherein attributes and properties are displayed as details of files and folders for use in recognizing, distinguishing, accessing, or organizing files or folders.

16. A non-transient computer-readable medium containing computer-readable instructions, wherein the computer-readable instructions, when executed by a computer processor, perform a method for presenting:

a search tree of a storage tree associated with a collection of data items, the search tree incorporates at least one parent search tree mode, the at least one parent search tree node having;

one or more sorted search child tree nodes and one or more unsorted child search tree nodes, wherein the at least one parent search tree node comprises a search query parameter, the search query parameter corresponding to a search query of one of more terms or non-term conditions for searching through the storage tree associated with the collection of data items and for providing a search result set of data items identified by the one or more terms or non-term conditions, and a search result parameter, the search result parameter corresponding to the search result set of data items identified by the search query, wherein each of the one or more sorted child search tree nodes comprises a search query parameter, the search query parameter corresponding to a search query of one of more terms of non-term conditions for searching through the storage tree associated with the collection of data items and for providing a search result set of data items identified by the one or more terms or non-term conditions, and a search result parameter, the search result parameter corresponding to the search result set of data items identified by the search query of the sorted child search tree node; and wherein each of the one or more unsorted child search tree nodes comprises a search query parameter, the search query parameter corresponding to a search query for providing a search result set of data items that belong to the search result set of data items of the at least one parent search tree node and do not belong to any of the search result sets of data items of the one or more sorted child search tree nodes, and a search result parameter, the search result parameter corresponding to the search result set of data items that belong to the search result set of data items of the at least one parent search tree node and do not belong to any one of the search result sets of data items of the one or more sorted child search tree nodes; and wherein a standalone representation of at least one of the one or more unsorted child search tree nodes in the form of the search result set of data items of the at least one of the one or more unsorted child search tree nodes is automatically generated and incorporated in a representation of the at least one parent search tree node of the search tree within a single displayed presentation.

17. The non-transient computer-readable medium of claim 16, wherein the data items of the collection of data items are tagged using tags in the form of name: value pairs.

18. The non-transient computer-readable medium of claim 17, wherein the tags are groupable by adding a common group tag to tags belonging to a user-identified unifiable group.

19. The non-transient computer-readable medium of claim 17, further comprising moving or copying at least one data item wherein the data items are moved or copied by a drag and drop operation that removes one or more tags corresponding to a current group and attaches one or more tags corresponding to a new group upon moving at least one data item or that attaches one or more tags corresponding to a new group upon copying at least one data item.

20. The non-transient computer-readable medium of claim 16, further comprising creating at least one identification-only search tree node that is associated with at least one child search tree node within the search tree and which identifies specific data items within a collection defined by a parent search tree node for a specific processing routine.

21. The non-transient computer-readable medium of claim 20, wherein the identification-only search tree node stores a single selection of data items from the collection of data items for a single processing routine by associating the identification-only search tree node with the search query for identifying the selection of data items from the collection of data items, a node-type indicator, and an operation-identifier.

22. The non-transient computer-readable medium of claim 16, further comprising browsing search trees using a position indicator and a single content display panel for a current node.

23. The non-transient computer-readable medium of claim 16, wherein non-term conditions include sub-node toggle, search result toggle, select, or open functions.

24. The non-transient computer-readable medium of claim 23, wherein the sub-node toggle, search result toggle, select, and open functions are implemented as buttons, menu options, or other conventions provided by an operating system or an application program, alone or combined.

25. The non-transient computer-readable medium of claim 16, wherein the storage tree for a parent folder is presented with the completeness of content maintained and such that subfolders and individual files can be displayed concurrently.

26. The non-transient computer-readable medium of claim 16, wherein folders and search tree nodes are grouped and accessed across storage folder trees and search trees by associating each folder and search tree node with a same-collection-node list of at least one folder or search tree node where each folder or search tree node in the list logically represents a data item collection the same as the folder or a search result of the search tree node.

27. The non-transient computer-readable medium of claim 16, further comprising a pop-up preview or content summary feature.

28. The non-transient computer-readable medium of claim 16, further comprising different browsing modes for storage trees, search trees, or grouping search tree nodes.

29. The non-transient computer-readable medium of claim 16, wherein display search tree representation and file access controls are user-customizable.

30. The non-transient computer-readable medium of claim 16, wherein attributes and properties are displayed as details of files and folders for use in recognizing, distinguishing, accessing, or organizing files or folders.

31. A computer system for generating a search tree representation, the system comprising:

a non-transient computer memory storing at least one storage tree and at least one associated collection of data items; and at least one processor in communication with the non-transient computer memory;

wherein the non-transient computer memory comprises instructions, wherein the instructions, when executed by the at least one processor, carry out a method for presenting, a search tree of the storage tree associated with the collection of data items, the search tree incorporates at least one parent search tree node, the at least one parent search tree node having;

one or more sorted child search tree nodes and one or more unsorted child search tree nodes, wherein the at least one parent search tree node comprises a search query parameter, the search query parameter corresponding to a search query of one or more terms of non-term conditions for searching through the storage tree associated with the collection of data items and for providing a search result set of data items identified by the one or more terms or non-term conditions, and a search result parameter, the search result parameter corresponding to the search result set of data items identified by the search query;

wherein each of the one or more sorted child search tree nodes comprises a search query parameter, the search query parameter corresponding to a search query of one or more terms of non-term conditions for searching through the storage tree associated with the collection of data items and for providing a search result set of data items identified by the one or more terms or non-term conditions, and a search result parameter, the search result parameter corresponding to the search result set of data items that belong to the search result identified by the search query of the sorted child search tree node; and wherein each of the one or more unsorted child search tree nodes comprises a search query parameter, the search query parameter corresponding to a search query for providing a search result set of data items that belong to the search result set of data items of the at least one parent search tree node and do not belong to any of the search result sets of data items of the one of more sorted child search tree nodes, and search result parameter, the search result parameter corresponding to the search result set of data items that belong to the search result set of data items of the at least one parent search tree node and do not belong to any the search result sets of data items of one or more sorted child search tree nodes, and wherein a standalone representation of at least one of the one or more unsorted child search tree nodes in the form of the search result set of data items of the at least one of the one or more unsorted child search tree nodes is automatically generated and incorporated in a representation of the at least one parent search tree node of the search tree within a single displayed presentation.

32. The system of claim 31, wherein data items of the collection of data items are tagged using tags in the forms of name: value pairs.

33. The system of claim 32, wherein the tags are groupable by adding a common group tag to tags belonging to a user-identified unifiable group.

34. The system of claim 32, further comprising moving or copying at least one data item wherein the data items are moved or copied by a drag and drop operation that removes one or more tags corresponding to a current group and attaches one or more tags corresponding to a new group upon moving at least one data item or that attaches one or more tags corresponding to a new group upon copying at least one data item.

35. The system of claim 31, further comprising creating at least one identification-only search tree node that is associated with at least one child search tree node within the search tree and which identifies specific data items within a collection defined by a parent search tree node for a specific processing routine.

36. The system of claim 35, wherein the identification-only search tree node stores a single selection of data items from the collection of data items for a single processing routine by associating the identification-only search tree node with the search query for identifying the selection of data items from the collection of data items, a node-type indicator, and an operation-identifier.

37. The system of claim 31, further comprising browsing search trees using a position indicator and a single content display panel for a current node.

38. The system of claim 31, wherein non-term conditions include sub-node toggle, search result toggle, select, or open functions.

39. The system of claim 38, wherein the sub-node toggle, search result toggle, select, and open functions are implemented as buttons, menu options, or other conventions provided by an operating system or an application program, alone or combined.

40. The system of claim 31, wherein the storage tree for a parent folder is presented with the completeness of content maintained and such that subfolders and individual files can be displayed concurrently.

41. The system of claim 31, wherein folders and search tree nodes are grouped and accessed across storage folder trees and search trees by associating each folder and search tree node with a same-collection-node list of at least one folder or search tree node where each folder or search tree node in the list logically represents a data item collection the same as the folder or a search result of the search tree node.

42. The system of claim 31, further comprising a pop-up preview or content summary feature.

43. The system of claim 31, further comprising different browsing modes for storage trees, search trees, or grouping search tree nodes.

44. The system of claim 31, wherein display search tree representation and file access controls are user-customizable.

45. The system of claim 31, wherein attributes and properties are displayed as details of files and folders for use in recognizing, distinguishing, accessing, or organizing files or folders.

46. The system of claim 31, further comprising a search request processing system.

47. The system of claim 46, wherein the search request processing system automatically projects search characteristics downward from parent folders onto sub-folders and files inside them for positively identifying search requests or automatically derives matching status upward from sub-folders and files to their parent folders for completely or partially negated search requests.

48. The system of claim 46, wherein the search request processing system preserves context and hierarchal information for identifying and completely or partially negated search requests.

49. The system of claim 46, wherein the search request processing system returns a minimal set of folders and files as the representations of a complete result set for the search request represented by at least one of the search tree nodes after parent-child relationships in the storage folder trees are recognized.

* * * * *